US012809495B2

(12) United States Patent
Allspaw et al.

(10) Patent No.: US 12,809,495 B2
(45) Date of Patent: Nov. 24, 2026

(54) SYSTEM AND METHOD FOR ANALYSIS AND VISUALIZATION OF INCIDENT DATA

(71) Applicant: Adaptive Capacity Labs, LLC, Brooklyn, NY (US)

(72) Inventors: John Allspaw, Brooklyn, NY (US); Richard Cook, Chicago, IL (US); Christopher Fairbanks, Barkhamsted, CT (US)

( * ) Notice: Subject to any disclaimer, the term of this patent is extended or adjusted under 35 U.S.C. 154(b) by 239 days.

(21) Appl. No.: 18/653,460

(22) Filed: May 2, 2024

(65) Prior Publication Data

US 2024/0281118 A1 Aug. 22, 2024

Related U.S. Application Data

(63) Continuation-in-part of application No. 18/114,045, filed on Feb. 24, 2023, now Pat. No. 12,001,652, which is a continuation of application No. 17/705,779, filed on Mar. 28, 2022, now Pat. No. 11,614,850, which is a continuation-in-part of application No. 17/212,837, filed on Mar. 25, 2021, now Pat. No. 11,314,387, which is a continuation of application No. 17/076,724, filed on Oct. 21, 2020, now Pat. No. 10,990,247.

(51) Int. Cl.

| | |
|---|---|
| ***G06F 3/01*** | (2006.01) |
| ***G06F 3/04817*** | (2022.01) |
| ***G06F 3/0482*** | (2013.01) |
| ***G06T 11/00*** | (2006.01) |
| *G06F 3/00* | (2006.01) |

(52) U.S. Cl.
CPC ........ *G06F 3/0482* (2013.01); *G06F 3/04817* (2013.01); *G06T 11/00* (2013.01); *G06T 2200/24* (2013.01)

(58) Field of Classification Search
None
See application file for complete search history.

(56) References Cited

U.S. PATENT DOCUMENTS 10,417,497 B1 * 9/2019 Cossman ............ G06F 3/04817
11,792,210 B2 * 10/2023 Brown .................. G06F 21/552 726/22
11,916,929 B1 * 2/2024 Thimmegowda ... H04L 63/1425
(Continued)

*Primary Examiner* — Toan H Vu
(74) *Attorney, Agent, or Firm* — Stoyanov Law PLLC; Roy Chan

(57) ABSTRACT

An apparatus for investigating an analyzable incident over a time period, having a database that stores data sets containing events about the incident with a timestamp, source, and content. A data processing computer operates on these data sets. A display module, connected to the computer, displays a GUI that allows a user to select and annotate events. The GUI includes a control panel and an event visualization panel that display a source-event view or a timeline view. The GUI receives timeline events from the database, each with a timestamp. The timeline view displays a timeline flowchart and a time-series graph, both chronologically aligned. The flowchart shows events along a time axis, with user-selectable icons representing each event. The GUI also receives an incident time series and displays a line graph based on datapoints within the timeline window. Variable values corresponding to each event are observable on the line graph.

6 Claims, 45 Drawing Sheets

(56) References Cited

U.S. PATENT DOCUMENTS

| | | | | |
|---|---|---|---|---|
| 2006/0090141 | A1* | 4/2006 | Loui | G06F 16/447 715/764 |
| 2008/0032269 | A1* | 2/2008 | Sako | G09B 5/00 434/154 |
| 2011/0202866 | A1* | 8/2011 | Huang | G06F 3/0485 715/779 |
| 2012/0114307 | A1* | 5/2012 | Yang | G06F 16/5838 386/278 |
| 2012/0150436 | A1* | 6/2012 | Rossano | G01C 21/3694 701/425 |
| 2013/0257859 | A1* | 10/2013 | Sato | G06T 19/00 345/419 |
| 2014/0071160 | A1* | 3/2014 | Sugiura | H04N 1/387 345/619 |
| 2015/0355790 | A1* | 12/2015 | O'Mahony | G06F 3/04842 715/771 |
| 2016/0179900 | A1* | 6/2016 | Stefik | G06F 16/2379 707/771 |
| 2017/0031565 | A1* | 2/2017 | Chauhan | H04L 63/1425 |
| 2021/0311542 | A1* | 10/2021 | Brown | G06F 3/017 |

* cited by examiner

62

199

SYSTEM AND METHOD FOR ANALYSIS AND VISUALIZATION OF INCIDENT DATA

CROSS-REFERENCE TO RELATED APPLICATIONS

The present application is a continuation-in-part of U.S. patent application Ser. No. 18/114,045, filed Feb. 24, 2023, and entitled "System and Method for Analysis and Visualization of Incident Data," which is a continuation of U.S. patent application Ser. No. 17/705,779, filed Mar. 28, 2022, now U.S. Pat. No. 11,614,850 B2, and entitled "System and Method for Analysis and Visualization of Incident Data," which is a continuation-in-part of U.S. patent application Ser. No. 17/212,837, filed Mar. 25, 2021, now U.S. Pat. No. 11,314,387 B1, and entitled "System and Method for Analysis and Visualization of Incident Data," which is a continuation of U.S. patent application Ser. No. 17/076,724, filed Oct. 21, 2020, now U.S. Pat. No. 10,990,247 B1, and entitled "System and Method for analysis and visualization of incident data," the disclosures of which are incorporated herein by reference in their entirety. The present application is related to U.S. Design application Ser. No. 29/755,633, now U.S. Design Pat. No. 940,158 S, and Ser. No. 29/755,635, now U.S. Design U.S. Pat. No. 940,159 S, both filed Oct. 21, 2020, the disclosures of which are incorporated herein by reference in their entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention is related to methods and systems for analyzing and visualizing data collected during an incident. An incident as used in the description may be any event, accident, or occurrence of any duration, for example, airplane or other vehicle accident, network security breach, denial of service attack, power outages, professional conventional sports or e-sports competitions. Investigators may collect various data related to an incident to analyze the incident. Data may be available from one or multiple sources, and may include communications between incident participants or observers, video or audio recordings, images, sensor data, alerts, notifications, alarms data and others.

The various embodiments of the invention greatly facilitate the processing and analysis of data associated with the incident, by aiding the investigation of an incident and providing information for an incident investigator to use, for example, in interviewing, collecting additional information, facilitating group debriefing or post incident discussions.

BRIEF SUMMARY OF THE INVENTION

An embodiment of the present invention is an apparatus for investigating an analyzable incident for an incident time period, the apparatus comprising a database that receives and stores one or more data sets for the incident time period, a data processing computer coupled to the database that operates upon the one or more data sets, a display module coupled to the data processing computer system. The display module displays a graphical user interface (GUI) and enables a user to select one or more events from the series of events, and to annotate the one or more events. The GUI comprises a control panel and an event visualization panel. The one or more data sets comprise a series of events about the analyzable incident, wherein each event comprises a timestamp, a source, and a content. The event visualization panel is configured to display one of a source-event view and a timeline view. The GUI is configured to receive from the database a series of timeline events from the series of events that are within a timeline window and each timeline event in the series of timeline events comprises a timeline timestamp. The series of timeline events comprises a first timeline event having a first timeline timestamp. The timeline view comprises a time axis representative of the timeline window, and in timeline view the GUI is configured to display a timeline flowchart and a time-series graph. The GUI is further configured to display in timeline view one or more marker range indicators along the time axis. The timeline flowchart displays the series of timeline events chronologically along the time axis according to the timeline timestamp of each timeline event. The timeline flowchart also displays at least one user selectable icon representative of each timeline event from the series of timeline events. The series of timeline events comprises a first timeline event associated with an event tag. The first timeline event is represented by a first event icon displayed in visual association with the first timeline event content and the first timeline event timestamp. The first timeline event icon comprises visual characteristics representative of the event tag associated with the first timeline event. The GUI is configured to receive an incident time series comprising a first set of datapoints for a first related variable during the incident time period. The time series graph displays a first incident line graph for the timeline window, wherein the first incident line graph is based on a first set of timeline datapoints from the first set of datapoints that are within the timeline window. The timeline flowchart and the first incident line graph are chronologically aligned along the time axis so that a first variable value for the first related variable corresponding to each of the timeline events is observable on the first incident line graph at the timeline event timestamp for each of the timeline events.

In another embodiment of the present invention, the GUI further comprises a visualization filter control and an event mapping panel. The visualization filter control is configured to enable a user to select the time-window from the group consisting of a display time interval, the incident time period, a tag filter time interval, one or more marker range time intervals, and combinations thereof. When the timeline window is the display time interval the series of timeline events are events from the series of events whose timestamps are within the display time interval, and when the timeline window is the incident time period the series of timeline events are all events from the series of events. The GUI is configured to enable using the visualization filter control to select one or more event tags, and responsive to using the visualization filter control to select the one or more event tags, the series of timeline events consists of all events that are associated with the one or more event tags and whose timestamps are within the timeline window. When the timeline window is the tag filter time interval the series of timeline events consists of all events that are associated with the one or more event tags. When the timeline window is the one or more marker ranges the series of timeline events consist of events from the series of events whose timestamps are within the one or more marker ranges, and the one or more marker ranges represent marker time ranges related to an occurrence.

In yet another embodiment of the present invention the GUI further comprises an event mapping panel that displays a visual representation of all events from the series of events. The event mapping panel comprises a user selectable graphic indicating the display time interval and the GUI is configured to enable using the user selectable graphic to select a changed display time interval. The control panel comprises a time user control configured to enable using the time user control to select the changed display time interval and responsive to selecting the changed display time interval the user selectable graphic of the event mapping panel indicates the changed display time interval. The visualization filter control is configured to enable a user to select the time-window from the group consisting of the changed display time interval, the incident time period, a tag filter time interval, one or more marker range time intervals, and combinations thereof.

In another embodiment of the present invention the incident time series further comprises a second set of datapoints for a second related variable during the incident time period. The time series graph further displays a second incident line graph for the timeline window. The second incident line graph is based on a second set of timeline datapoints from the second set of datapoints that are within the timeline window. The timeline flowchart, the first incident line graph, and the second incident line graph are chronologically aligned along the time axis so that a second variable value for the second related variable corresponding to each of the timeline events is observable on the second incident line graph at the timeline event timestamp for each of the timeline events.

In yet another embodiment of the present invention the event visualization panel is configured to display one of a source-event view, timeline view, and a geographical map. The incident time series further comprises a set of geolocation datapoints during the incident time period. The data processing computer is configured to estimate from the incident time series a geolocation corresponding to each event from the series of events based on the timestamp of the event. The data processing computer is further configured to estimate from the incident timeline a first event geolocation corresponding to the first timeline event based on the first timeline event timestamp. The geo-map displays a series of user selectable geo-icons at each geolocation datapoint from the set of geolocation datapoints during the timeline window. The GUI is configured to enable selecting each selectable geo-icon to display information about the first related variable at each geolocation datapoint and the geo-map displays a first user selectable geo-icon at the first event geolocation. The first selectable geo-icon comprises visual characteristics representative of the event tag associated with the first timeline event. The GUI is also configured to enable selecting the first user selectable geo-icon to display one or more of the first timeline event content, the first timeline event timestamp, the tag associated with first timeline event, and the value of the first related variable at the first timeline event timestamp. The GUI is configured to enable a user to select each selectable geo-icon to display information about the first related variable at each geolocation datapoint.

In another embodiment of the present invention the GUI is further configured to allow using the at least one user selectable icon to annotate the timeline event associated with the at least one user selectable icon. The user selectable icon allows the user to switch to one of an event list view, a swimlane view, and a geolocation map view. The GUI is also configured to enable using the first user selectable geo-icon to annotate the first timeline event, and the first user selectable geo-icon allows the user to switch to one of an event list view, a swimlane view, and the timeline view. The event list view is a tabular list of the timestamp, the source and the content of each event from the series of events and the swimlane view is a graphical representation of the timestamp and the source of each event, and at least one user selectable icon associated with the content of each event.

BRIEF DESCRIPTION OF THE SEVERAL VIEWS OF THE DRAWING

The advantages and features of the present invention will be better understood as the following description is read in conjunction with the accompanying drawings, wherein.

Figure 1:
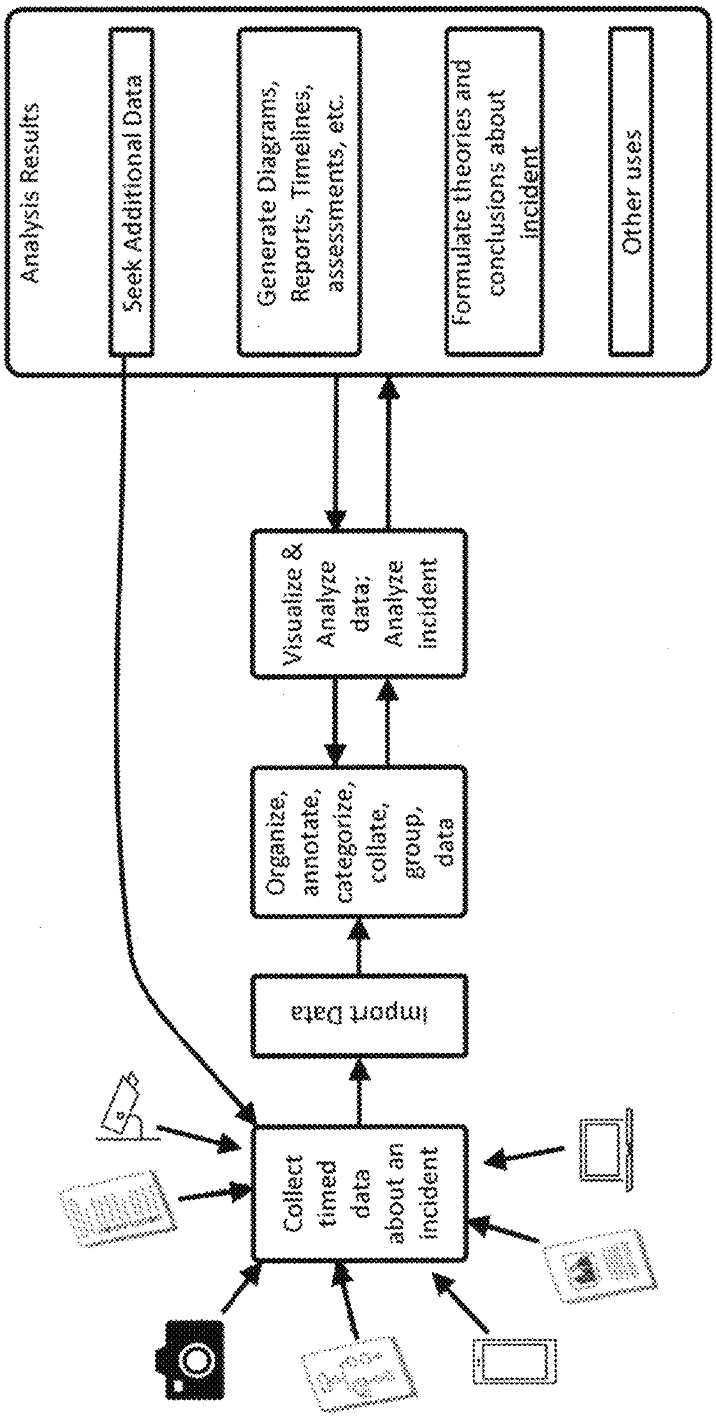
FIG. 1 is a diagram of an embodiment of the present invention.

For clarity purposes, all reference numerals may not be included in every figure.

DETAILED DESCRIPTION OF THE INVENTION

Embodiments of this invention may be implemented as systems comprising data storage, graphical displays, user controls, and computing interfaces between the graphical display, data storage, and user controls. Embodiments may be implemented on a single computing device, or may be implemented with distributed system architecture, such as a client device/workstation to graphically display data, a database, and any number of hardware and/or software layers in between.

An embodiment of the invention may be utilized and function as illustrated in FIG. 1, wherein incident data (e.g., data and other information about an incident) is collected in step 1000 and in step 1001 imported into a computer system configured to operate according to the invention. In step 1002 the data may be aggregated and manipulated by grouping, sorting, annotating, categorizing, collating, and other methods of data aggregation, manipulation and organization to facilitate the analysis of the incident. The data may subsequently, in 1003, be visualized in different views, allowing an investigator, as step 1004, to obtain diagrams for incident reports, timeline of multiple events occurring before, during or after an incident.

Figure 2:
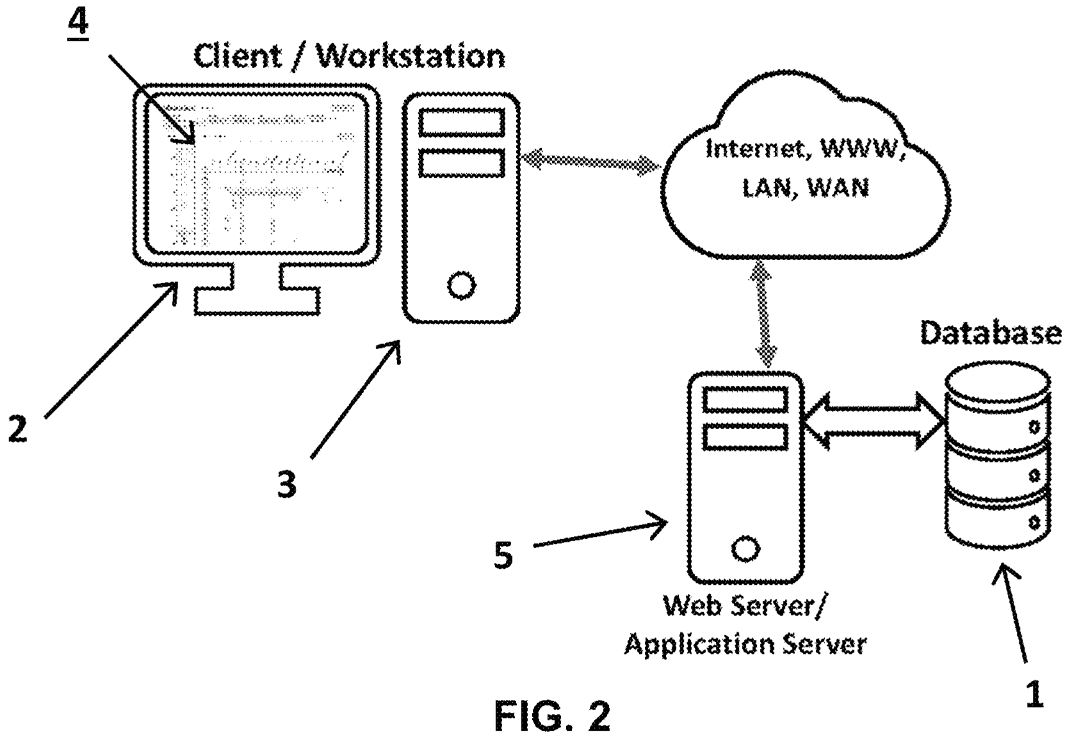
FIG. 2 is a diagram of an embodiment of the present invention.

In a preferred embodiment, illustrated in FIG. 2, the present invention maybe implemented as a distributed network system utilizing one or more Databases 1 and one or more workstations 3, comprising a display module 2, for displaying, visualizing and manipulating incident data stored in Database 1 through a Graphical User Interface ("GUI") 4. This embodiment may also comprise an Application Server 5 as a computing interface between Database 1, display module 2, workstation 3, and GUI 4. The GUI 4 provides efficient navigation through multiple views of the data associated with an incident. The Database 1 may be a relational or non-relational database, by way of example, MySql, SQL, Oracle, Mongo, Cassandra, ElasticSearch and many others. In this embodiment, the Workstation 3 maybe any computing device such as a personal computer, laptop, tablet, mobile device, thin client, or any other device capable of displaying the GUI and connecting to a network (e.g., Internet, WWW, internal networks, and other public or private networks). The display module 2 may be any display module comprising a display (e.g., monitor, screen, projector, etc.) and a display controller (e.g., display hardware and software controlling the display), as well as any other hardware or software instrumentality, or interface known in the industry and necessary to properly operate the display module.

In a preferred embodiment the display module 2 may be part of workstation 3. Workstation 3 may display the GUI using a web browser capable of displaying any type of markup language (e.g., HTML, XML, SGML, etc.) or any other program capable of accessing and displaying information from a network. In an embodiment with more than one workstations 3, or display modules 2, each workstation/display module may display different aspects of the GUI 4 (e.g., input, control, annotation) permitting different users to perform different actions. Embodiments of the invention may also comprise firewalls or other security measures (not shown) between the Application Server 5 and a network, or between the workstation 3 and a public network.

Figure 3:
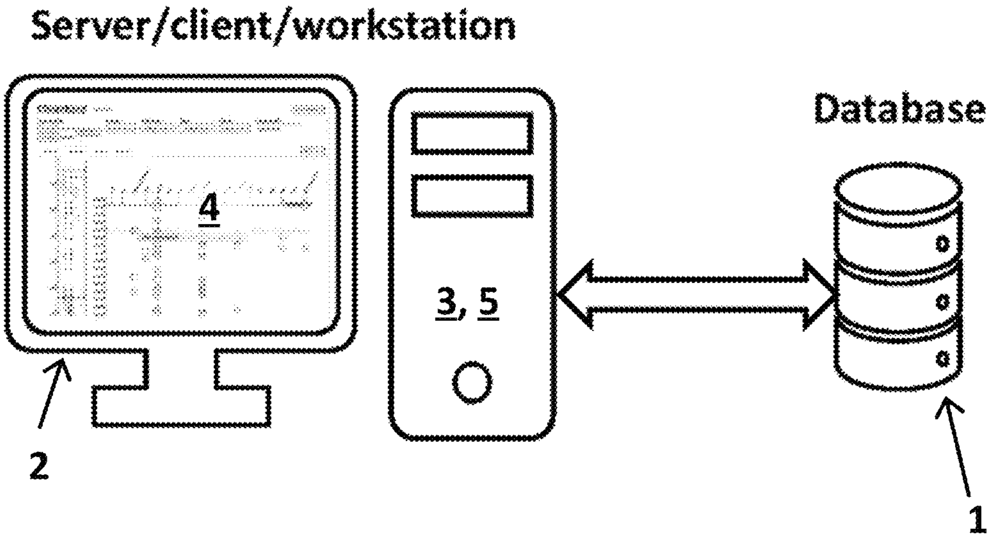
FIG. 3 is a diagram of an embodiment of the present invention.

Another embodiment illustrated in FIG. 3, may be implemented on a local network or even without any network connectivity. The Workstation 3, comprising display module 2, and Application Server 5 may be on the same computing device connected to the Database 1 as illustrated in FIG. 3. In other embodiments (not illustrated) the Workstation, Application Server, and the Database may be implemented on a single computing device.

An embodiment of the invention is a tool that can be used to collate, explore, and analyze one or more timestamped data sets 24 about an incident to facilitate researchers performing incident analysis by facilitating the process of analyzing timestamped data sets 24. Once imported into the tool, data sets 24 may be searched, organized, tagged, and annotated in various ways, including a temporal visualization (e.g., along a timeline). This greatly facilitates a user's ability to explore and analyze verbal, behavioral, audiovisual, technical, and other data as means to develop deeper understandings of an incident.

Figure 4:
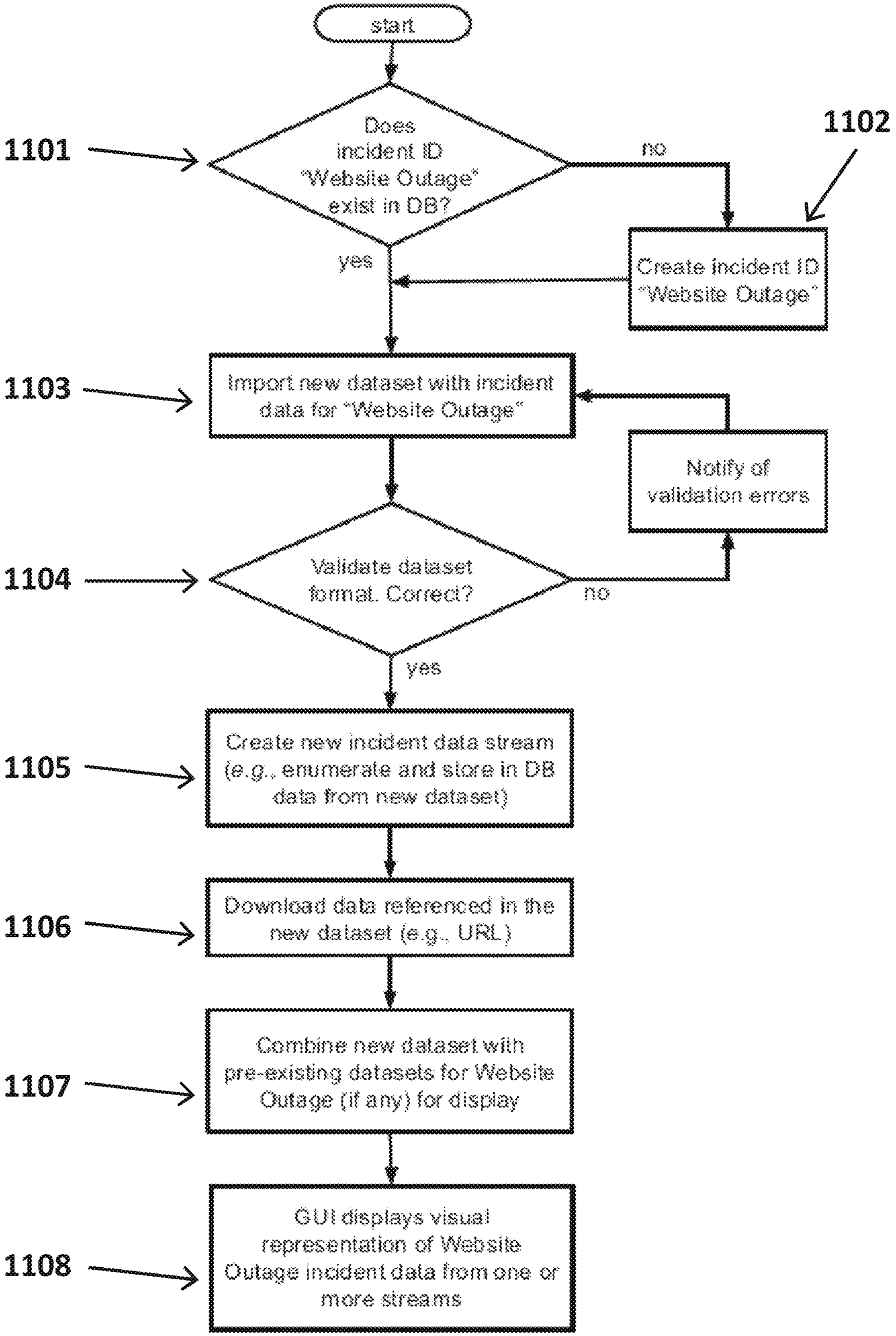
FIG. 4 is a diagram of a flowchart of an embodiment of the present invention.

FIG. 4 illustrates the use of an embodiment to visualize and analyze a website outage incident. If the incident has not been created, according to step 1101, in step 1102, a new incident "Website Outage" is created from the GUI 4. If the incident "Website Outage" already exists, the system skips 1102. In step 1103, a data set containing incident data associated with the Website Outage incident is imported, and the data set is validated in step 1104. If the data set format is correct, in step 1105 the incident data contained in the data set is enumerated and stored in the Database 1 as an incident data stream. If any incident data content (e.g., image, video, object file, etc.) is provided by a link or reference (e.g., URL, network or drive location) the content is retrieved from its referenced location in step 1106 and added to the stream. In step 1107 displayable incident data from all streams (e.g., enumerated incident data in data sets 24) associated with the Website Outage incident are aggregated for displaying, and in step 1108, the GUI displays a curated visual representation of the aggregated incident data permitting further manipulation, sortation, organization, annotation, tagging, grouping, etc.

An incident in steps 1101 and 1102 above refers to an analyzable incident, about which incident data exists, or can be collected, and organized into one or more data sets 24. An analyzable incident created within a system embodying the present invention comprises one or more incident identifiers, such as a name, title, label, number, or other identifier, corresponding to an analyzable incident. Incident data about the analyzable incident, including incident data from multiple data streams (e.g., enumerated data in data sets), may be associated with the incident identifiers for that incident thereby permitting all data to be manipulated and visualized as a whole. The incident identifiers may be used in step 1107 to aggregate all displayable incident data from multiple data sets 24 (or multiple streams) associated with the same analyzable incident.

The terms "stream" and "data set" are largely interchangeable for the purposes of the present description. A stream refers to enumerated data from a data set, which is stored in Database 1. A data set should be understood broadly to include any set, collection, or aggregation of incident data, in any form, that has been collected, created or provided in relation to an analyzable incident, including flat files (e.g., in CSV, TSV, XML, or other formats), data streams, or even a single datum. Data in a data set and in a stream is timed, for example by associating each datum with a timestamp. Examples of the incident data that can be found in a data set or a stream include: online chat records and logs (e.g., Slack, IRC, Microsoft Teams, etc.), text transcriptions of interviews, software application logs (e.g., app. error logs, access logs, etc.), audio or video recordings (e.g., video conferences, telephone "bridge" calls) or transcripts of such recordings, images, other records, traces, or artifacts produced by the anomalies, events, incidents, or accidents, including ex post facto interviews and summaries. Each datum in a data set or stream represents an event 32, which was recorded as having occurred at its associated timestamp in the data set/stream.

An event 32 in a data set/stream may be a portion of text, portion of audio, portion of a videoframe, or one or more video frames, images or portions thereof, computer generated message, alphanumeric sequence, or any other information. An event's timestamp indicates a point in time when an event 32 occurred, is believed to have occurred, or was recorded, and may be used to perform one or more of the following: (i) preserve the sequential order in which an event appears in a data set or among events in combined data sets 24; (ii) visualize or calculate the time between events; (iii) enable navigations within the data sets 24; (iv) allow displaying the correct event data depending on the selected time interval; (v) support correlation of these data with information from other sources; (vi) support inferences about communications between sources over time; (vii) support inferences about the ordering of related events. An event 32 may also have an event duration, which may be used for visualizing concurrent or overlapping events, analyzing whether an event lasted too long or too short (e.g., an alarm going off for a long time unnoticed), whether an event 32 did not complete properly or may have been interrupted, and various others. In situations where events represent communications, or request-response exchanges (e.g., transcript, trace, audio/visual format, etc.) event duration can help assess the circumstances, duration, and sequence of communications, for example whether a statement or action may or may not have been in response to a statement (e.g., if the response began prior to the end of duration of the statement).

Events 32 also may have an event source 35 or actor 35 (e.g., the source of the datum corresponding to that event), which may be a person or device that produced the event 32 (e.g., text, image, video, sound, alarm, computer notification, log entry, error code, etc.), for example a participant or observer of an incident, video or still camera, microphone, monitoring or trace software, computers, GPS trackers, sensors, and others. The actors, or event sources 35, of each event 32 may be part of the data set. For this disclosure the terms "actor" and "event source" are used interchangeably.

Embodiments of the invention allow a user to assemble, validate, and explore all or parts of a data set, and multiple data sets 24 associated with an incident, and to do so efficiently and non-destructively while producing a record of the user's activities. For example, an embodiment of the invention may perform one or more of: generating, manipulating, and comparing different views of data sets allowing a user to make inferences about anomalies, events, accidents or other occurrences associated with an incident; annotating the data sets so that user's inferences are recorded and become part of the enhanced data sets; and allowing the enhanced data together with the analytical references to be recorded, communicated, or supported by references to the original data sets 24. A user also may hide or unhide an entire stream/data set or the user may hide/unhide one or more individual actors (event sources) 35. Events from a hidden stream are not displayable regardless of whether the actor is hidden or unhidden. Events associated with a hidden actor also are not displayable regardless if those events are part of a hidden or unhidden stream. Only events by unhidden actors in unhidden streams are displayable.

Figure 5:
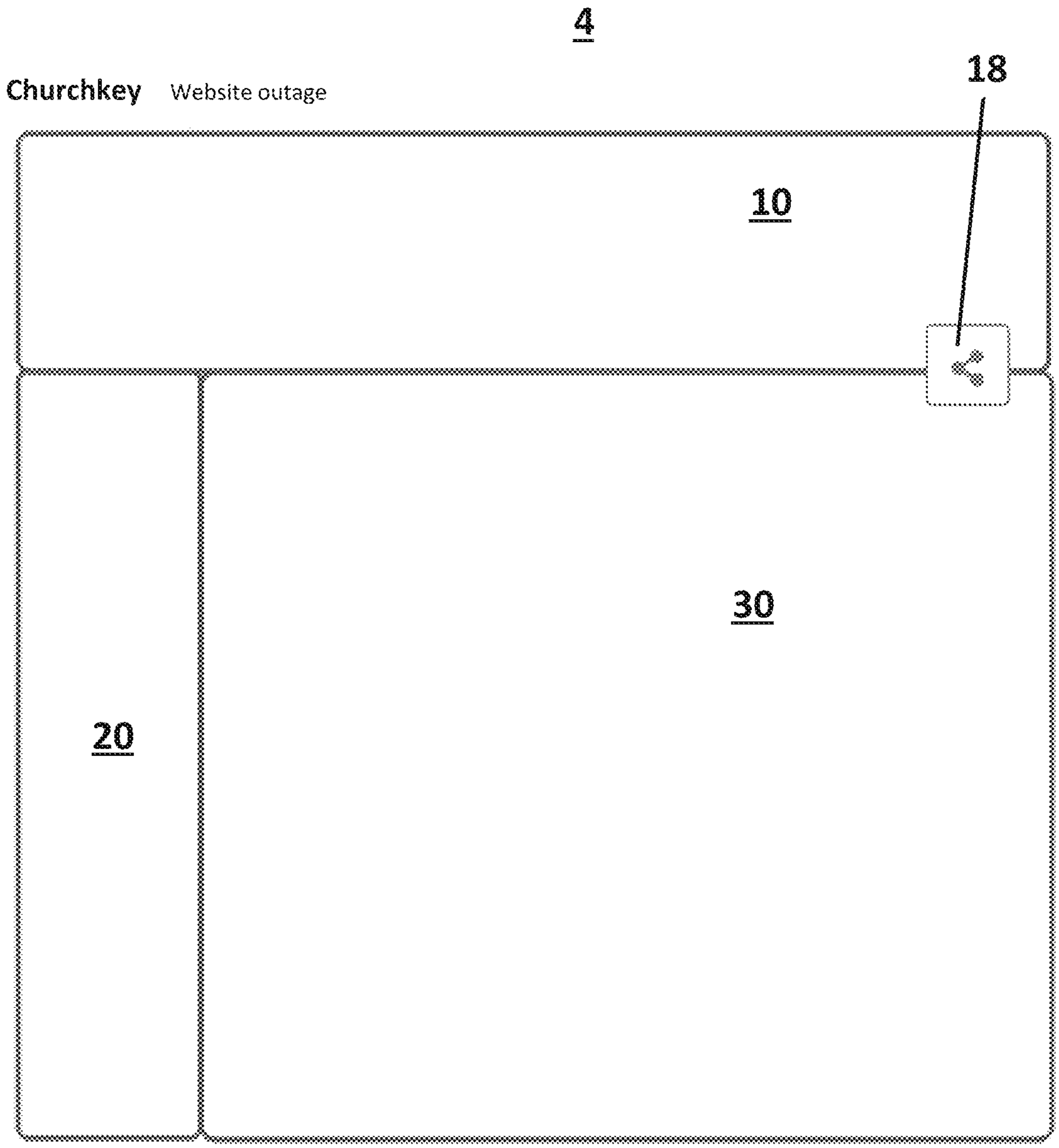
FIG. 5 is a diagram of a GUI in an embodiment of the present invention.
Figure 6:
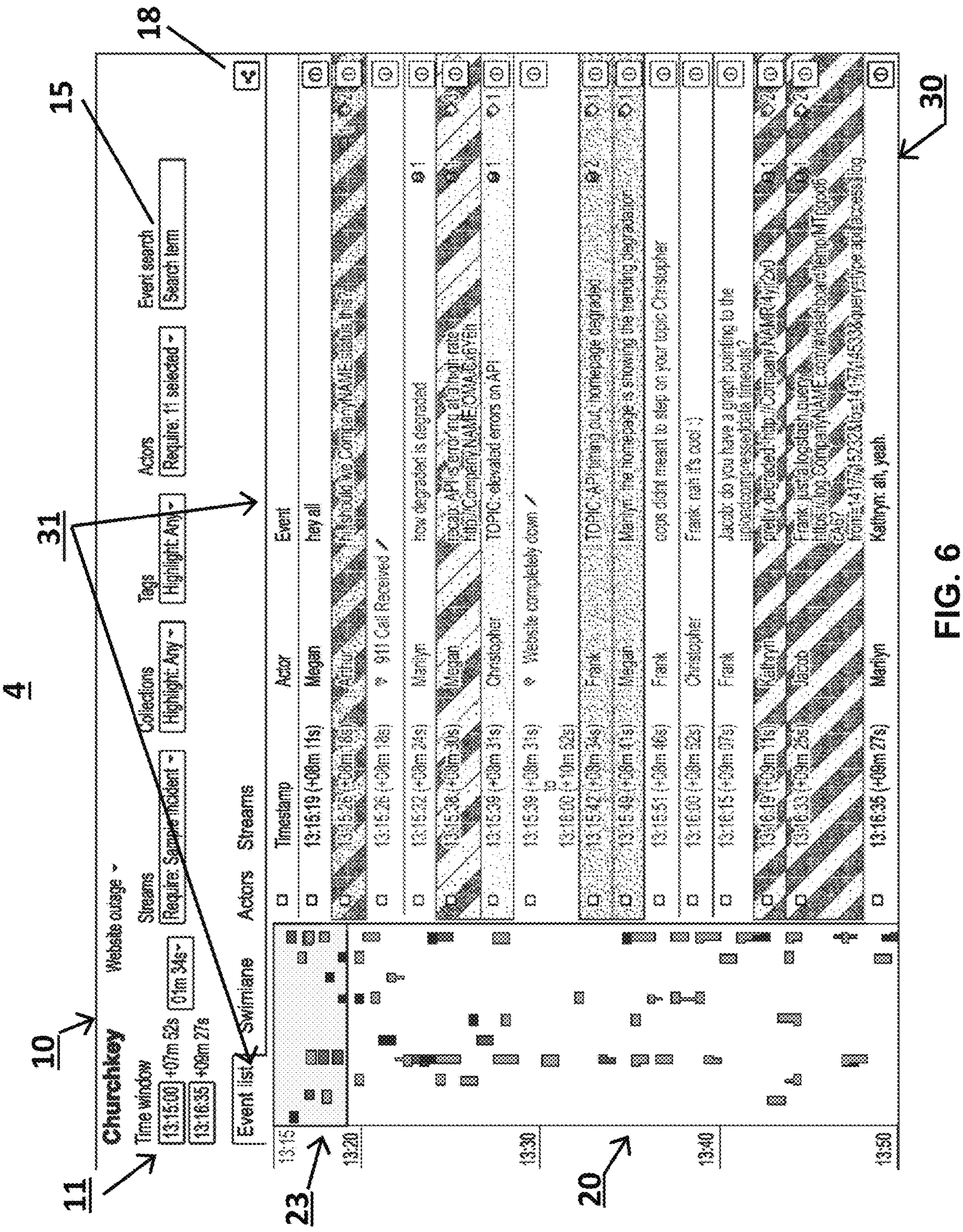
FIG. 6 is a diagram of a GUI in an embodiment of the present invention.
Figure 7:
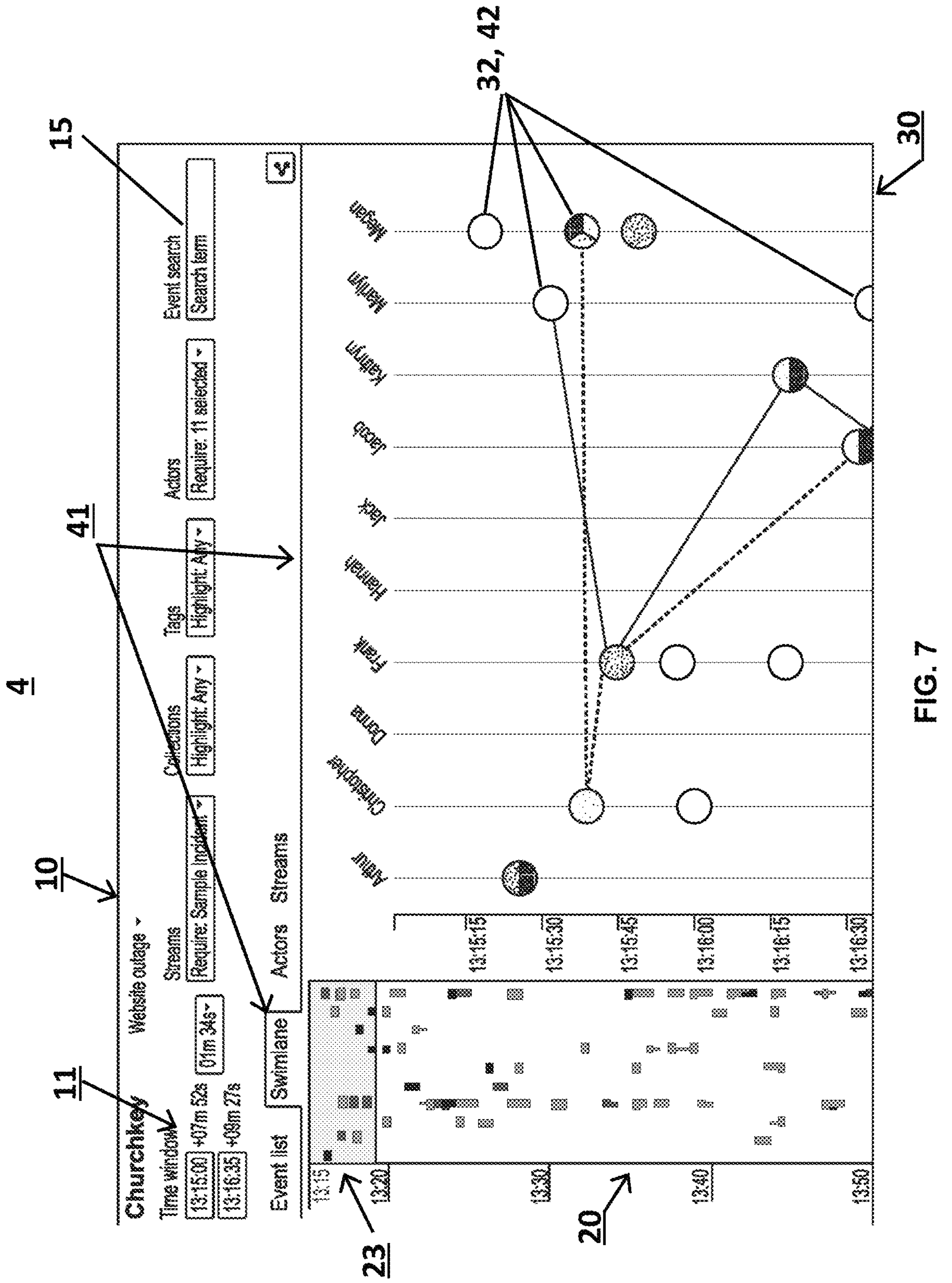
FIG. 7 is a diagram of a GUI in an embodiment of the present invention.

Displayable events are displayed in a Graphical User Interface 4, as illustrated in FIGS. 5, 6, 7. When displayable events originate from multiple data sets 24 all displayable events are interleaved via their timestamps. The Graphical User Interface 4 comprises a Control Panel 10, Event Mapping Panel 20, and an Annotation Panel 30. GUI 4 may further comprise an actors panel, streams panel, annotation management panel 199, Incident details panel 200, and event visualization panel 201 The GUI Panels 10, 20, and 30, are logically and graphically related in a unique manner that allows data to be visualized in parallel different but related perspectives on the data sets being represented. Embodiments of the invention further allow a user to specify, or adjust (e.g., magnify, or reduce) the time interval displayed in the Annotation Panel 30, show or non-destructively (e.g., without altering the data sets) hide one or more event sources on the Annotation Panel 30. Embodiments of the invention also allow a user to switch the Annotation Panel between different views while maintaining the data manipulation and the time interval of displayed data between views. Embodiments of the invention also allow users to share the current visualization state of GUI 4 and/or display module 2 by using the Share Control 18. For example, clicking the Share Control 18 may cause the system to generate a reference (e.g., a URL) which represents the viewable state of the GUI 4 and display module 2 (e.g., displayable events, time filtering, display time interval, tags, collection, highlighting, and other data visualizations rules). The reference may then be shared with others (e.g., sitting at a different location) who upon following the reference will be able to view the GUI 4 in the state recorded by that reference.

Figure 10:
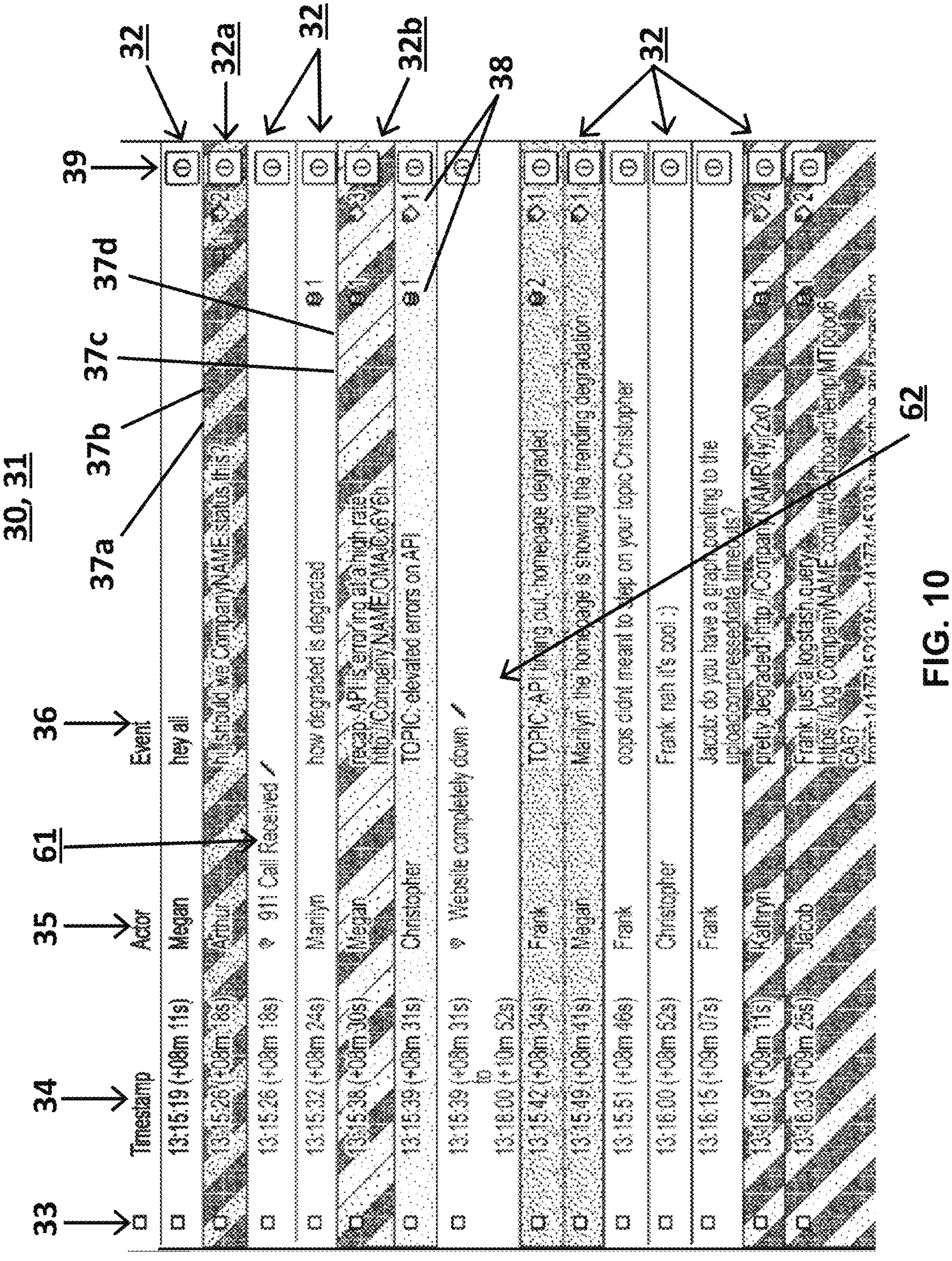
FIG. 10 is a diagram of an Event List View of a GUI in an embodiment of the present invention.
Figure 11:
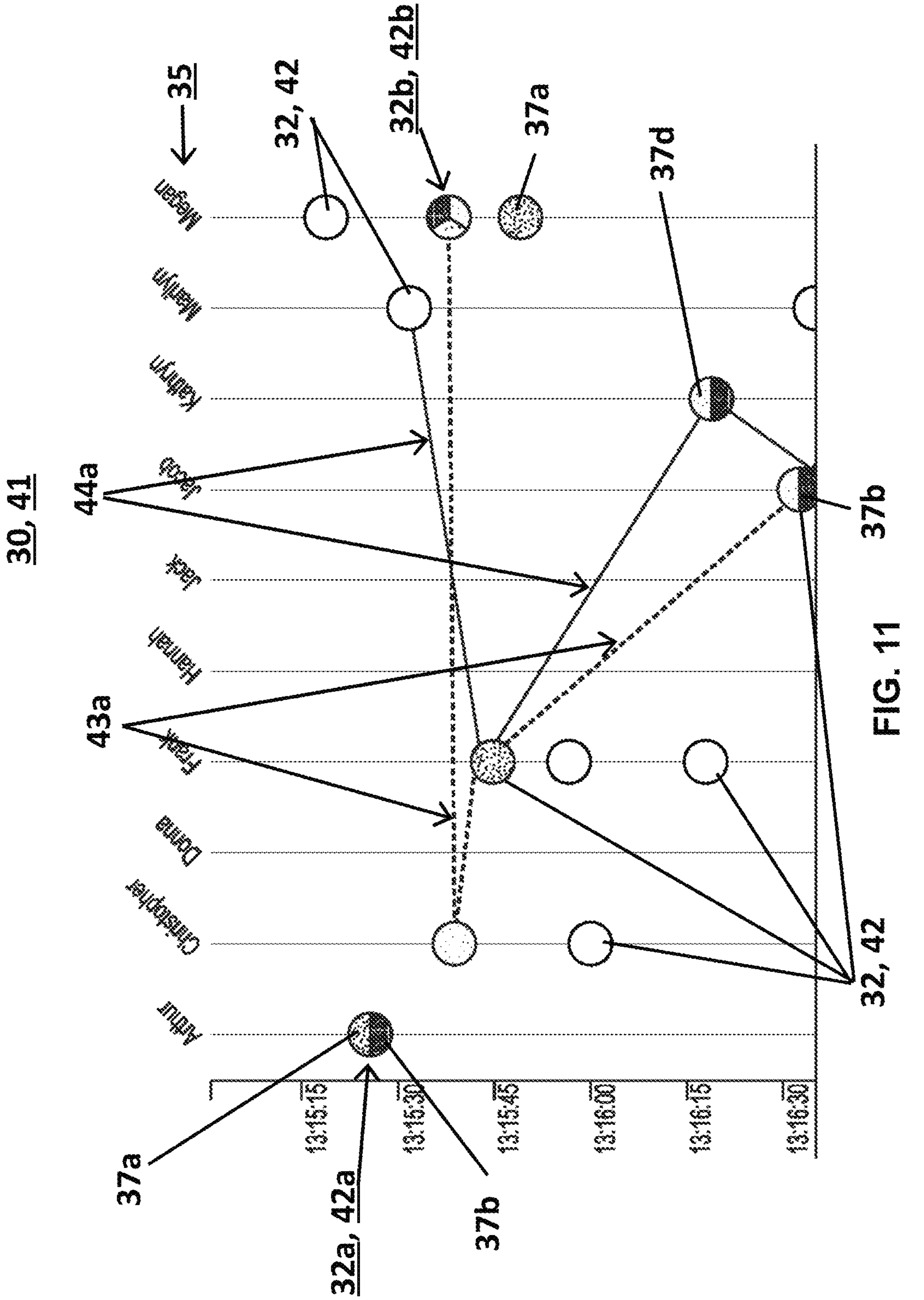
FIG. 11 is a diagram of a Swimlane View of a GUI in an embodiment of the present invention.
Figure 12:
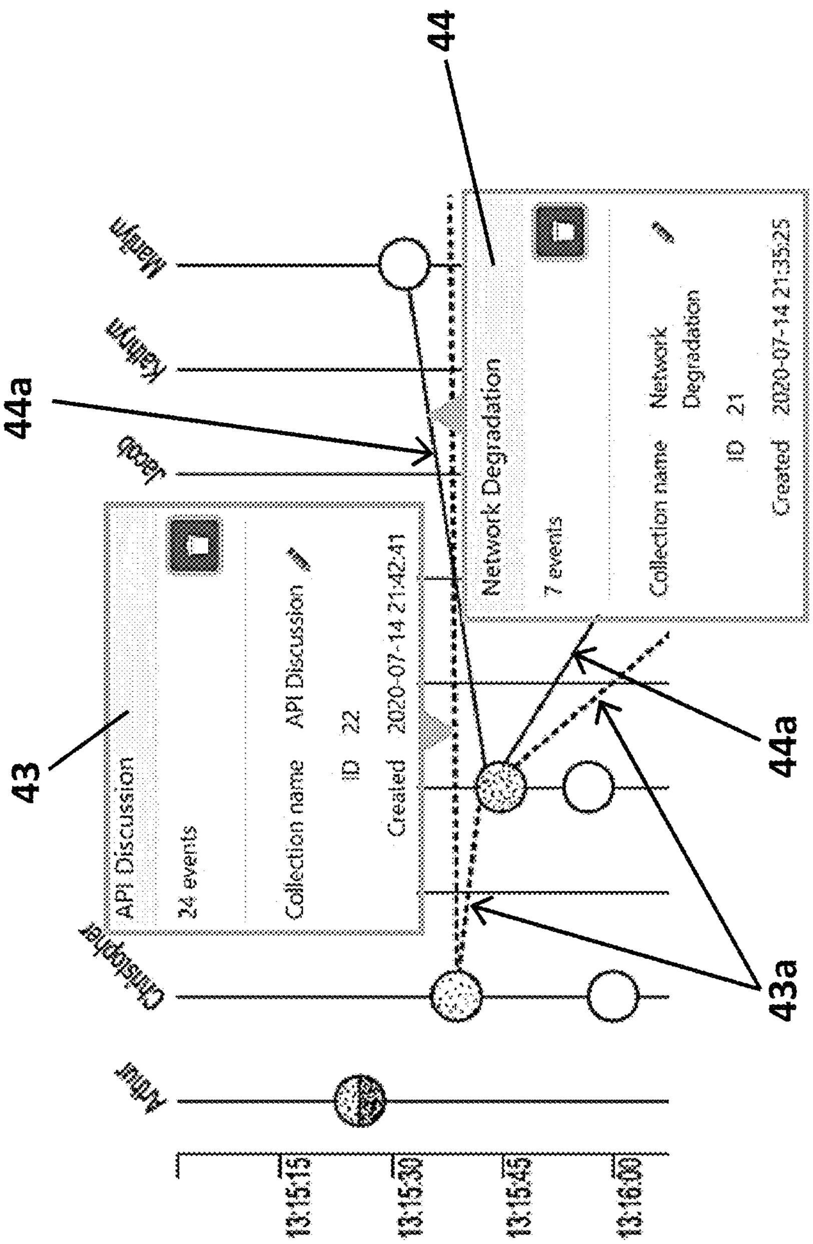
FIG. 12 is a diagram of visual user controls in an embodiment of the present invention.
Figure 15A:
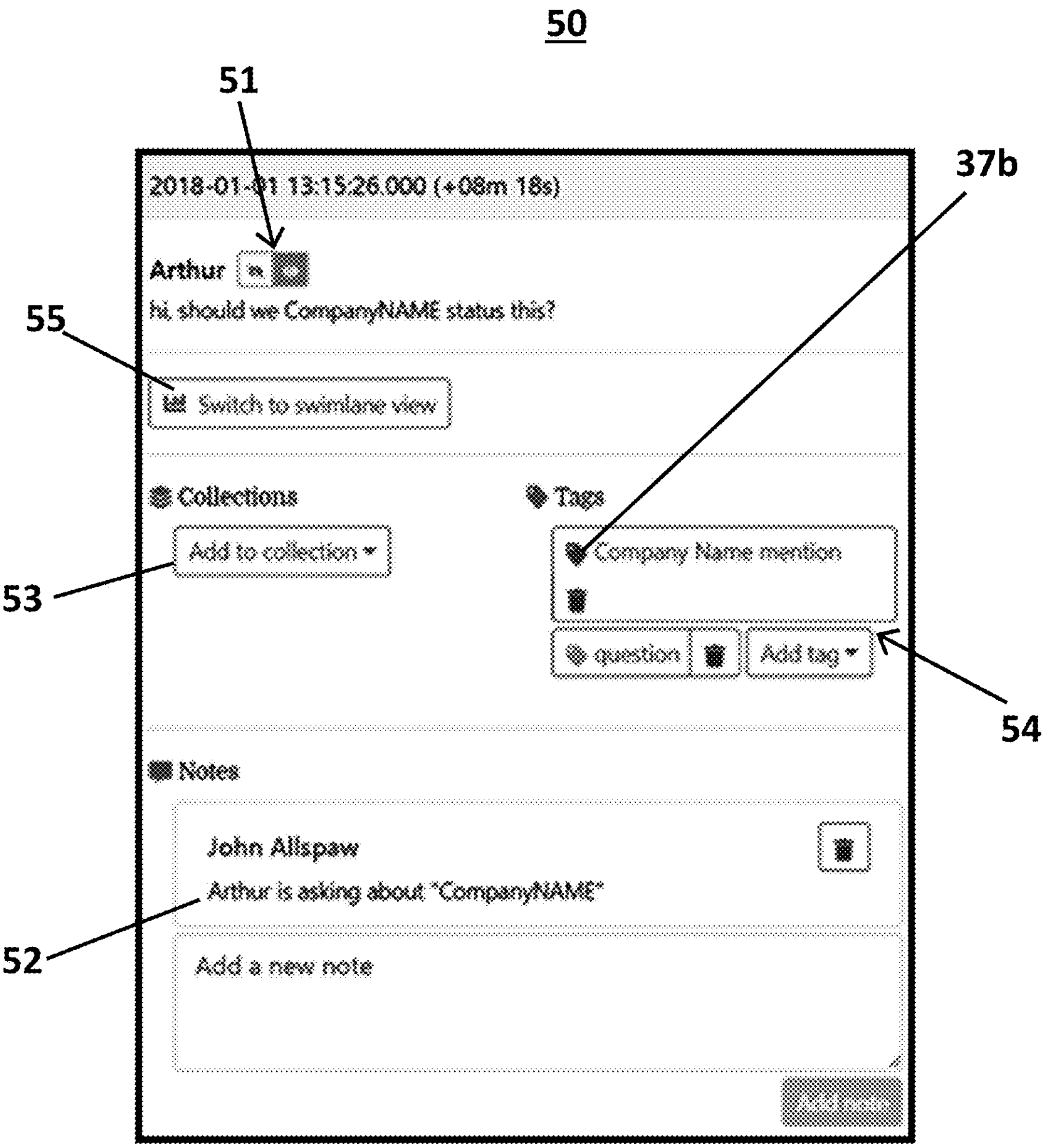
FIG. 15A, 15B are diagrams of an Event Control Panel in an embodiment of the present invention.
Figure 15B:
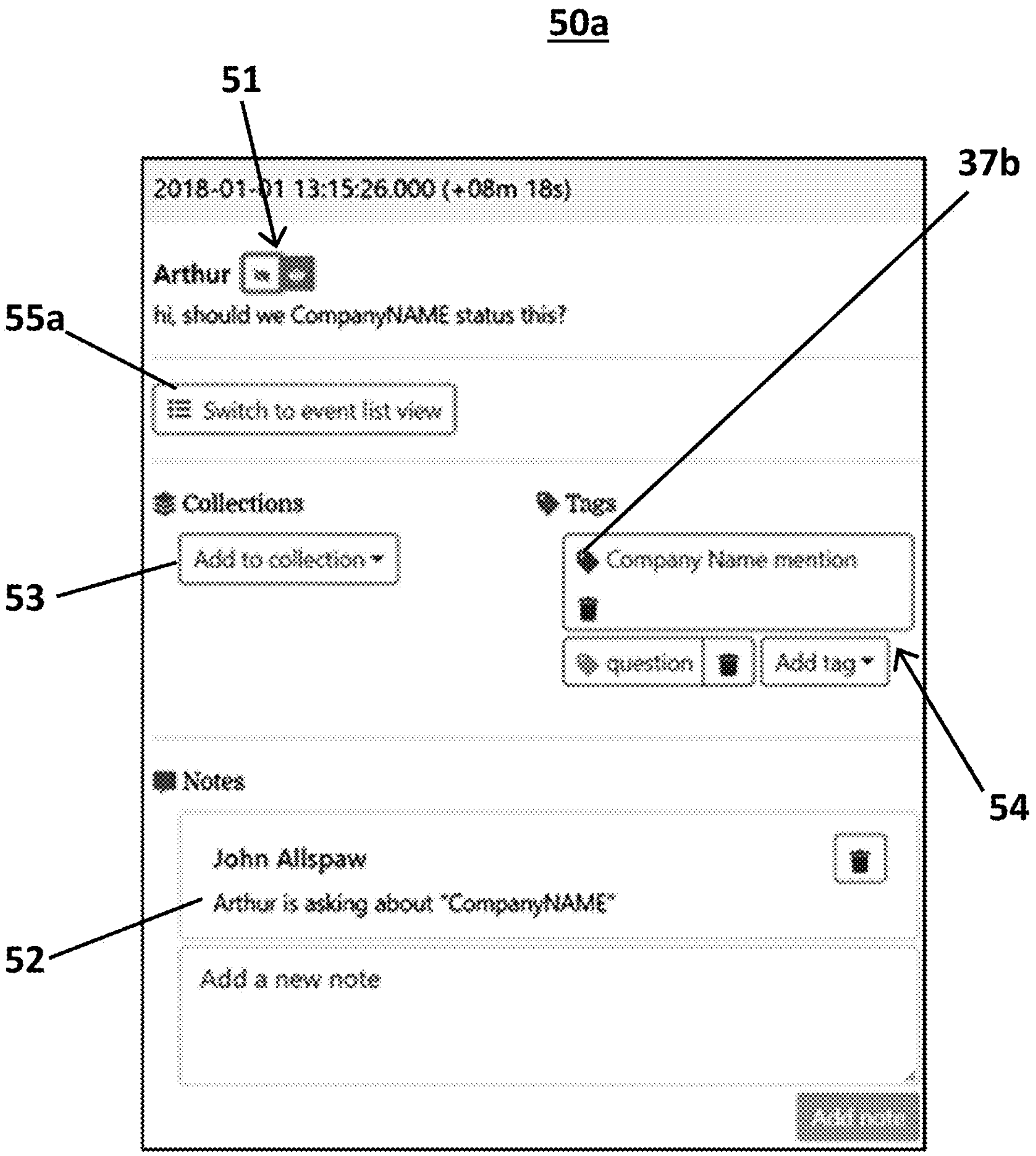

One or more events can be grouped into an event collection 43, 44, as illustrated in FIGS. 11, 12, and each event may participate in one or more event collections. Each collection may have a unique identifier, and/or a descriptive name, for example "API Discussion" for collection 43, or "Network Degradation" for collection 44. Events may be tagged (or associated) with one or more tags 37*a*, 37*b*, 37*c*, 37*d*, as shown for example in FIGS. 6, 7. FIGS. 15A and 15B, as discussed in more detail below, illustrate one way of creating tags and associating tags with events 32. Each tag may have a unique visual characteristic or identifier (e.g., color, patterns, shape, icon, etc.), and/or a descriptive name. For example, Tag 37*b*, which may be red on a color display, has a name "Company Name mention," and is illustrated in FIGS. 6, 7, 10, 11 with a stippling (dotted) pattern with 25% dots. Other tags illustrated in the Figures include 37*a*, 37*c*, and 37*d*, each shown with a different stippling.

Figure 8:
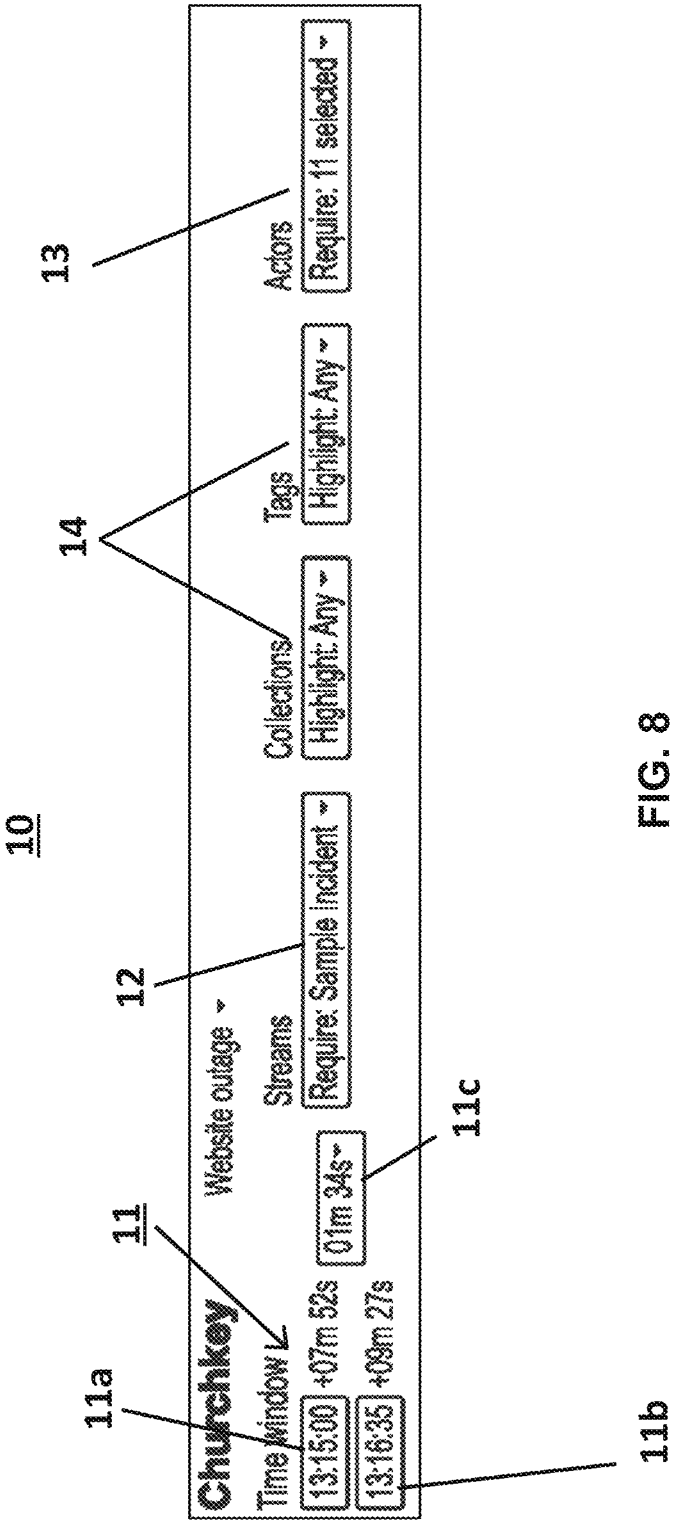
FIG. 8 is a diagram of a Control Panel of a GUI in an embodiment of the present invention.

An embodiment of a Control Panel 10, illustrated in FIG. 8, may include various user controls, for example display time interval control 11 for adjusting the display time interval, Hide/Unhide controls 12, 13 for hiding or unhiding one or more streams and/or one or more actors (event sources), and highlighting controls 14 for highlighting collections of events and highlighting tags 37 associated with events. When an event collection 43, 44, is highlighted the Annotation Panel 30 and Event Mapping Panel 20 may visually indicate which events belong to which event collection. When a tag 37, 37*a*, 37*b*, 37*c*, 37*d*, is highlighted the Annotation Panel 30 and Event Mapping Panel 20 may visually identify events associated with the highlighted tag. The Control Panel may also include a search box 15 for searching events. The time interval control may also indicate the start time 11*a*, the end time 11*b*, and duration 11*c* of the display time interval.

Figure 9:
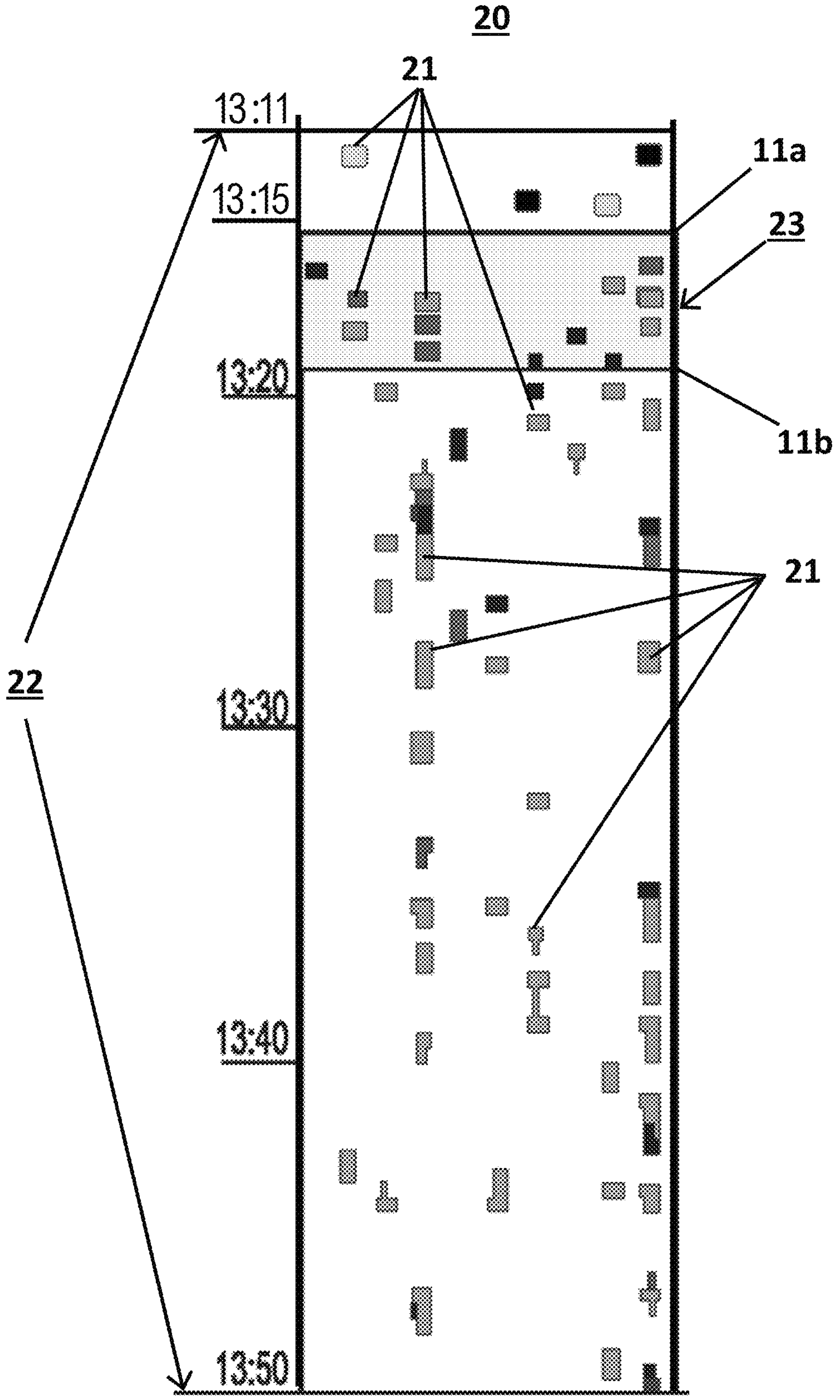
FIG. 9 is a diagram of an Event Mapping Panel of a GUI in an embodiment of the present invention.
Figure 14:
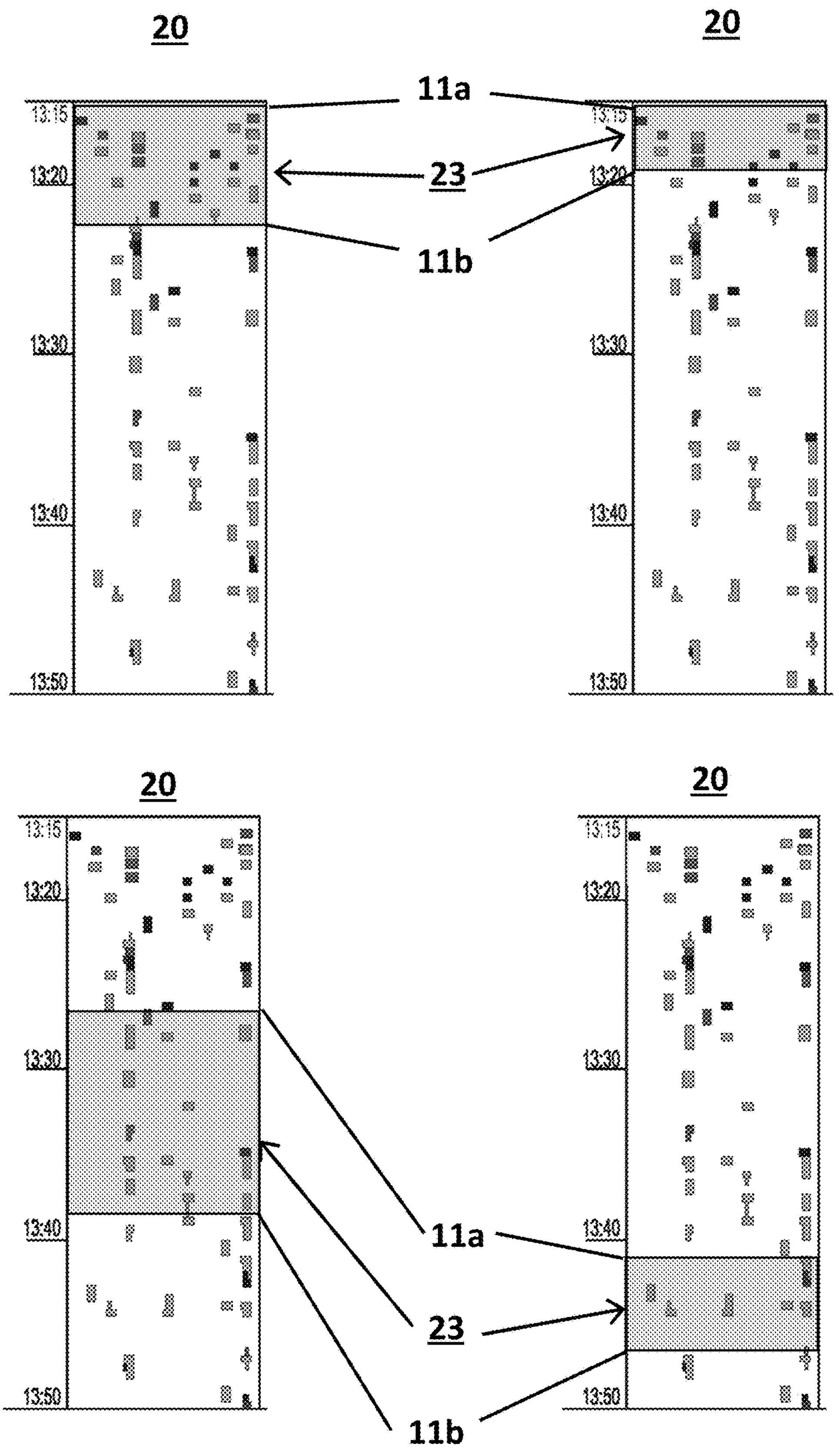
FIG. 14 is a diagram of multiple views of an Event Mapping Panel of a GUI in an embodiment of the present invention.

In the Event Mapping Panel 20 illustrated in FIG. 9 each displayable event is visually represented by an event symbol 21. Event Mapping Panel 20 displays event visual representations in the form of event symbols 21 of all displayable events during the entire incident time period 22 for which data is present in the data sets 24. Each event symbol 21 may indicate if an event is associated with one or more event tags 37, 37*a*, 37*b*, 37*c*, 37*d*, (distinguished, e.g., by color, pattern, etc.), for example, as illustrated on FIG. 9, by shading the appropriate event symbol 21 in different shades of grey. The Event Mapping Panel comprises a user adjustable display time interval selection graphic 23 that highlights the display time interval 11*a-b* for which events 32 are displayed in the annotation panel and corresponds to the display time interval in control 11 in the Control Panel 10. A user may adjust the interval selection graphic 23 by clicking (or touching) and dragging the start time 11*a* (top border) or end time 11*b* (bottom border) of the graphic 23 to enlarge or reduce the display time interval, or a user may move the entire graphic 23 along the timeline to select a different time interval, as illustrated on FIG. 14.

Events from one or more data sets 24 corresponding to the display time interval 11*a*-11*b*, or for short, 11*a-b*, selected in the Control Panel time interval control 11 or in Event Mapping Panel graphic 23 are displayed in Annotation Panel 30. Annotation Panel 30 may show displayable events in Event List View 31, or Swimlane View 41. The selected display time interval together with the portions of the data sets 24 appearing in the Annotation Panel 30 are visually highlighted in the Event Mapping Panel using the graphic 23, as explained above. This allows an analyst to examine a specific period within the data set while maintaining orientation regarding the selected display time interval's relation to the entire incident time period 22, and the number of events in the selected display time interval in relation to the events in the entire time period 22.

The Annotation Panel 30 and Event Mapping Panel 20 are linked via the Control Panel 10 allowing manipulation of the Annotation Panel's time interval by setting the selected time interval's start and end point from the Event Mapping Panel, or by entering the start time and end time into the Control Panel. Any changes in the interval selection graphic 23 will be reflected in the interval control 11 in the Control Panel 10, and vice versa. Changes in either the interval selection graphic 23 or display time interval control 11 will update the events 32 displayed in the Annotation Panel 30.

The GUI 4 allows the data in the Annotation Panel to be displayed in different representations or views that annotate the data. An embodiment of the invention allows data to be displayed in a Swimlane view 41, illustrated in FIG. 11, or in Event List view 31, illustrated in FIG. 10, and enables easily switching between the two views while maintaining selected display time interval, annotations, and other data manipulation. In Swimlane view 41 the data visualization allows easy observation of number, frequency and cadence of events during the selected time interval, as well visual identification of sources who were active during the interval. In Event List 31 view the data visualization allows easy visual examination of the exact sequence of events.

The Swimlane View 41 of the Annotation Panel, FIG. 11, is a graphical representation of displayable events from one or more unhidden data sets with the timestamps along the vertical axis, and actors along the horizontal axis. Each unhidden event source (or actor) 35 is represented as a column ("actor column"), in which each event 32 is represented by an event icon 42, so that the tempo and frequency of contributions from each source/actor is directly visually perceptible. The heading of each actor column identifies the event source (actor) 35 of the displayable events 32 in the actor column. For events for which an actor is not available (e.g., not provided in the data set, unknown, uncertain, etc.) the heading of actor column may be left empty, or may be indicated, for example, as "unknown," "unavailable," or similar. In Swimlane View each displayable event 32 is represented by an Event Icon 42 (e.g., geometric figure, image, thumbnail, emoji, etc.) that may be augmented to show the event's participation in a highlighted collection 43, 44, or the event's association with one or more highlighted tags 37*a*, 37*b*, 37*c*, 37*d*. For example, each highlighted collection may be represented by a line 43*a*, 44*a*, with characteristics (e.g., line style, color, weight) corresponding to that collection. Events belonging to a collection may be visualized by connecting the events from that collection with a line characteristic of that collection. For example, in FIG. 12, collection "API Discussion" 43 is represented by a dashed line 43*a*, while collection "Network Degradation" 44 is represented by a solid line 44*a*. Instead of dashed and solid lines, different collections may be visually represented using different visual characteristics, for example different types of dashed lines (e.g., longer or shorter dashes, dotes, or combinations thereof), different colors, line weights or thicknesses, and combinations thereof.

Figure 13:
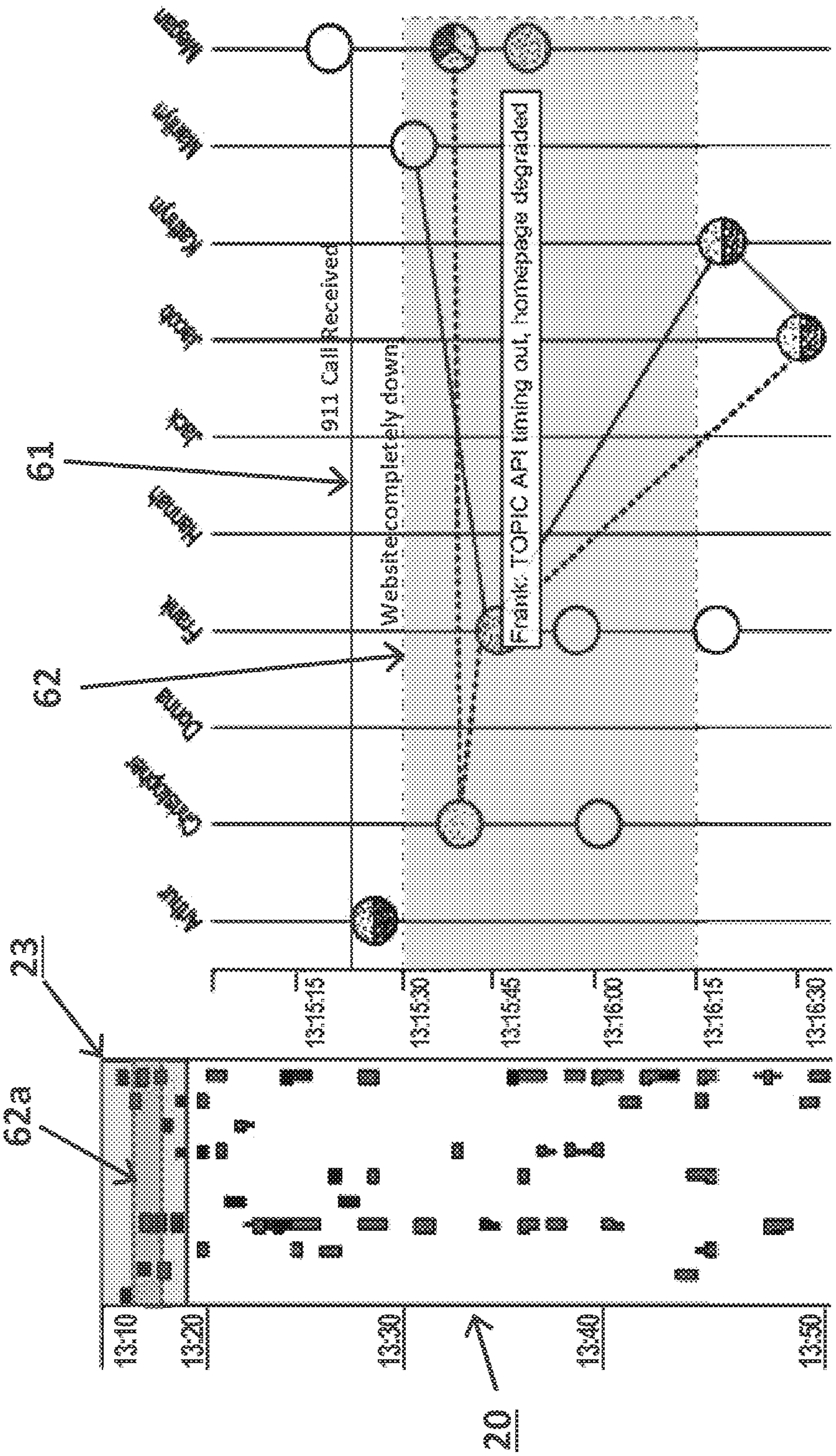
FIG. 13 is a diagram of a Swimlane View of a GUI in an embodiment of the present invention.

The Event Icons 42 may contain color, shading, patterns, images, or other visualization/visual characteristics representing event tags. For example, in one embodiment, the event icons 42 are circles containing one or more colors (represented as different levels of stippling in the Figures) indicating how many, and which highlighted tags 37, 37*a*, 37*b*, 37*c*, 37*d* each event is associated to. For example, event icon 42*a* visually indicates that event 32*a* is associated with two highlighted tags 37*a* (Green-"Homepage Mention"), and 37*b* (Red-"Company Name"). Similarly, Event icon 42*b* illustrates three tags associated with event 32*b*. The event icon 42 may be utilized to perform different functions, for example to view the content of an event, to annotate the event, to rearrange the actor columns, and others. For example, hovering over an event icon may show the event content (e.g., text, image, etc.) as illustrated in FIG. 13, while clicking on the icon displays an event information and control panel ("Event Control Panel") 50*a* illustrated in FIG. 15B. A user may also drag an event icon to rearrange the view, for example by re-positioning the actor (event source) column to which the dragged event belongs. Instead of hover, click, and drag, a user may single click, double click, right or left click, touch with one or more fingers, etc., on the event icon to display the content, invoke the Event Control Panel 50*a*, or to perform other functions.

Event List View 31 is a tabular representation in which each event may be represented by a horizontal arrangement (e.g., an event row) showing the content of the event (e.g., image, text, etc.), and one or more of the event's timestamp, event source, and other details that may be available. As illustrated in FIG. 10, Event List View 31 displays events 32 from one or more unhidden data sets in vertical chronological order, with the timestamps displayed along the vertical axis in a manner that corresponds to the way that sequential or time-stamped data is normally represented by the output of commands entered from the command line, e.g., in the way that a person would see this data displayed by the computer programs usually used from the command line. The event list view 31 may comprise a selection box 33, an event timestamp 34, an event source 35, event content 36, event origin data set (not shown), representation of tags or other annotations (e.g., through color coding, patterns, etc.) 37*a*, 37*b*, 37*c*, 37*d*, visual indicators 38 of the event's association with one or more tags and/or event collections, and at least one associated user control 39. For example, as FIGS. 10, 11 illustrate, event 32*a* with a timestamp 34 of "13:15:19" from event source 35 of "Arthur" is associated with tags 37*a*, 37*b*. Similarly, event 32*b* with a timestamp 34 of "13:15:38" from event source 35 of "Megan" is associated with three tags 37*b*, 37*c*, and 37*d*. The associated user control 39 may be utilized to annotate (for example by adding a note, a tag, adding the event to a collection, etc.) the event, hide or unhide actors, switch the Annotation Panel 30 to a different view, and other functions. In some embodiments, shown in FIGS. 10, 15A, the associated user control 39 is a button, which displays Event Control Panel 50. In some embodiments, shown in FIGS. 11, 15B, the associated user control 39 is a button, which displays the Event Control Panel 50. In event list view actor 35 identifies the event source (actor) of the displayable event 32. For events for which an actor is not available (e.g., not provided in the data set, unknown, uncertain, etc.) the actor 35 may be left empty, or may indicate, for example, "unknown," "unavailable," or similar.

Event Control Panel 50, 50*a* shown on FIGS. 15A, 15B, displays available information about an event 32, and may also provide user controls, for example Hide Control 51 to hide or unhide all events from the event's actor; Note Control 52 to add notes to an event; Collections Control 53 to add the event to an event collection 43, 44, or to create, label, and retrieve event collections 43, 44; Tag Control 54 to create and attach Tags 37*a*, 37*b*, 37*c*, 37*d*, to events. Event Control Panel 50, 50*a* also provides a View Control 55, 55*a* that switches the view of the Annotation Panel 30 from Event List View 31 to Swimlane View 41, and from Swimlane View 41 to Event List View 31.

Figure 16A:
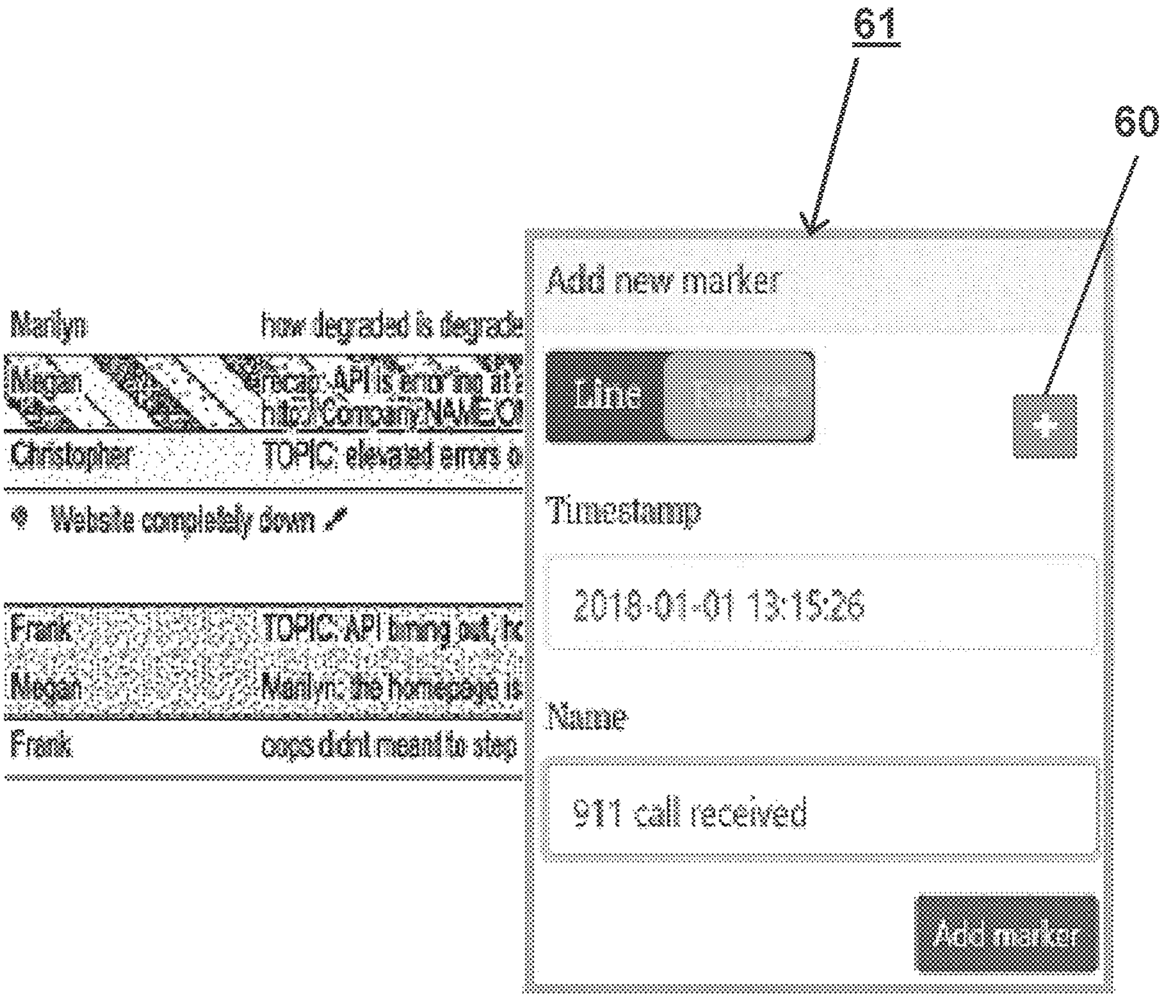
FIG. 16A, 16B are diagrams of visual user controls in an embodiment of the present invention.
Figure 16B:
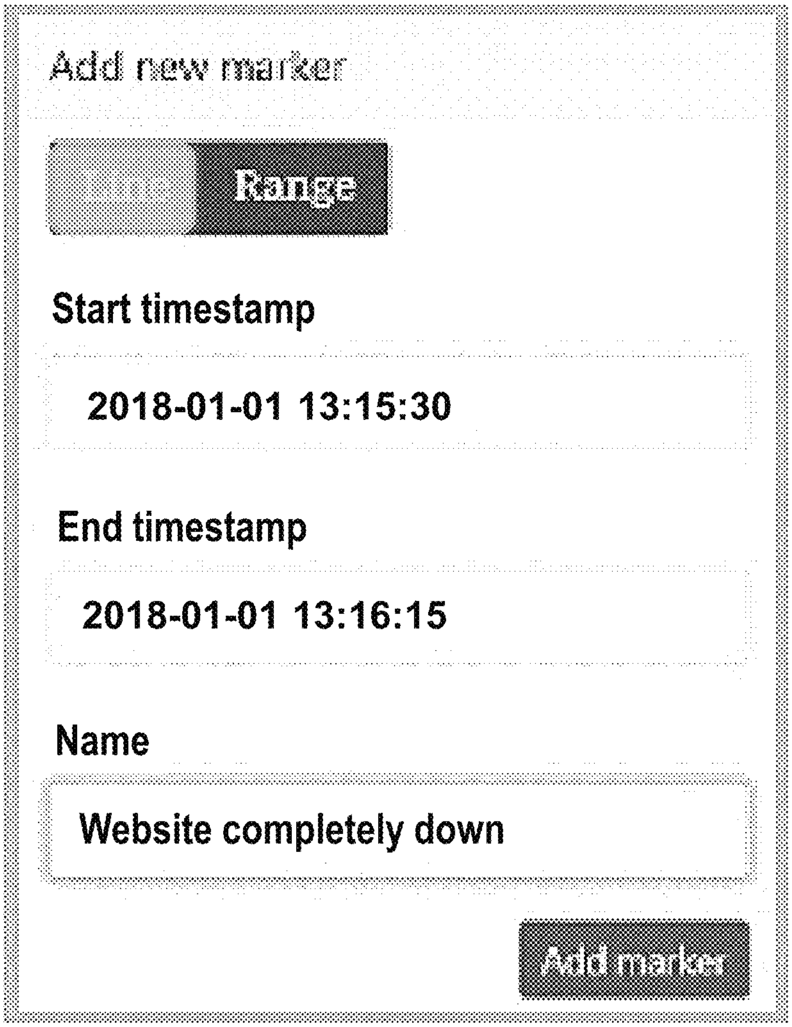
Figure 17:
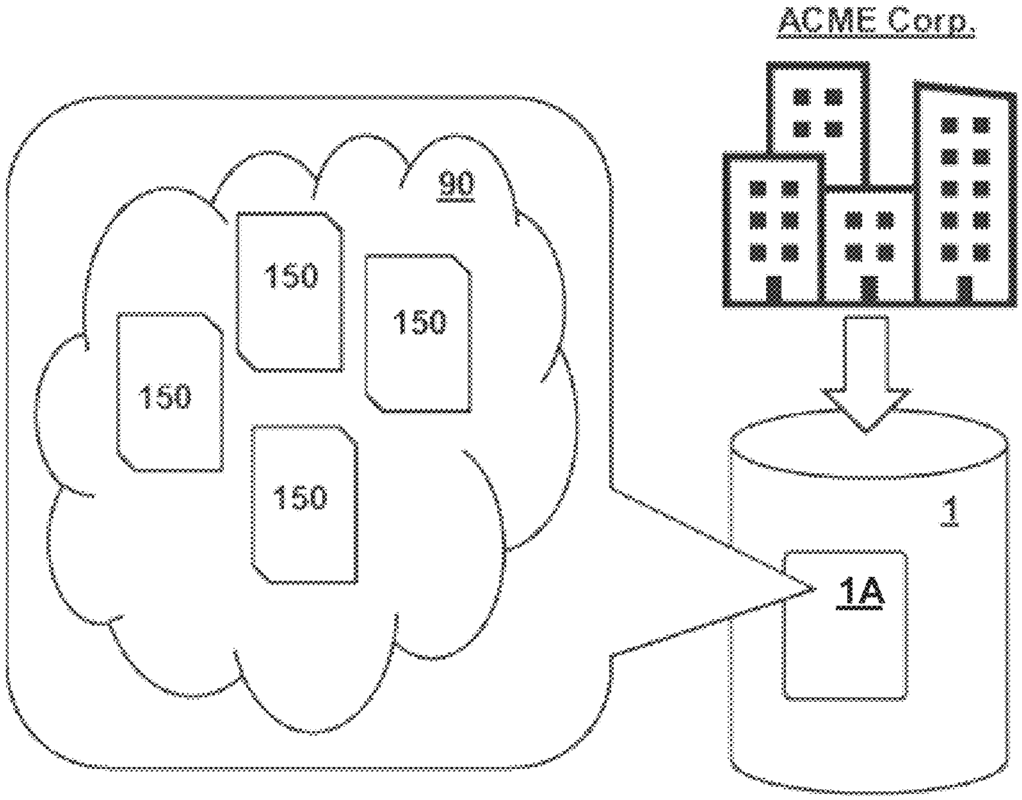
FIG. 17 is a diagram of an embodiment of the present invention.

The Annotation Panel 30 may also provide a user marker control 60 that when activated brings up marker control panel illustrated on FIGS. 16A, B, allowing the creation of Markers 61 or Marker ranges 62, visually indicating a specific time (e.g., "Line") or time range (e.g., "Range"). Markers may represent occurrences 63 or circumstances 63 that may be important to the analyzable incident, for example time of "911 call received" marker 61, or time range of "Website completely down" marker range 62. The Annotation Panel 30 provides visual indications of Markers 61 and Marker Ranges 62 as illustrated on FIG. 13 for Swimlane View 41, and on FIG. 10 for Event List View 31, allowing observation of events that occurred contemporaneously with occurrences 63 or circumstances represented by the Markers or Marker Ranges. The Event Mapping Panel 20 also may visualize the location of Markers 61 (not shown) and the range 62*a* of Marker Ranges 62.

Embodiments of the invention may be configured to differentiate between different users and users' roles, for example based on log-in credentials and authentication. To achieve such differentiation, a system according an embodiment of the invention may detect a user's identity (e.g., through IP address, cookies, etc.), or GUI 4 may provide user log-in or authentication controls and require users to provide to log-in and authenticate before accessing data 1A. The system may utilize an identity authentication and management (IAM) system that may be external to the system or may be incorporated within the system. Users may have different roles, such as data analysts who may be responsible for analyzing and annotating data 1A, data managers and data admins who may be responsible for importing data and maintaining data and database integrity, supervisors, technicians, managers, and others. Systems according to this invention may be configured to recognize a user's role and allow access according to the user's role, or the systems may be configured to prevent users from accessing certain functionality and data based on the user's identity, role, or both.

Embodiments of the invention may be configured to comprise workspaces, or environments, allowing granular access to data and functionality associated with individual users ("user workspace"), associated with a particular user role (referred to as role "environments," for clarity), or both. Workspace and environment are used interchangeably here, to designate a data collection associated with a user, a user role, or both. Data records may be associated with, or part of, one or more workspaces or environments. For example, all analyst users may be allowed to view and/or change certain incident data, for example certain types of cross-incident connections, incident and event notes, and incident and event links, while not allowed to view and/or change other types of incident data. Embodiments of the invention may associate user-created incident data with a user workspace and/or a role environment. For example, an analyst-user-created incident and event tags, notes, links, cross-incident connections, and other incident data may be associated with the user workspace of the user who created them, and also may be associated with an analyst environment containing incident data created by multiple analysts. Embodiments of the invention may then enable only a user associated with a workspace or environment to view and/or modify data therein. For example, an analyst-user may be allowed to modify user-created information only in that analyst-user's workspace, and/or may be allowed to view, but not modify, user-created incident data in the analyst environment. In another example, a user with a manager role, may be allowed to view and modify all user-created incident data in the analyst environment, but not in a data admin environment.

Figure 18:
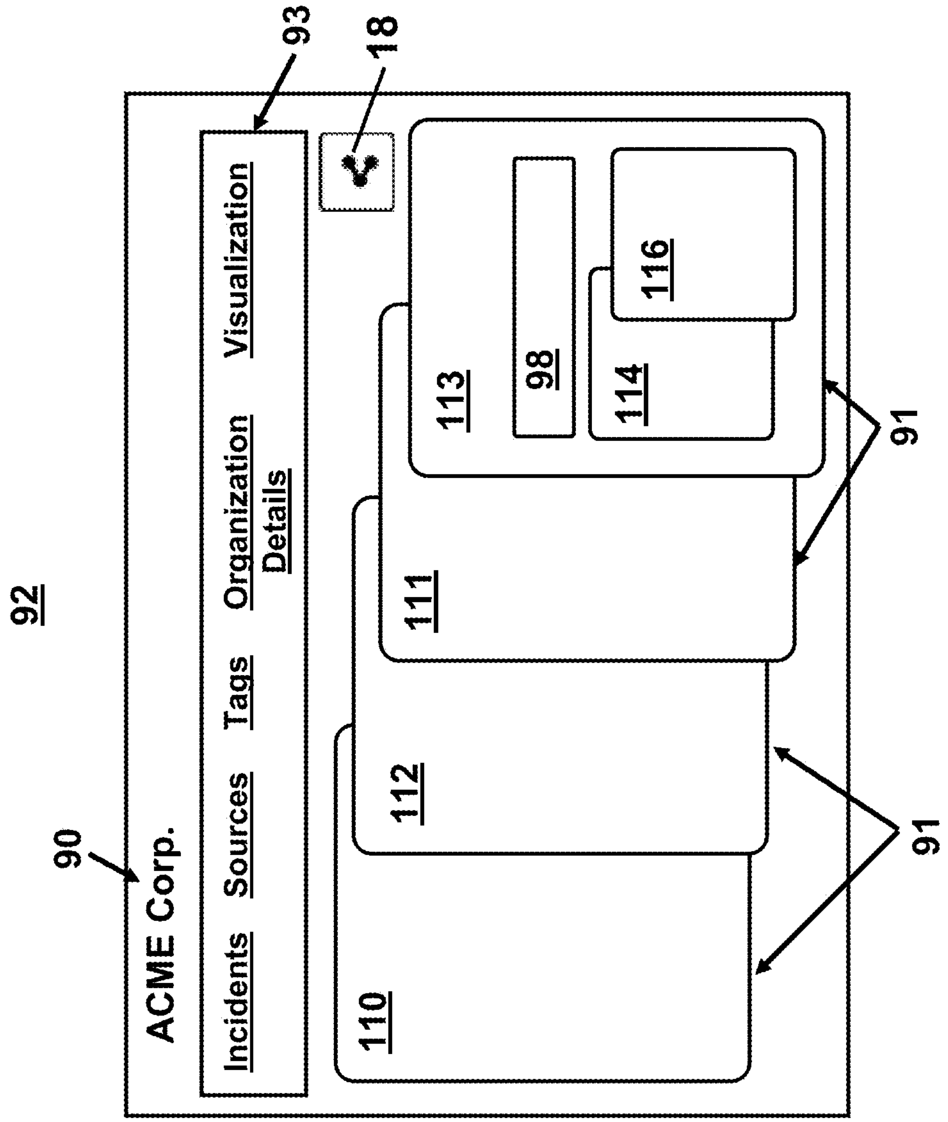
FIG. 18 is a diagram of an embodiment of group interface in an embodiment of the present invention.

Embodiments of the invention may be used to explore and analyze one or more incidents to facilitate researchers performing incident analysis by facilitating the process of analyzing a group of incidents that share some commonality. Embodiments of the invention may comprise a grouped incident 150, which may be an analyzable incident belonging to a group 90 of analyzable incidents included in group 90 based on a commonality among the grouped incidents 150. For example, the grouped incidents 150 may be associated with a person, organization, business, other entities, or an association of any of the foregoing. In another example, group 90 may only include incidents 150 related to particular type of occurrences (e.g., internet service outages, data breaches, power grid failures, transportation accidents, electric vehicle malfunctions), related to particular equipment or machinery (e.g., specific make or model of a vehicle, networking or computing device, appliance, and others), or having other commonalities. For ease of reference, but without limiting the scope of the present disclosure, in the described embodiments group 90 represents an organization, for example "ACME corp." As illustrated in FIG. 18, 29, and grouped incidents 150 are incidents occurring within, or affecting, that organization.

Grouped incident information 151 may comprise any information or data related to an incident, grouped incident event 148, or incident event source 149, including, one or more of incident name 152, incident description 153 (e.g., any information relevant to an incident), incident time data 154, incident data source (e.g., link, URL) 158, cross-incident connections 159, 161, incident notes 163, and associated incident tags 180. Grouped Incident information 151 may also comprise incident resource links 164 to materials and other information that a user, such as analyst may find helpful while viewing an incident. Incident time data 154 may comprise one or more of incident start time 154*a* (e.g., the timestamp of the first incident event 148), incident end time 154*b*, incident duration 154*c*, incident create time 154*d* (e.g., the time of incident creation in database 1). Incident name 152 may be any information used to identify a grouped incident 150, and may comprise information suggesting date, time, location, type, category, abbreviations, and others about a grouped incident 150. Incident data source 158 preferably is a link to incident data in database 1. Incident data source 158 may be used to enable a user to access incident data of grouped incident 150 and may also be used to link one or more grouped incidents 150 through a cross-incident connection 159, 161.

Cross-incident connection 159, 161 comprise information indicating that grouped incidents 150 are connected, linked, or related. For example, a grouped incident 150 may have a cross-incident connection 159, 161 to another grouped incident 150. Information of a cross-incident connection may comprise an incident name 152*a* of another grouped incident 150*a* or may comprise a link to an incident data source 158*a* of another grouped incident 150*a*. Cross-incident connection 159, 161 may be of several types. A preferred embodiment comprises a first type of incident connection 159, which will be referred to as an explicit incident connection 159, and a second type of incident connection 161, which will be referred to as an inferred incident connection 161.

The first type of incident connection, an explicit incident connection 161, may be a cross-incident connection (or link between incidents) that is part of incident data, or the data streams containing the information of events 32. Explicit incident connection 161 is part of the event data that is stored as part of grouped incident information 151. An explicit incident connection 161 may automatically be detected in an embodiment of the present invention, for example while importing the data into database 1, step 1001 of FIG. 1, or during steps 1103-1107 as shown in FIG. 4; or after the incident data is stored into database 1. GUI 4 may also be configured to detect explicit connections 161 in data 1A when the incident data is received from database 1. Explicit connections 161 may also be created by users who are authorized to do so, e.g., data managers or similar users with sufficiently high access credentials to data 1A. In a preferred embodiment, explicit connections 161 may not be deleted or modified by a user of the preferred embodiment or of GUI 4 or may only be deleted or modified by a user authorized to do so based on user role within an organization and proper authentication.

An inferred incident connection 161 may be a cross-incident connection between related grouped incidents 150 created by a user, such as an analyst, while viewing or analyzing or annotating grouped incidents 150, for example by utilizing incident connection user control 135. An inferred incident connection 161 may be deleted, using incident connection user control 135. Preferably, only the user who created an inferred incident connection 161, and data managers are enabled to delete it.

A grouped incident 150 comprises one or more grouped incident events 148. Grouped incident events 148 are events 32 (or incident data representing events) associated with a grouped incident 150. Group 90 may comprise a plurality of group sources (or group actors) 170. The group sources comprise all incident event sources 149 associated with the grouped incidents 150 within group 90. In the example of a group 90 as an organization as a group 90, group sources 170 may be employees, contractors, vendors, customers, computers, monitoring devices, and any other human, software, or hardware entity, related to the group 90 organization that have produced event data. A grouped incident 150 may comprise one or more incident event sources 149 (or actors) that are associated with (that, e.g., produced, or are the source of) each grouped incident event 148. Each incident event source 149 is selected from among the group sources 170 and each incident event source 149 may be an event source of one or more incident events 148. Each group source 170 may be an incident event source 149 in one or more grouped incidents 150.

Each group source 170 may be associated with source information 171, comprising one or more of source name 172, source incident information 173, 174, source description 175 (e.g., any relevant information about the source), and source tenure 176. Source incident information 173, 174 may comprise source incident count 173 information and source incident list 174 information. Source name 172 may be any type of identification for group source 170, such as name, id, randomly generated string or number, email address, user name, URI or URL, model or serial number, mac address, department location or designation, and any other information that can identify the group source 170, as well as combinations and abbreviations of the foregoing. Source incident list 174 comprises a list of grouped incidents 150 in which group source 170 is an event source (or actor) of a grouped incident event 148. Source incident count 173 represents the count, or number, of incidents in source incident list 174. Source tenure 176 comprises information about the length of service of the source in association with group 90, for example length of employment by the group 90 organization for a human, or length of deployment for equipment. Source tenure 170 may be a start date 176*a*, a time duration or period (e.g., time since the start date, cumulative length of service periods), and other information representative of a source's tenure related to group 90.

In an embodiment illustrated in FIG. 18, GUI 4 may be configured to display a group interface 92, which may comprise a plurality of interactive graphical user interface panels 91, including one or more of a grouped incidents panel 110, a group tag panel 111, a group sources panel 112, group visualization panel 113, and a group details panel (not shown). The group visualization panel 113 may comprise a source visualization panel 114, and an incidents visualization panel 116. Group interface 92 may further comprise a navigation user control 93, enabling a user to switch between and interact with the grouped incidents panel 110, the group tag panel 111, the group sources panel 112, the group details panel, the group visualization panel 113, the source visualization panel 114, and the incidents visualization panel 116.

The group details panel (not shown) may be configured to display information related to group 90, including for example one or more of a group name, group description, group relevant times (e.g., creation time), explanation of the commonality between grouped incidents, rules for annotating incidents and events, statistical information, and other information that may be related to or descriptive of group 90. The group details panel may also comprise user controls configured to enable a user to modify or input information related to group 90 and to switch to other panels and/or display different views within GUI 4.

Figure 20:
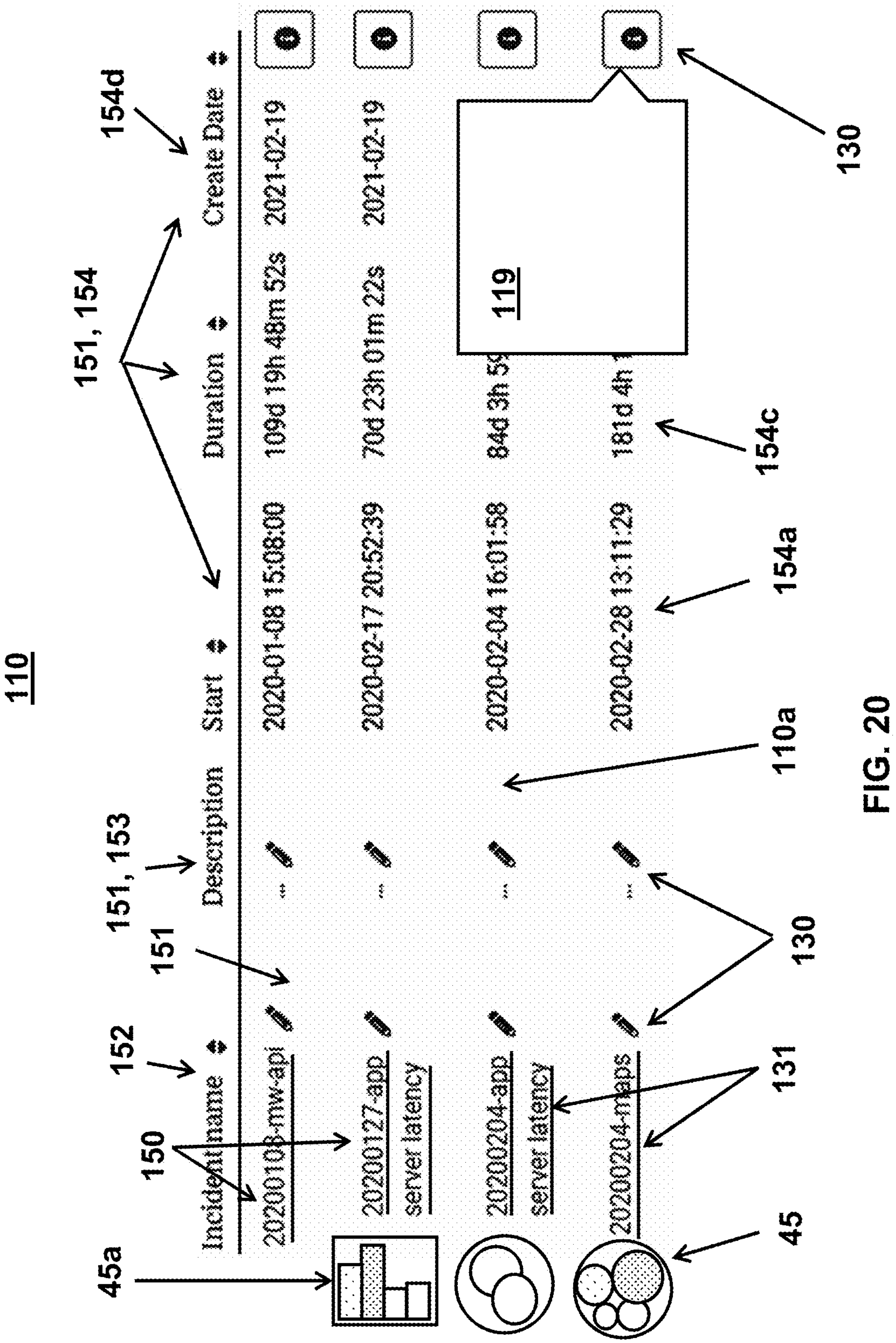
FIG. 20 is a diagram of an embodiment of a grouped incidents panel in an embodiment of the present invention.

An embodiment of the grouped incidents panel 110 illustrated in FIG. 20 displays an incidents list 110*a* comprising one or more incident source-event graphics 45 visually associated with each grouped incident 150. The incidents list 110*a* may also comprise grouped incident information 151 for each grouped incident 150, and the one or more incident source event graphics 45 may be visually associated with the incident information 151 for each grouped incident 150. The incidents list 110*a* preferably comprises the one or more incident source-event graphics 45 visually associated with an incident name 152 and incident time data 154 for each grouped incident 150. The grouped incidents panel 110 may comprise an incident user control 130 configured to enable a user to utilize incident user control 130 to display and view grouped incident information 151 and to annotate grouped incident 150. A user my annotate a group incident 150 by utilizing an incident user control 130 to modify incident information 151, by for example, changing the incident name 152, description 153, or group 90 association; creating a new group incident tag 180; associating or disassociating a grouped incident 150 with, or from, a group incident tag 180; providing, creating, or importing incident notes 163; creating or importing cross-incident connections 159, 161; and other actions. Incident user control 130 may be configured to enable a user to view grouped incident information 151 and annotate grouped incident 150 from the incidents panel 110, or incident user control 130 may enable a user to display an incident control panel 119. Grouped incidents panel 110 may also comprise an incident navigation user control 131 (e.g., clickable URL or link, button) associated with a grouped incident 150 configured to enable a user to utilize the user control 131 to switch from the grouped incidents panel 110 to annotation panel 30 and view displayable events from grouped incident 150 in annotation panel 30.

Figure 19:
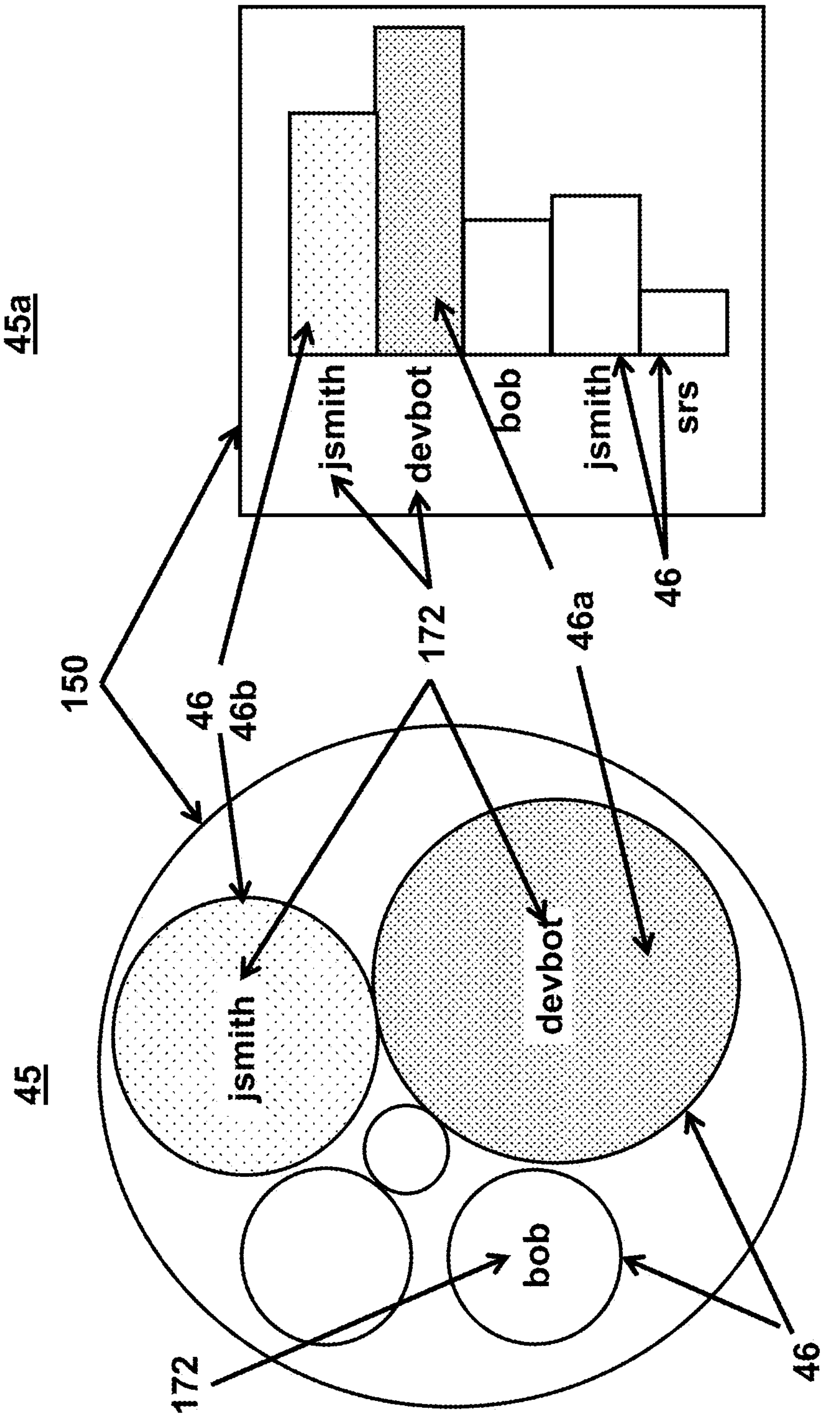
FIG. 19 is a diagram of embodiments of a graphic in an embodiment of the present invention.

Incident source-event graphic 45, illustrated for example in FIG. 19, visually represents event sources 35 from a grouped incident 150. Source-event graphic 45 may comprise a source-event icon 46 associated with an event source 35 from a grouped incident 150. The source-event icon 46 may have an icon visual characteristic (e.g., color, pattern, stippling) representative of source tenure 176, or other source information 171. For example, different colors may represent different ranges of source tenure 176, for example green may indicate very short tenure, while deep red may indicate the longest tenure. Similarly, as illustrated in FIG. 19, different density of stippling may represent different tenures, for example source-event icon 46*a* with 5% stippling (e.g., dotted) may represent one range of source tenure 176, while source-event icon 46*b* with 20% stippling may represent a different source tenure 176. Source-event icon 46 may also visualize the number of events each event source 35 produced within grouped incident 150 by for example displaying the source-event icon 46 with a size (e.g., diameter, diagonal, height, length) proportional to the number (e.g., count, quantity) of incident events that a grouped source 170 produced within a grouped incident 150. FIG. 19 illustrates examples of source-event graphic 45 in the form of a bubble chart 45 and a bar graph 45*a*.

Figure 29:
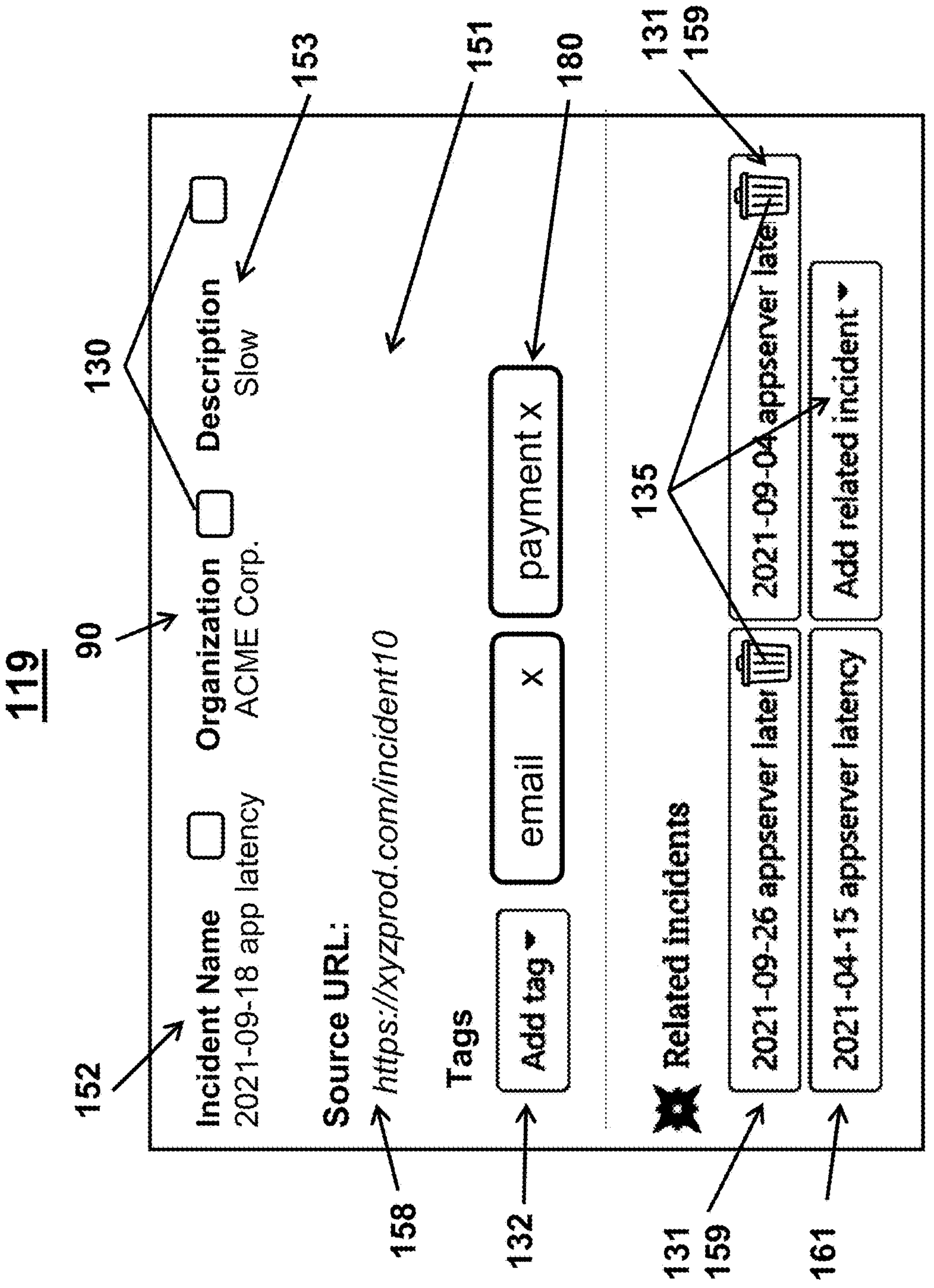
FIG. 29, 30 are diagrams of an embodiment of an incident control panel in an embodiment of the present invention.
Figure 30:
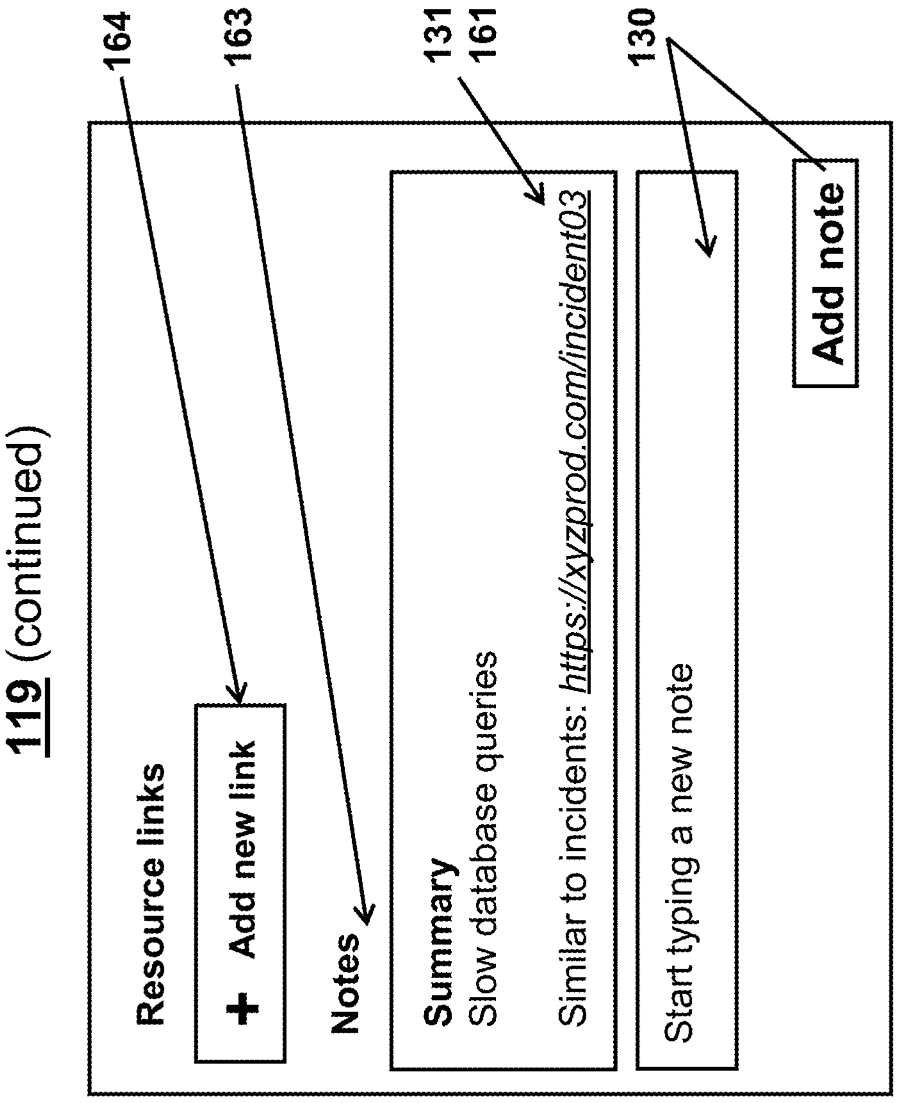
Figure 31:
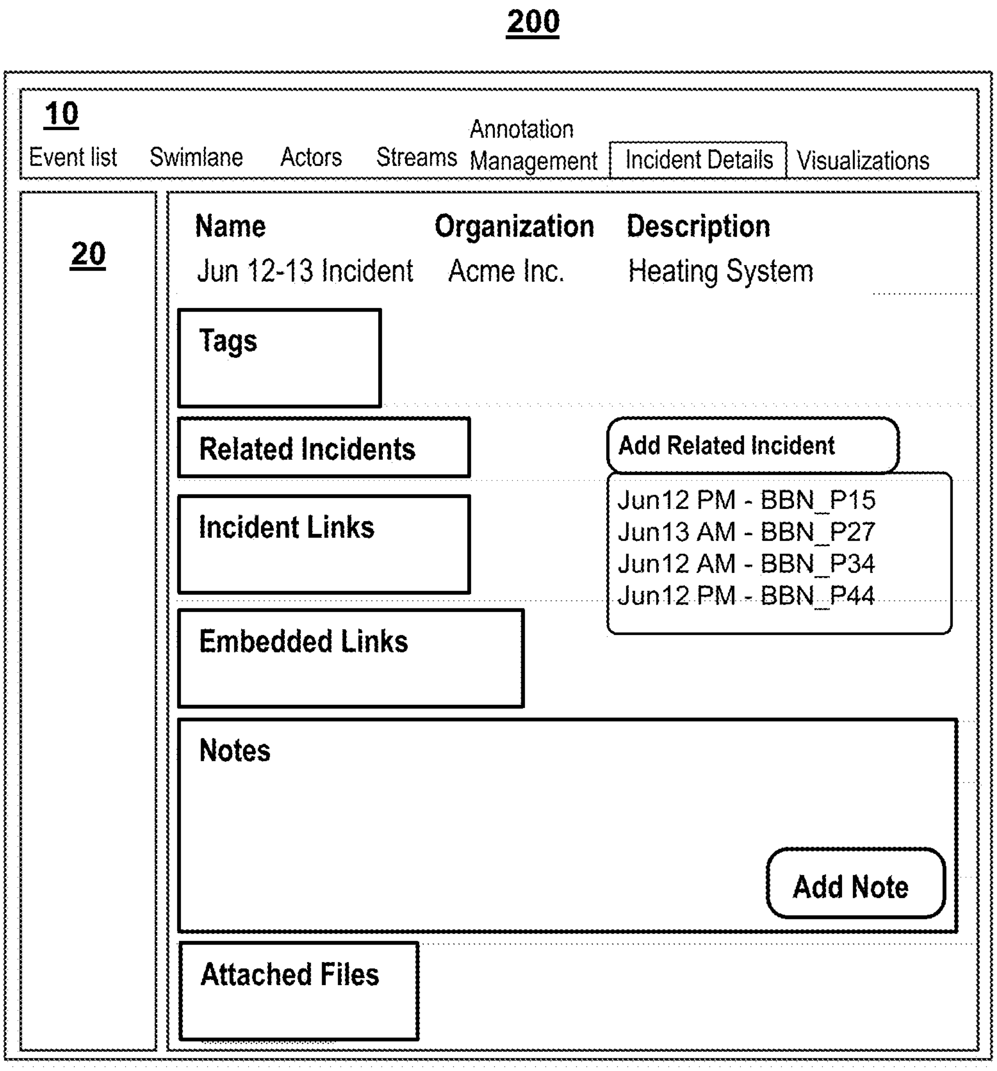
FIG. 31, 32 are diagrams of an embodiment of an incident details view in an embodiment of the present invention.

FIGS. 29, 30 illustrate an example of an incident control panel 119 displaying grouped incident information 151. Incident control panel 119 may comprise an incident user control 130 enabling a user to view incident information 151 and to annotate grouped incident 150 from the incident control panel 119. Incident control panel 119 may comprise an incident navigation user control 131 associated with a grouped incident 150 linked through a cross-incident connection 159, 161 enabling a user to switch to annotation panel 30 and view displayable events from the grouped incident 150 linked through the cross-incident connection 159, 161.

Group interface 92 may also provide, for example, as part of incident control panel 119, or interface panels 91, an incident connection user control 135 associated with a grouped incident 150 configured to enable a user to create cross-incident connection 160, 162. In a preferred embodiment incident connection user control 135 may be utilized to create inferred incident connection 162 (e.g., the second type of cross-incident connection described above), but not an explicit incident connection 159 (e.g., the first type of cross-incident connection described above). Incident connection user control 135 may also be associated with a cross incident connection 159, 161 and configured to enable a user to delete or modify (e.g., changing the connected incidents) the cross-incident connection 159, 161. In a preferred embodiment, incident connection user control 135 may be utilized to delete or modify an inferred incident connection 161, and not an explicit incident connection 159. In this embodiment group interface 92, GUI 4, database 1, or another portion of the embodiment may be configured to prevent a user from deleting or modifying an explicit incident connection 159. In other embodiments, incident connection user control 135 may be configured to enable a user to create, modify, or delete all types of cross-incident connections depending on user authorization level, role in group 90 (e.g., level in an organization), and logon credentials.

Figure 21:
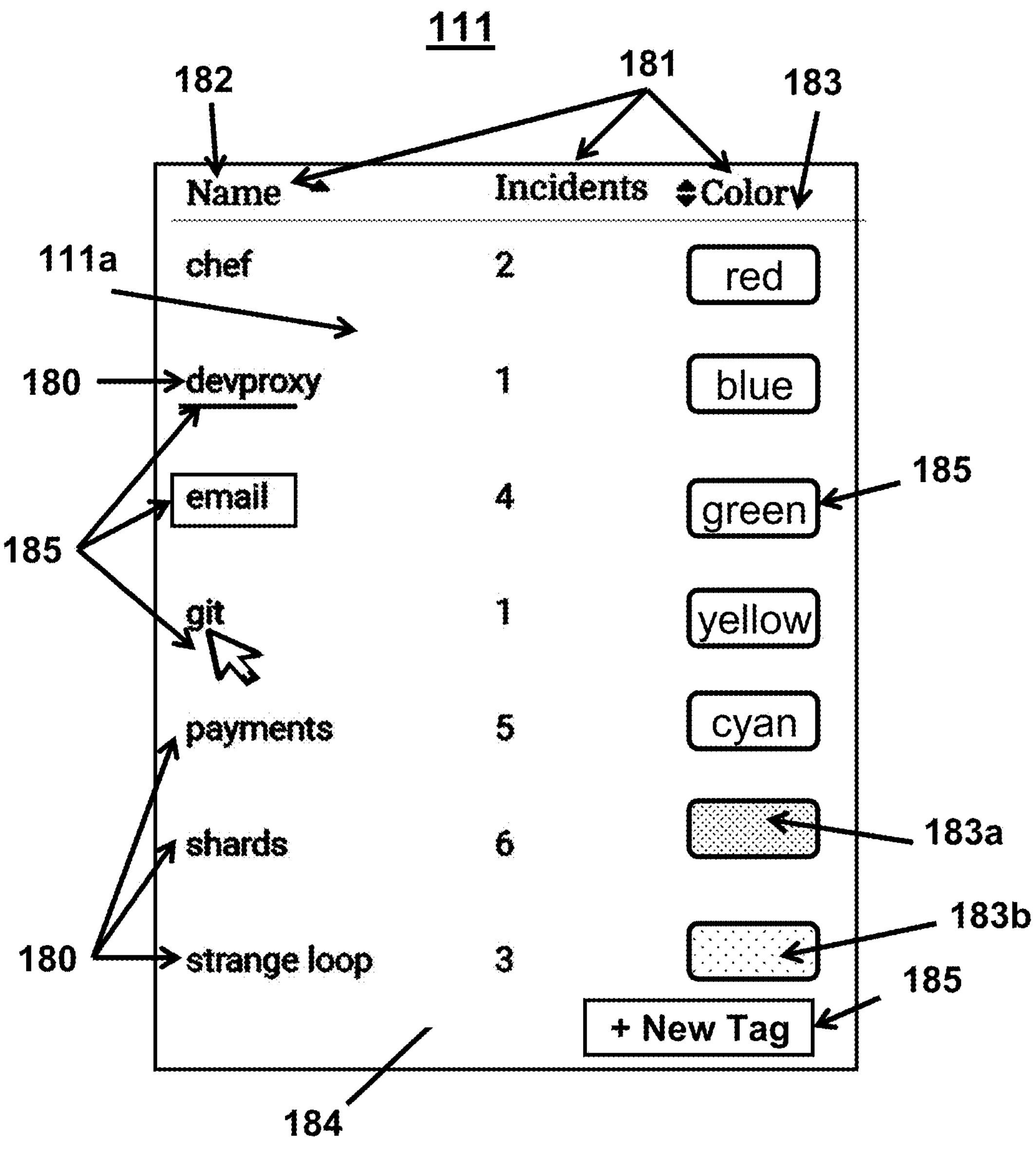
FIG. 21 is a diagram of an embodiment of a group tag panel in an embodiment of the present invention.
Figure 22:
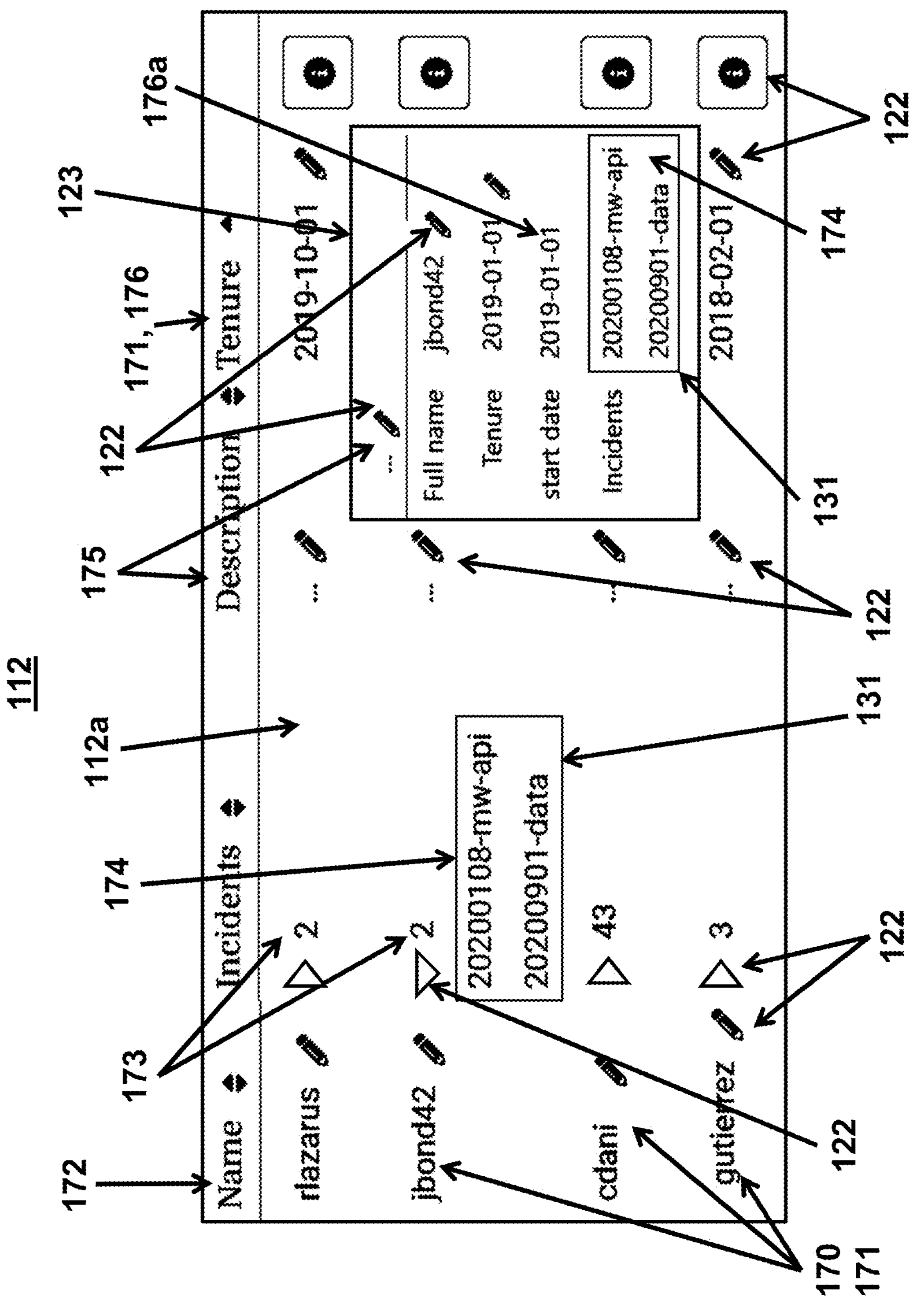
FIG. 22 is a diagram of an embodiment of a group sources panel in an embodiment of the present invention.

Group 90 may comprise one or more group incident tags 180 that a user may associate with a grouped incident 150 to annotate group incident 150. Group tag panel 111 displays a group tag list 111*a* comprising tag information 181 for each group incident tag 180. Tag information 181 may be an incident tag name 182, an incident tag visual characteristic 183 (e.g., color, shape, pattern, stippling, etc.), and tagged incidents information 184. Different tag visual characteristics are illustrated in FIG. 21, for example, different levels of stippling (dotting) shown as 183*a* (20% stippling) and 183*b* (5% stippling), and different colors, with the colors represented by their names. Incident tag name 182 can be used to provide a short description, label, or other information about a grouped incident 150 with which a group incident tag 180 is associated. For example, a tag name 182 "email" may indicate that an associated grouped incident 150 affected or involved email servers, a tag name 182 of "virus" may indicate a computer virus incident, or in infrastructure, an incident tag "generator" may indicate an incident involving power generator failure. Tagged incidents information 184 comprises information about how many (e.g., count, number) grouped incidents 150 are annotated with the group incident tag 180 and may also comprise information identifying each grouped incident 150 annotated (or associated) with the group incident tag 180. Group tag panel 111 may comprise a tag user control 185 enabling a user to create or delete existing group incident tags 180, and to modify tag information 181 as illustrated in FIG. 21 (e.g., showing a cursor/clickable link, color panel)

Embodiments of the invention may associate a user workspace with various user created incident information 151, for example incident tags 180, incident notes 163, user created cross-incident connections 159, 161, and incident resource links 164. Preferably, user-created grouped incident information 151 will be associated with, or become part of, a user workspace that is also associated with the user who created the incident information.

Group sources panel (or group actors panel) 112 displays a group source list 112*a* comprising source information 171 for each group source 170. Sources panel 112 may further comprise a source user control 122 associated with each group source 170 and may be configured to enable a user to utilize the source user control 122 to switch between displaying either the source incidents list 174, or the source incidents count 173, or displaying both the source incidents list 174 and the source incidents count 173. Source user control 122 may also be configured to enable a user to modify source information 171 (e.g., source name, description, tenure, etc.) From the group sources panel 112, or to display a source control panel 123 allowing a user to modify source information 171 for group source 170. Group sources panel 112 may also comprise incident navigation user control 131 associated with a group incident 150 in source incidents list 174, wherein the incident navigation user control 131 is configured to enable a user to utilize the user control to switch from the group sources panel 112 to annotation panel 30 and view displayable events 32 from grouped incident 150 in annotation panel 30.

Group visualization panel 113 comprises a visualization user control 98 enabling a user to display the source visualization panel 114 and incidents visualization panel 116. Visualization user control 98 may also be configured to enable a user to utilize user control 98 to display the source visualization panel 114 in different views, for example, in a bubble chart view 114*a* or a bar graph view 114*b*. Visualization user control 98 may also be configured to enable a user to display the incidents visualization panel 116 in incident comparison view 116*a*, or in incident connection view 116*b*.

Source visualization panel 114 may display a group source graphic 115 visually representing each group source 170 within group 90. All group sources 170 may be visualized by graphic 115, or the information in the source visualization panel 114 may be filtered so that a source graphic 115 represents group sources 170 that meet certain criteria. Examples of such criteria may include displaying groups sources 170 who are event sources 35 of at least one event 32 in a grouped incident 150, displaying groups source 170 based on their source tenure 176, or if their source start date 176*a* is before, on, or after a date, and various other criteria.

Figure 23:
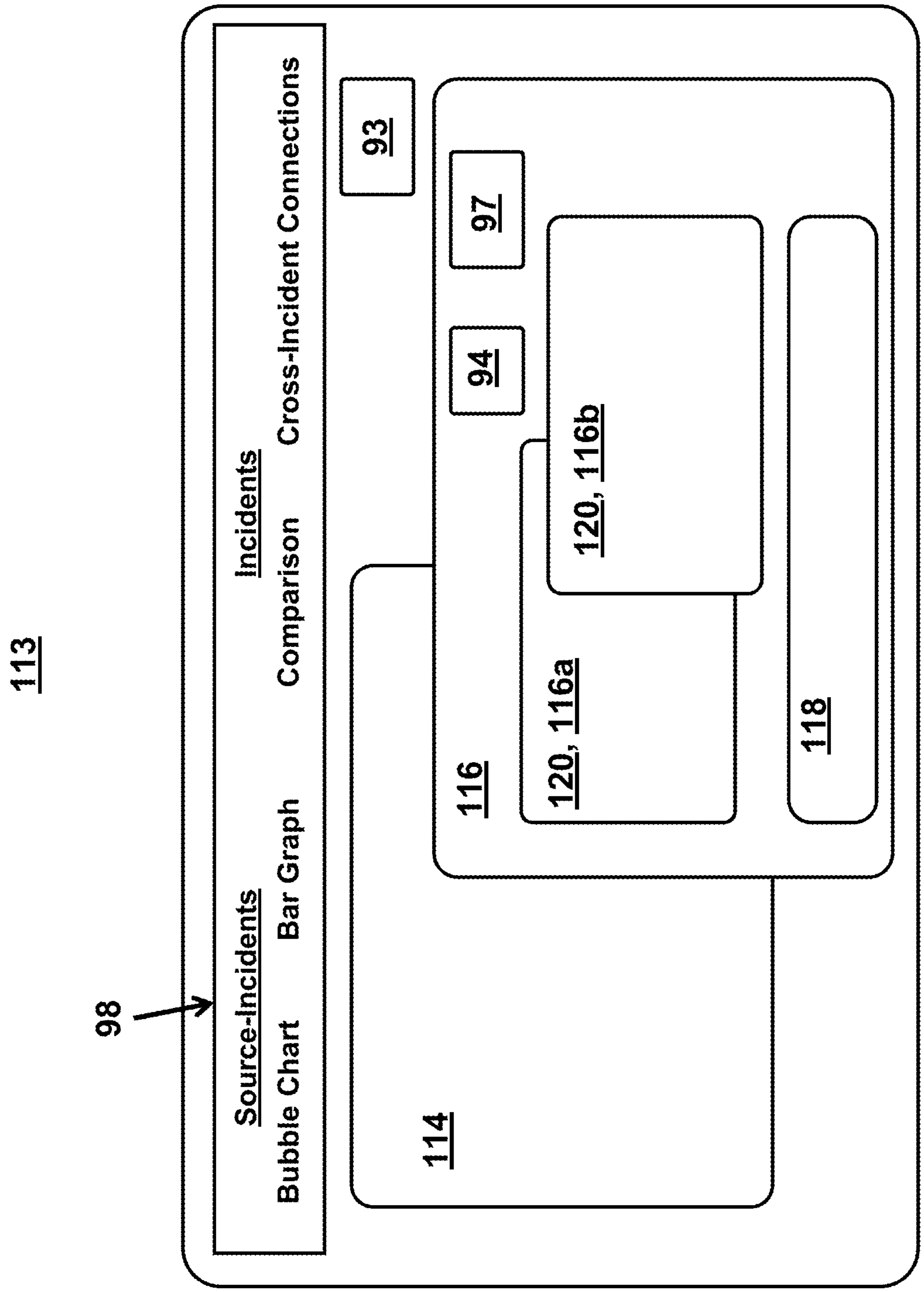
FIG. 23 is a diagram of an embodiment of visualization panels in an embodiment of the present invention.
Figure 24:
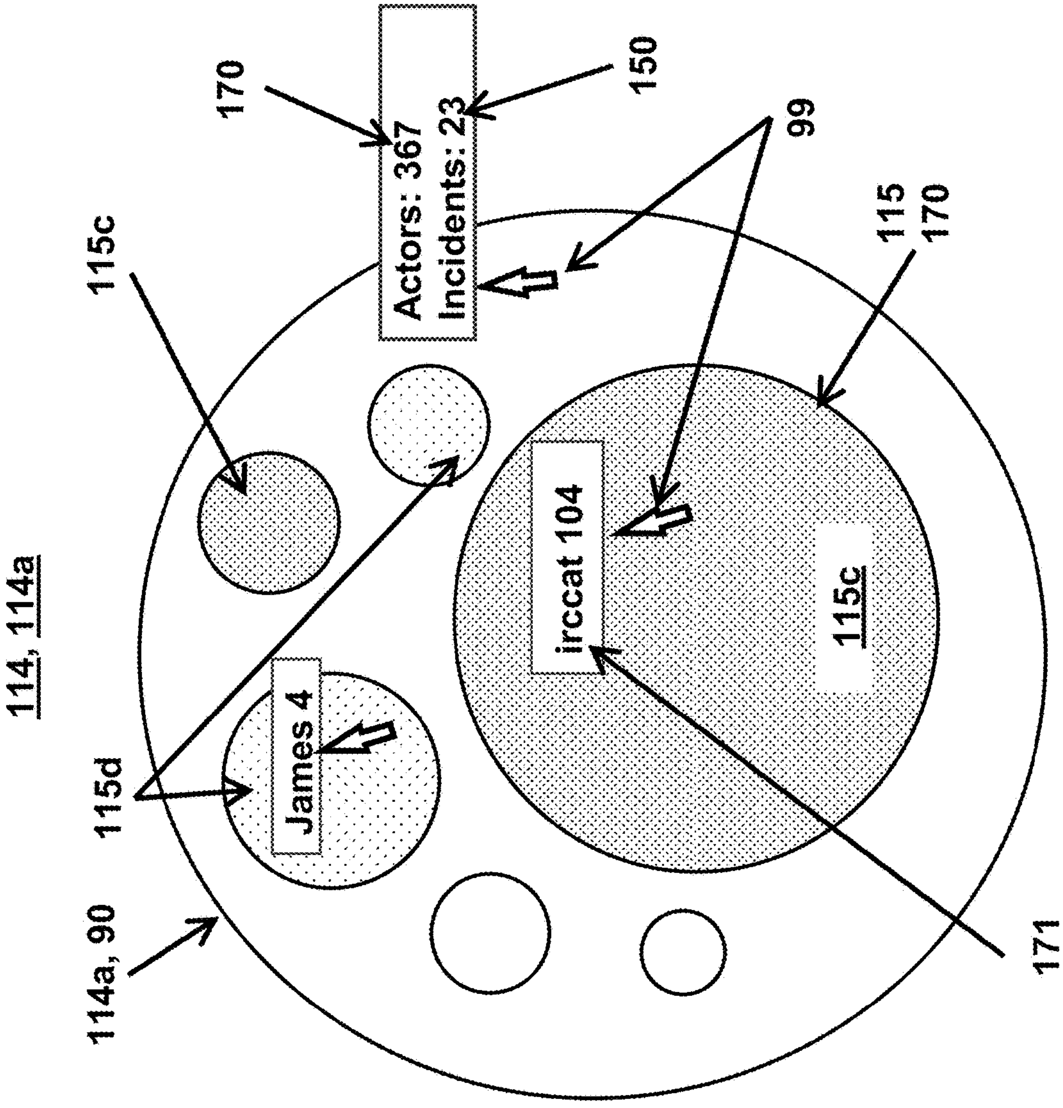
FIG. 24, 25 are diagrams of embodiments of group graphics in an embodiment of the present invention.
Figure 25:
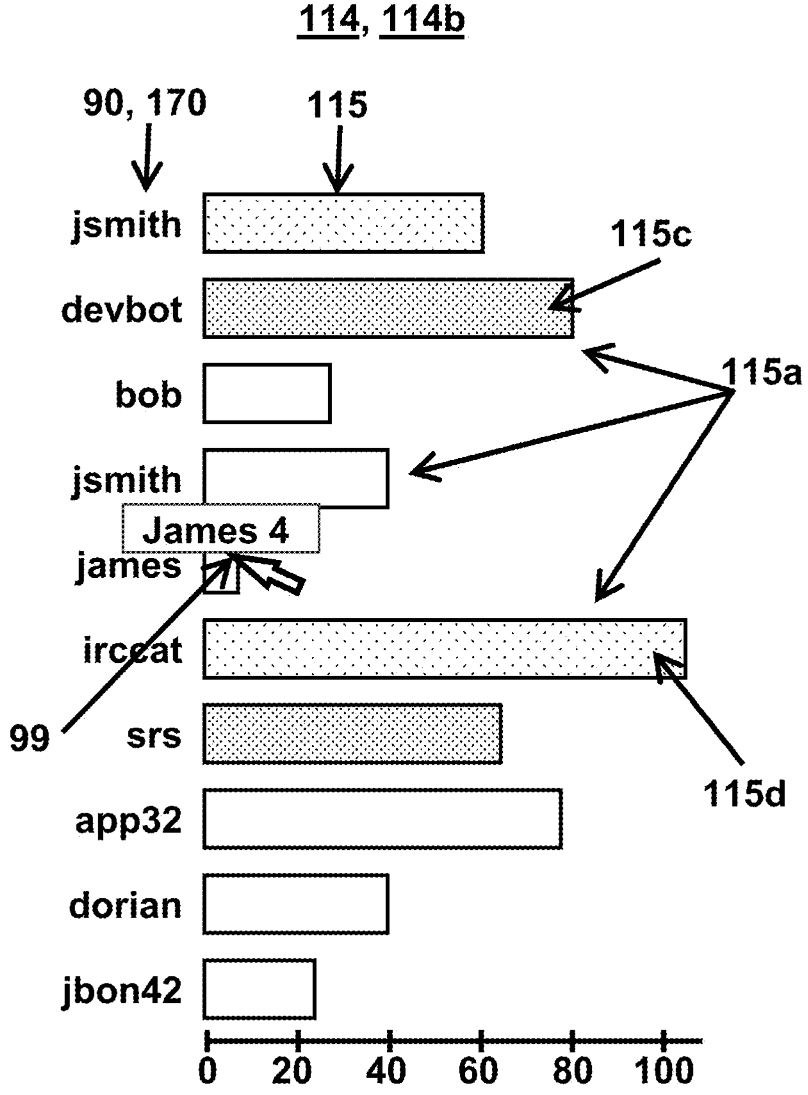
Figure 26:
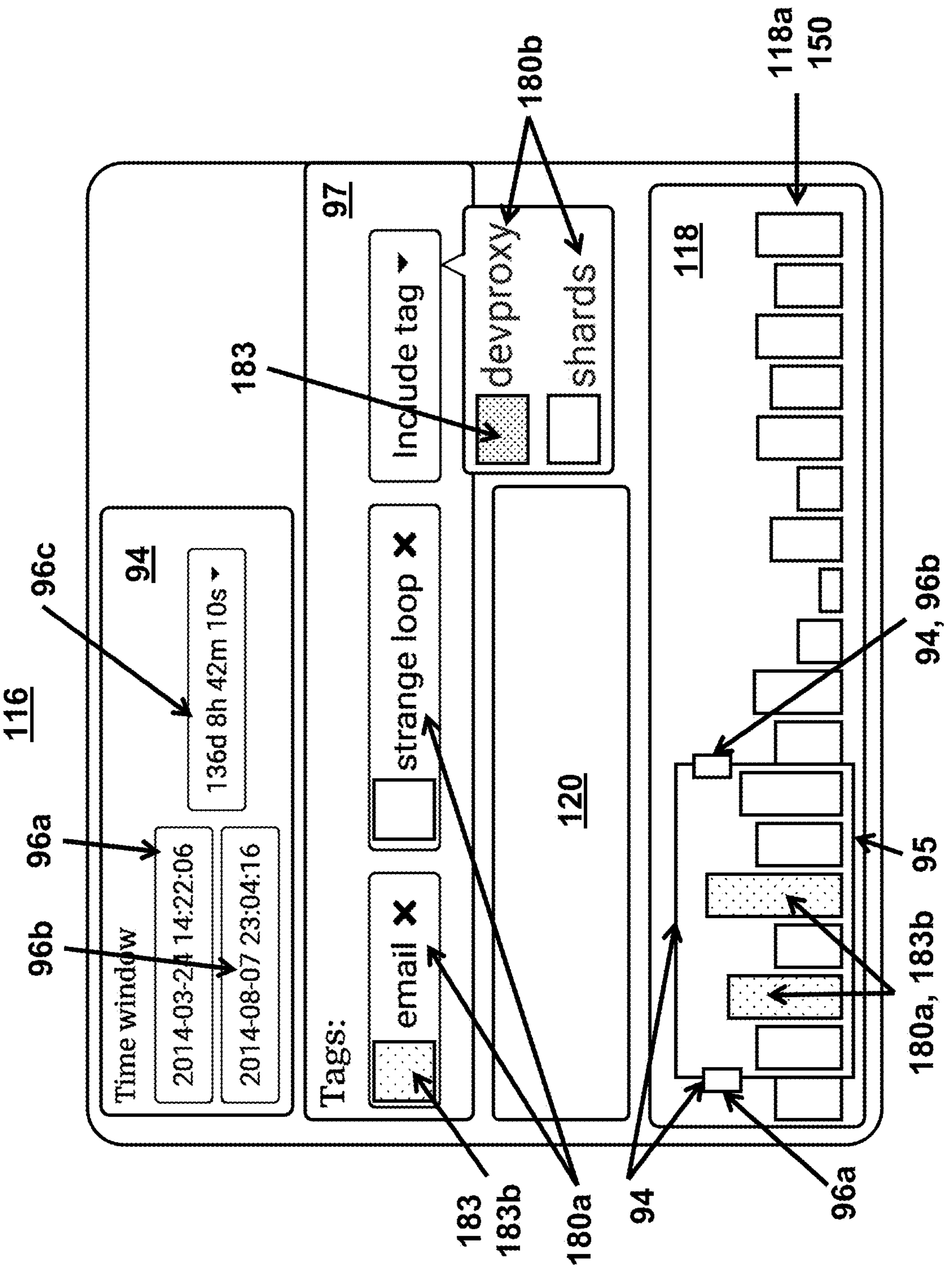
FIG. 26 is a diagram of an embodiment of a visualization panel in an embodiment of the present invention.

Source visualization panel 114 may also display a graphic visualizing information about group 90 (e.g., group sources, grouped incidents, incident events across all grouped incidents, etc.), for example as a geometric FIG. 114*a* (illustrated as a circle, or bubble) encompassing all displayed source graphics 115 as illustrated in FIG. 24, or as a cartesian axis 114*b*, along which source graphics 115 are arranged as illustrated in FIG. 23. In the example of FIG. 25, the x-axis represents a number of grouped incidents 150.

Source graphic 115 may be a geometric shape such as a bubble (e.g., circle, disk) 115, a rectangle/bar 115*a*, another 2d or 3d geometric shape (e.g., triangle, sphere, cube, rectangle, and others), an image, or any other type of graphic. Source graphic 115 may have a source graphic visual characteristic (e.g., fill color, pattern, stippling, shape) indicative of a source tenure 176. For example, shades of a color, for example red, may represent ranges of source tenure 176, with the higher color intensity representing group sources 170 with the longer source tenure 176, and the lighter color intensity representing group sources 170 with shorter source tenure 176. In another example, illustrated in FIGS. 24, 25 (bubble chart, bar graph) source graphic 115*c* with 25% stippling may represent one range of source tenure 176, and source graphic 115*d* with 10% stippling may represent another range of source tenure 176. Source visualization panel 114 may also visualize the number (count, quantity) of grouped incidents 150 to which a group source 170 has produced events, by for example, displaying a source graphic 115 with a source graphic size (e.g., diameter, diagonal, height, length) proportional to the source incident count 173.

The source visualization panel 114 may comprise user control 98 configured to allow a user to view the source visualization panel 114 in different representations, for example a "bubble graph" 114*a*, a "bar graph" 114*b*, a column chart (not shown), stacked bar or column charts (not shown), and others. The source visualization panel 114 may comprise a source user control 99 associated with each source graphic 115 and configured to enable a user to view source information 171 about a grouped source 170. In the example in FIG. 3, group source 170 named "James" has been an incident event sources 149 contributing events in 4 grouped incidents 150, while "irccat" has contributed events to 104 grouped incidents 150. Source user control 99 may also be configured to enable a user to display and view information about group 90 as illustrated in FIG. 24, indicating that there are 367 grouped sources 170 and 23 grouped incidents 150 in group 90.

Incidents visualization panel 116 comprises an incidents area 120, an incident visualization user control 94, and a group timeline panel 118. Incidents area 120 displays an incident graphic 166, 167, visually representative of each grouped incident 150 during an incident display period 96. The incident graphic 166, 167 may have a visual indication of a visible incident tag 180*a* associated with the grouped incident 150. The group timeline panel 118 comprises a timeline of grouped incidents 150 in group 90 each grouped incident 150 represented by a timeline sequence graphic 118*a*. The group timeline panel 118 also comprises a display period graphic 95 highlighting a portion of the timeline corresponding to the incident display period 96. Incident graphic 166, 167 and timeline sequence graphic 118*a* may be configured to visually indicate that a grouped incident 150 is associated with a visible incident tag 180*a*, by displaying incident graphic 166, 167 and timeline sequence graphic 118*a* with a visual characteristic (e.g., color, shading, pattern, line weight or type) corresponding to a tag visual characteristic 183 of a visible incident tag 180*a* associated with the grouped incident 150.

Incident display user control 94, 97 may be configured as a display period user control 94 allowing a user to change the incident display period 96, by inputting or selecting a value for one or more of incident display period start time 96*a*, end time 96*b*, and duration 96*c*. Display period graphic 95 may be configured as a user adjustable display period graphic 95 and associated with the display period user control 94 enabling a user to adjust the incident display period 96 by clicking (or touching) and dragging the start time 96*a* (left border) or end time 96*b* (right border) of the graphic 95 to enlarge or reduce the incident display period, or a user may move the entire graphic 95 along the timeline sequence graphic 118*a* to select a different incident display period 96.

Incident display user control 94, 97 may also be configured as an incident tag display user control 97 enabling a user to select an incident tag to be a visible incident tag 180*a* or to be a hidden incident tag 180*b*.

Incidents visualization panel 116 may comprise incident user control 130 associated with a group incident 150 and incident graphic 166, 167 configured to enable a user to display, modify, and annotate grouped incident information 151, for example by displaying a grouped incident control panel 119. Incidents visualization panel 116 may comprise an incident navigation user control 131 associated with a grouped incident 150 and incident graphic 166, 167, configured to enable a user to utilize the user control 131 to switch to annotation panel 30 and view displayable events from grouped incident 150 in annotation panel 30.

Figure 27:
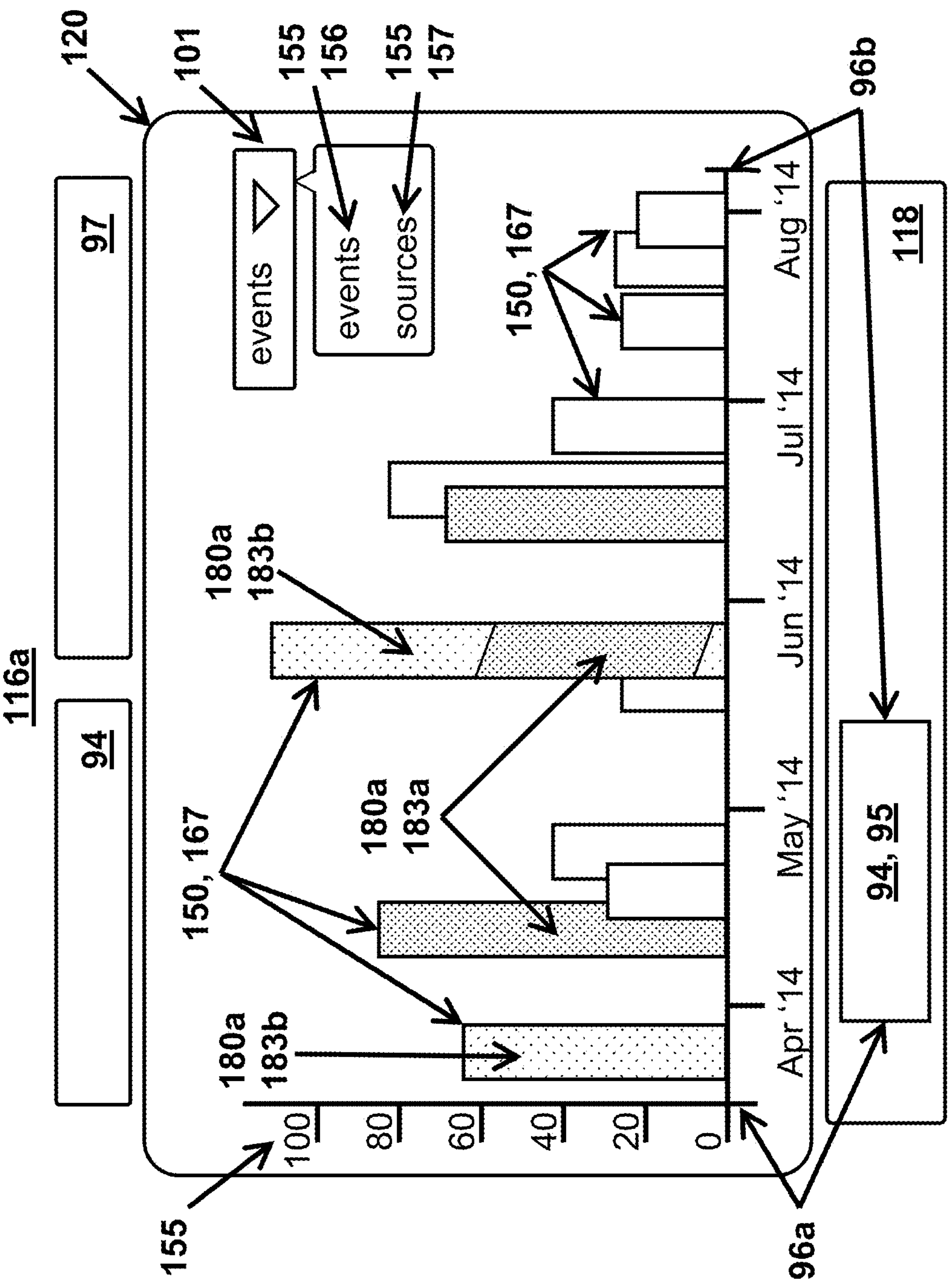
FIG. 27 is a diagram of an embodiment of an incident comparison visualization in an embodiment of the present invention.

In incident comparison view 116*a* incidents area 120 comprises a chronological sequence of an incident graphic 167 for each grouped incident 150 during the incident display period 96. Incident comparison view 116*a* allows visual comparison of grouped incidents 150 based on an incident quantitative characteristic 155 by displaying the incident graphic 167 with an incident graphic size proportionally representative of the incident quantitative characteristic 155. In the example of incidents area 120 in FIG. 27 grouped incidents 150 from a display time period 96 (from start time 96*a* through end time 96*b*) are represented by incident graphics 167 (shown as bars or columns) arranged in a chronological sequence according to incident start time 154*a* along the x-axis timeline, and the height of the incident graphics 167 corresponds to a quantitative characteristic 155 (e.g., number of incident events shown as "events") along the y-axis. Incident quantitative characteristic 155 may be any quantitative measure that a user may choose to characterize an incident. For example, an incident quantitative characteristic 155 may be a number of incident events 156, representative of how many grouped incident events 148 are in a grouped incident 150 (indicated as "events" in FIG. 27); a number (or count) of incident event sources 157 (e.g., "sources" in FIG. 27), representative of how many incident event sources 149 are associated with (e.g., contributed or produced) grouped incident events 148 in grouped incident 150; a number representative of how many cross-incident connections 159, 161 associated with a grouped incident 150; a number representative of the combined source tenure 176 of all incident event sources 149 in a grouped incident 150, and other determinable quantities or numbers associated with a grouped incident 150. Incident quantitative characteristic 155 may also comprise statistical information related to an incident, for example, mean, median, or deviation of sources' tenures, a sum of events from each source; a quantity representing the tenure of each source relative to the number (or count) of events from each source, and any other quantity determinable from information related to an incident. Incidents visualization panel 116 may also comprise an incident comparison user control 101 allowing a user to select an incident quantitative characteristic 155 and display grouped incidents 150 as graphics visually representative of the incident quantitative characteristic 155, thus enabling a visual comparison of grouped incidents 150.

In incident connection view 116*b* incidents area 120 comprises a sequence of incident icons 166 associated with each grouped incident 150 during the incident display period 96. Incidents area 120 may also comprise an incident connection graphic 160, 162, visually representing a cross-incident connection 159, 161, by visually connecting incident Icons 166 associated with connected grouped incidents 150.

Incident connection graphic 160 may be a first incident connection graphic 160 representative of a first type of, or explicit, cross-incident connection 159. Incident connection graphic 162 may be a second incident connection graphic 162 representative of a second type, or inherent, cross-incident connection 161. Incident connection graphic 160, 162, may be other types of incident connection graphics (not shown) representative of other types of cross-incident connections (not shown). Incident connection graphics 160, 162, are configured to visually indicate the type of cross-incident connection 159, 161 each graphic represents, so that the first incident connection graphic 160 and the second incident connection graphic 162 are visually differentiated. For example, a first incident connection graphic 160 may be displayed above the sequence of incident Icons 166 to represent a first, or explicit, cross-incident connection, while a second incident connection graphic 162 may be displayed below the sequence of incident Icons 166 to represent a second type, or an inherent, cross-incident connection. The different types of incident connection graphics 160, 162 may also be configured to have distinct visual characteristics (e.g., line color, weight, or style; curved or square connectors, labels, etc.) visually indicative of different types of cross-incident connections.

Figure 28:
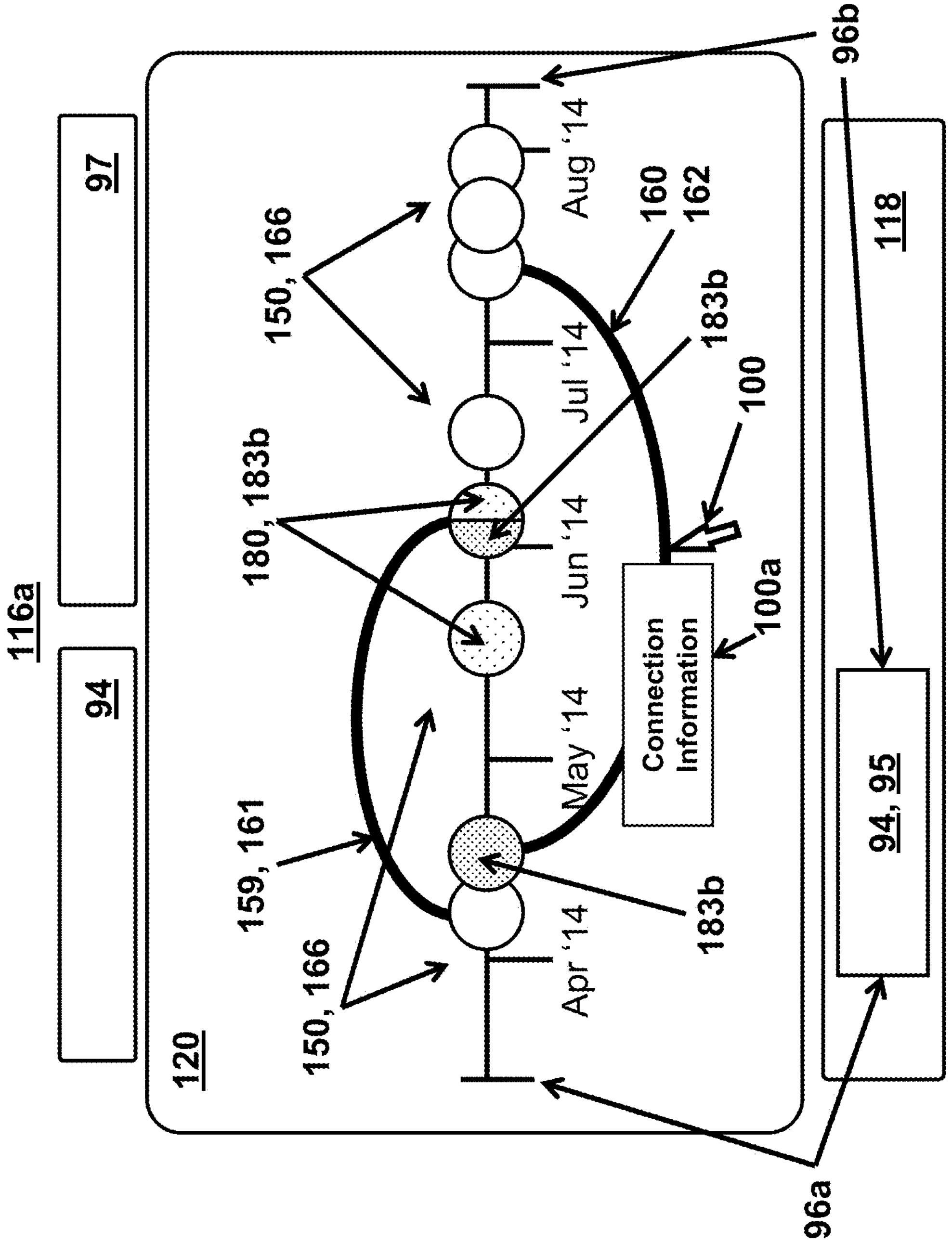
FIG. 28 is a diagram of an embodiment of cross-incident connections visualization in an embodiment of the present invention.

Group interface 92 may also provide, for example, as part of incidents visualization panel 116 or other interface panels 91, a connection user control 100 (e.g., click, shown as a cursor in FIG. 28) associated with an incident connection graphic 160, 162, configured to enable a user to display, view, modify, or annotate connection information 100*a* (e.g., shown as a pop-up "connection information" in FIG. 28) about a cross-incident connection 159, 161, or one or more of the grouped incidents 150 connected by the cross-incident connection 159, 161. Connection user control 100 may also comprise an incident navigation user control 131 configured to enable a user to utilize the incident navigation user control 131 to switch to the annotation panel 30 and view displayable events from a grouped incident 150 connected with a cross-incident connection 159, 161.

Actors panel (not shown) is configured to display a list of all event sources 35 (also referred as actors) represented in the incident in visual association with the event source information 171 of each event source 35, including event source name 172, the number of data sets 24 to which each event source 35 contributed events, the number of events each event source 35 contributed to the incident, the description 175 of the event source (e.g., a person's name, a device description, identification, and/or location), event source tenure 176, and actor panel controls. GUI 4 is configured to enable using the actor panel controls to display and modify the event source information 171.

Streams panel (or data sets) (not shown) is configured to displays a list of all timestamped data sets 24 about an incident comprising a data set name, number (or quantity) of events in the data set, data set start time, data set end time, data set duration, and data set user controls. The GUI is configured to enable a user to use the data set user controls to add or create a timestamped data set about the incident (e.g., by importing a file, or other methods, described above), to modify the information describing an individual data set (e.g., data set name); to associate a data set, or all events in the data set, with one or more tags (including creating new tags), to hide/unhide from displaying a data set (e.g., all the events in the data set), and to delete a data set.

Figure 33:
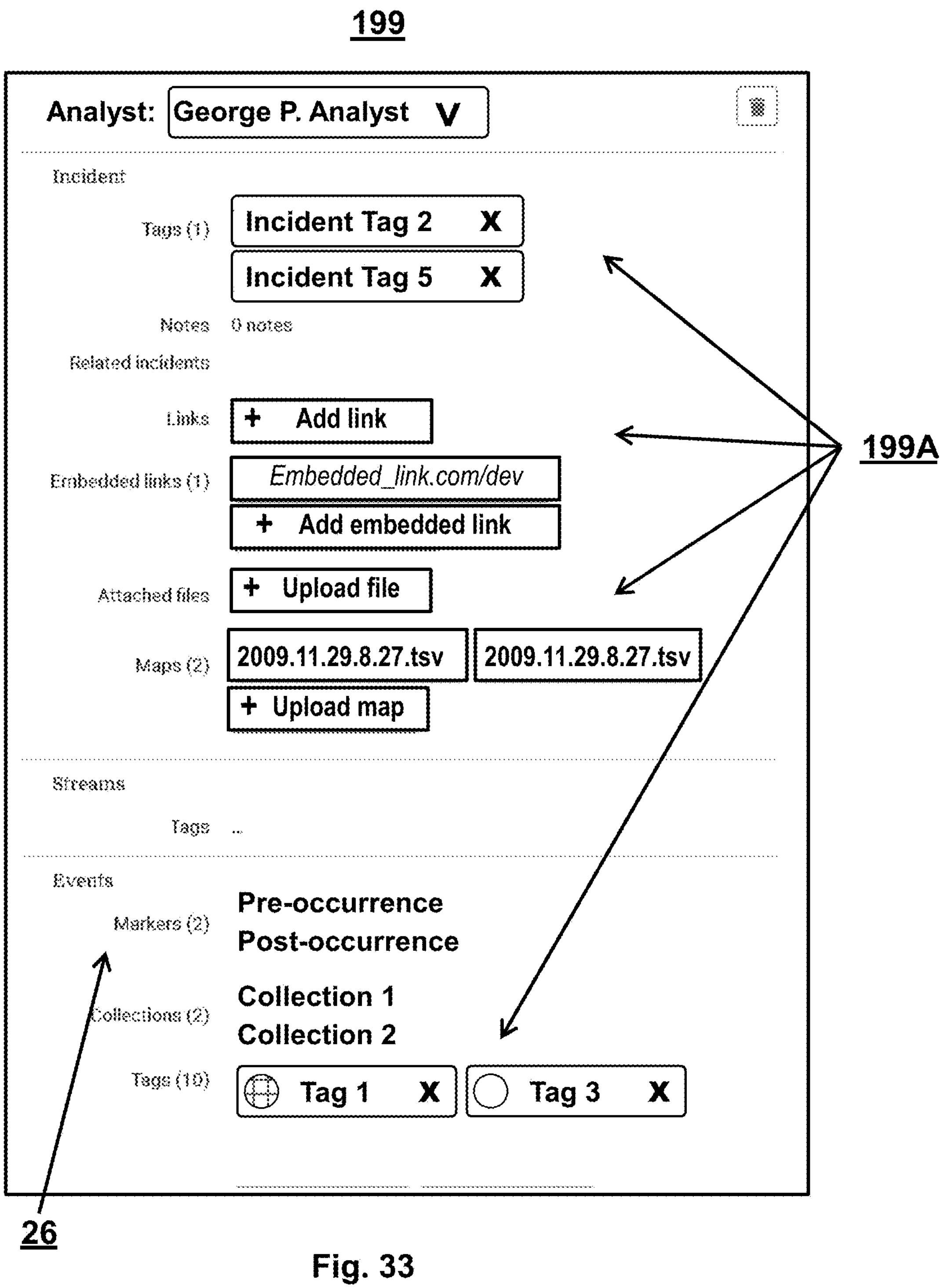
FIG. 33, 34 are diagrams of an embodiment of an annotation management panel in an embodiment of the present invention.
Figure 34:
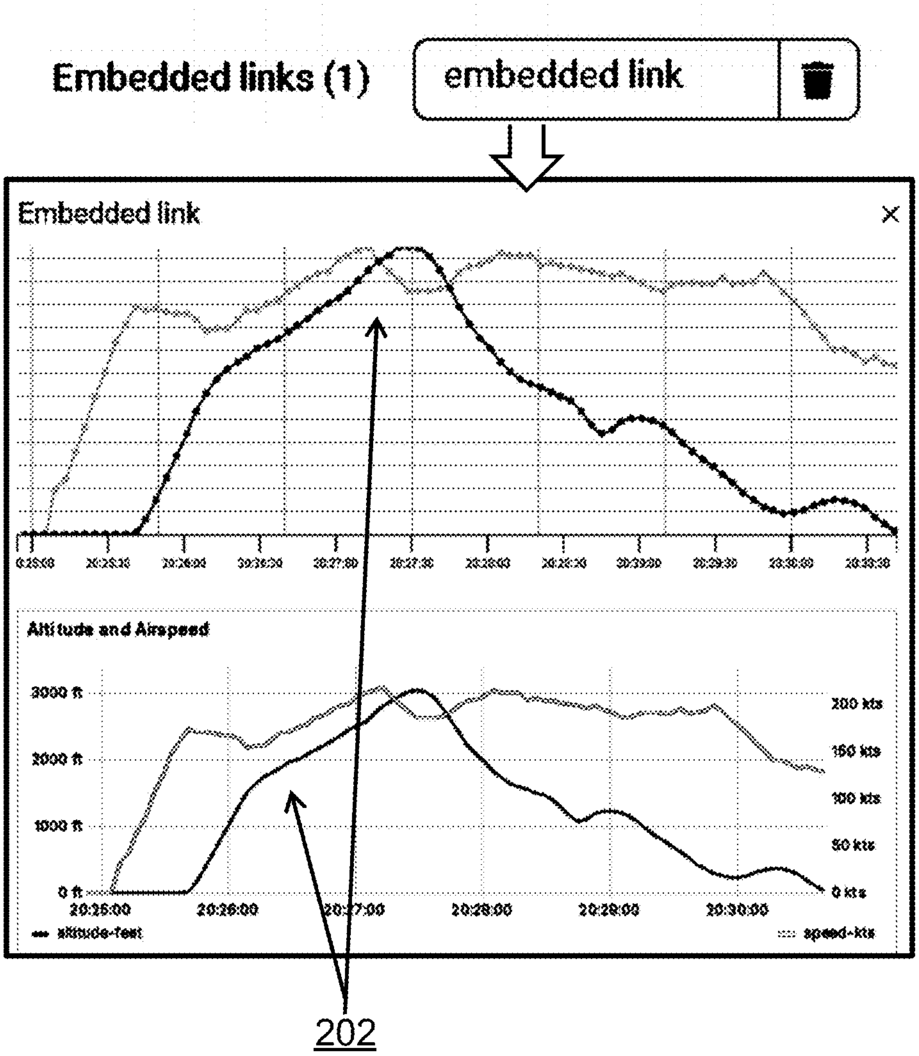

An embodiment of incident annotation management panel 199 illustrated in FIG. 33 displays annotations for an incident associated with an analyst user. Annotation management panel 199 comprises an analyst selection control configured to enable selection of an analyst user. Upon selection of the analyst user, the GUI receives incident annotations associated with the analyst user and displays them in the incident annotation management panel 199. The displayed incident annotation may comprise incident tags 180, incident notes 163, related incidents information about connected incidents (e.g., with a cross-incident connections 159, 161), incident links, attached files, associated incident time series 202, associated incident geo-map time series 202, incident data sets information 25, and event annotation information 26 about events 32 in the incident. Event annotation information 26 may comprise markers 62, collections 43, 44, event tags 37, and event notes. Incident annotation management panel 199 may also provide user annotation controls 199A configured to enable a user to view, modify, add, or delete the displayed incident annotations enumerated above. User controls 199A may also enable a user to visualize an incident time series 202, by for example, clicking on an embedded link. FIG. 34 illustrates a line graph visualization of incident time series 202 having two variables 213 represented by a black and a grey line.

Figure 32:
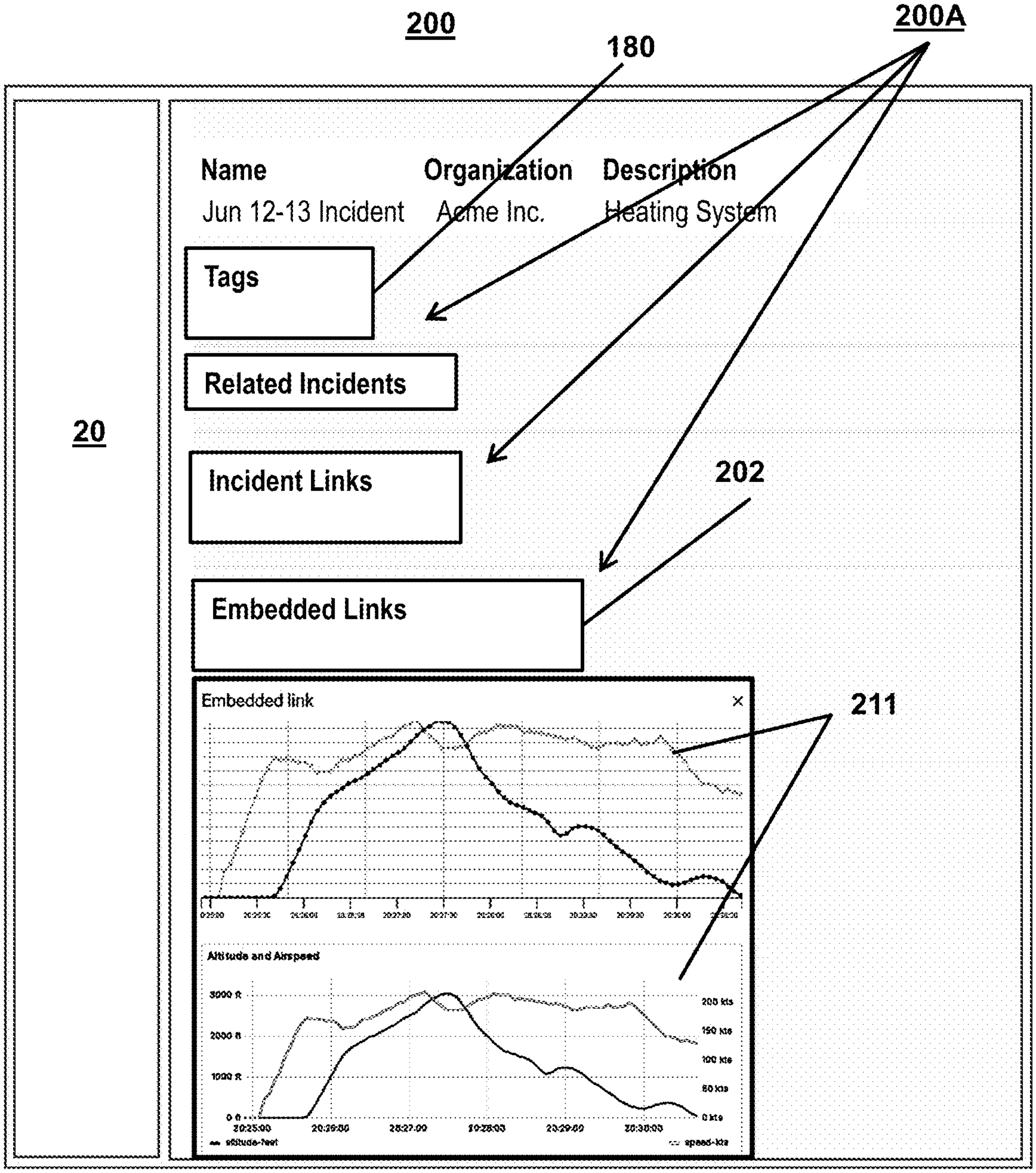

FIG. 32 illustrates an incident details panel 200 displaying incident information details comprising an incident name 152, incident group 90 (or organization), incident description 153, incident tags 180, related incident list (i.e. incident with cross-incident connection 159, 161), incident links (e.g., any link to provide context), embedded links (e.g., to incident time series 202), incident notes 163, and attached files (e.g., containing helpful information). Incident details panel 200 may provide incident user controls 200A allowing the addition, modification, deletion, and selection of each of the incident information details enumerated above. For example, a user may select an embedded link to display incident time series 202 data as illustrated in FIG. 32.

Figure 35:
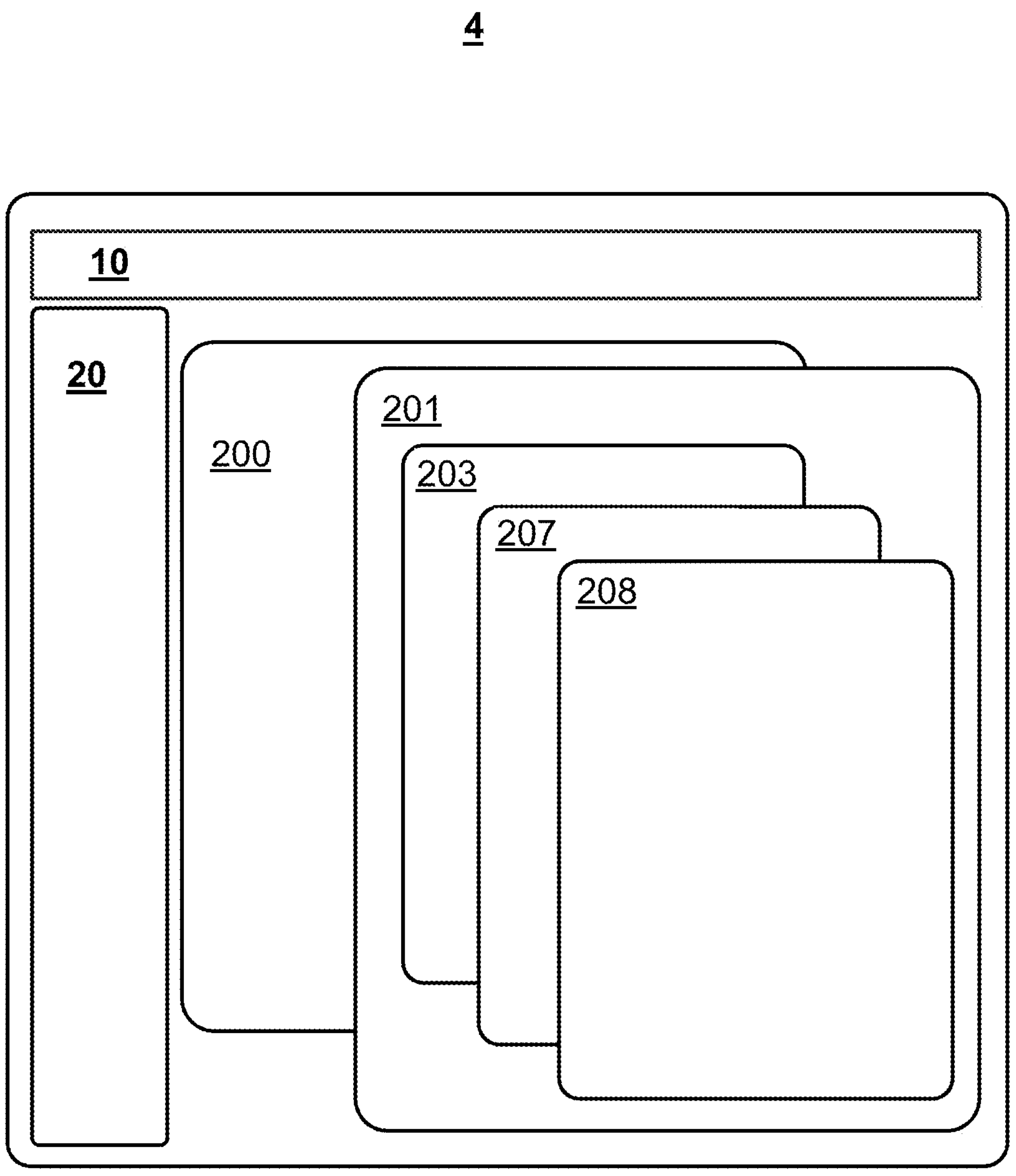
FIG. 35 are diagrams of an embodiment of a graphical user interface in an embodiment of the present invention.
Figure 36:
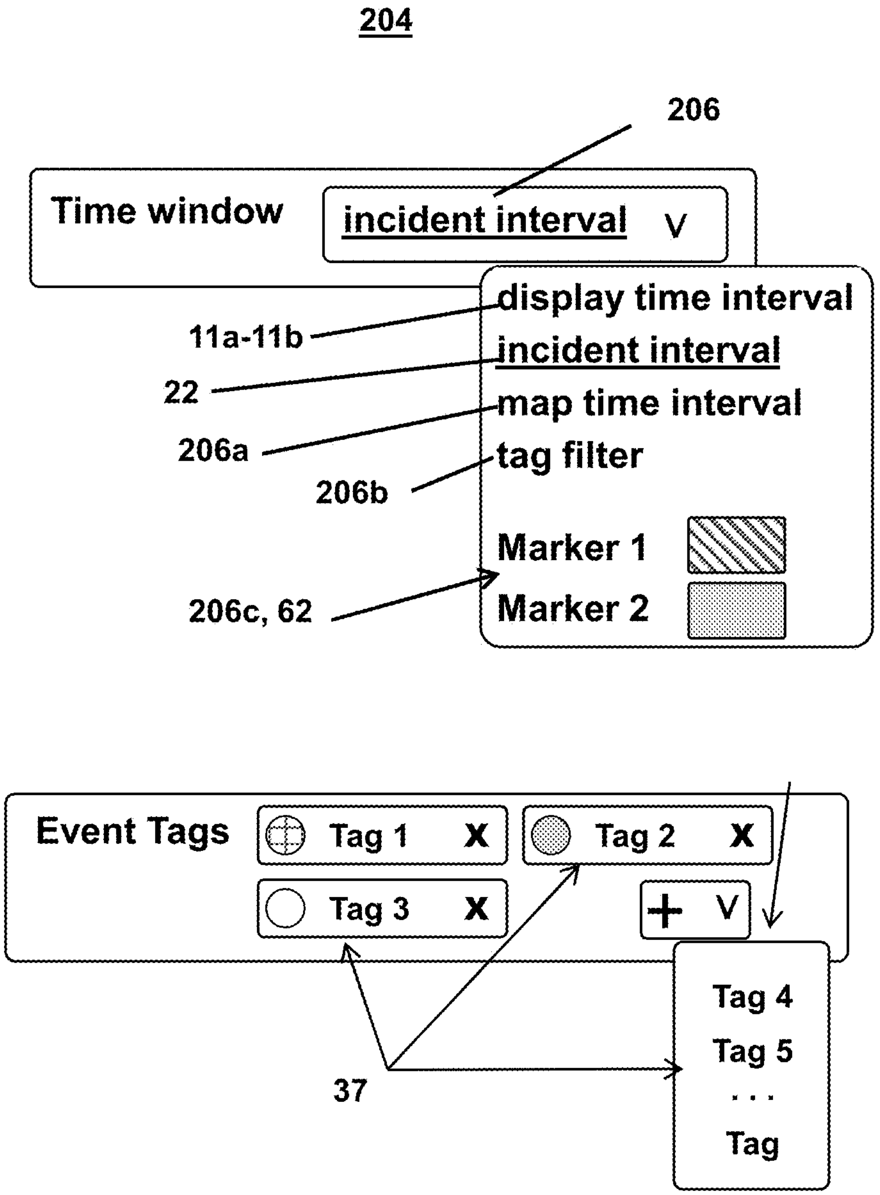
FIG. 36 are diagrams of an embodiment of visualization controls in an embodiment of the present invention.

FIGS. 35 and 36 illustrate event visualization panel 201 that may display a source-event view 203 of an incident or a timeline view 207 of an incident. Source-event view 203 displays a visualization of the source events (actors) that contributed events to the incident together with the number of events each source event contributed, and the time interval during which each source event contributed events. Source-event view 203 may display the visualization as a scatter plot (not shown), a bubble chart (not shown), or a bar graph (not shown).

Event visualization panel 201 may provide a visualization filter control 204 configured to enable a user to select timeline window 206 for timeline view 207 and geo-map view 208. Timeline window 206 may be selected from a display time interval 11*a*-11*b*, the incident time period 22, a tag filter time interval 206*b*, a map time interval 206*a*, and one or more marker range time intervals 206*c*. Timeline window 206 may also be selected as a combination of the foregoing. As illustrated in FIG. 36, visualization filter control 204 may also enable a user to select or unselect one or more event tags 37 for incident visualization in the timeline view 207 and geo-map view 208, and to add new event tags 37.

Figure 37:
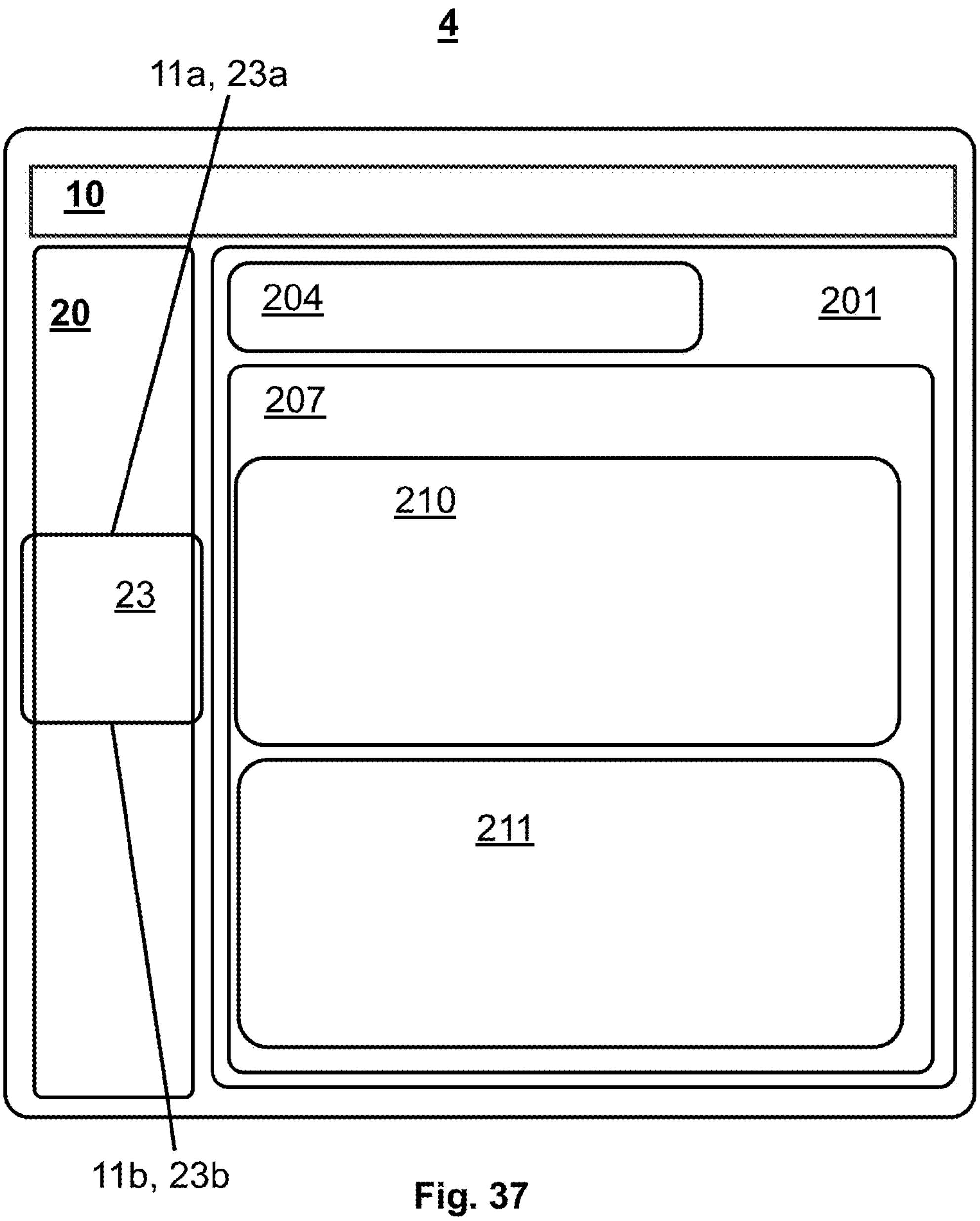
FIG. 37 are diagrams of an embodiment of a graphical user interface in an embodiment of the present invention.
Figure 38:
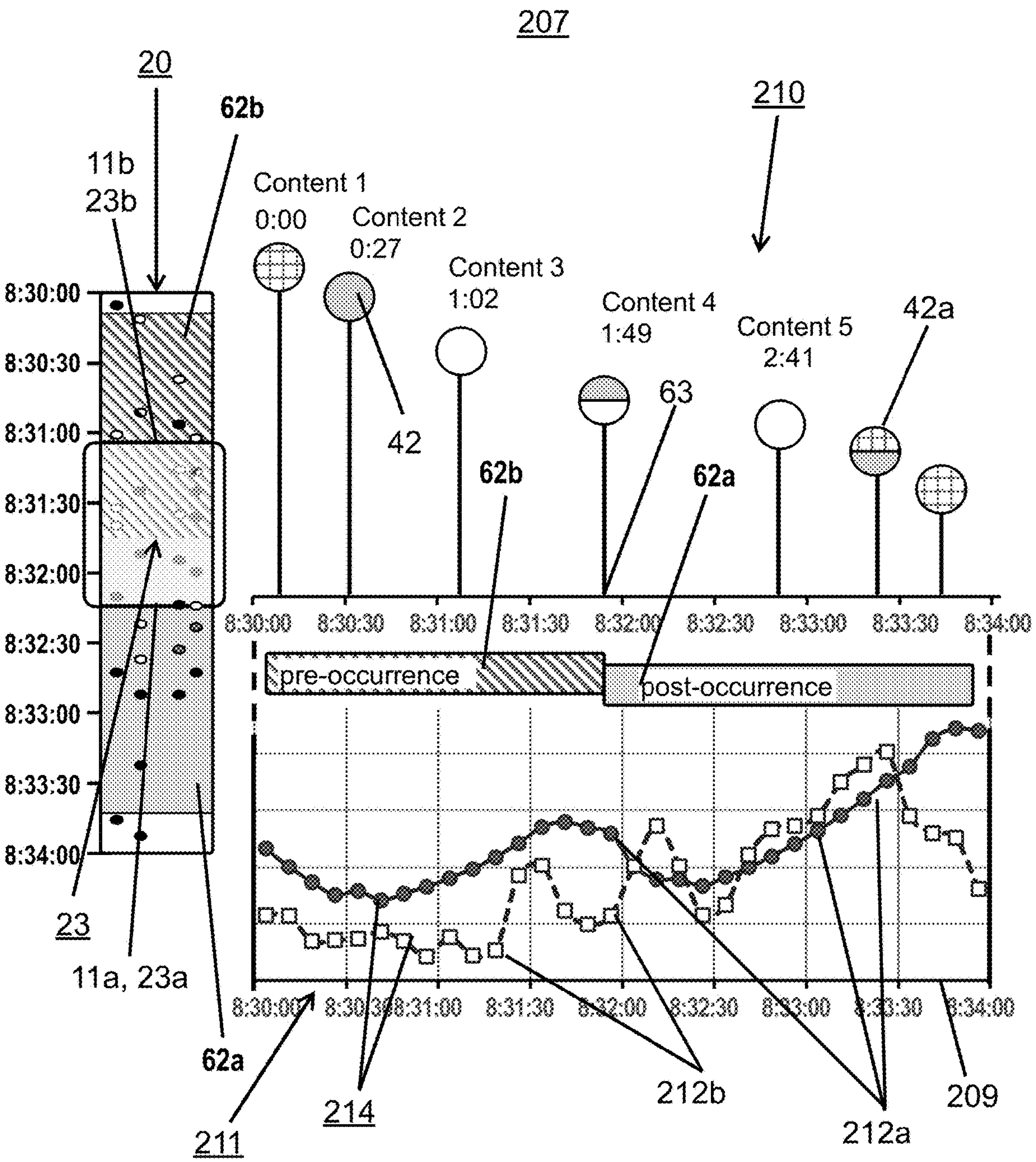
FIG. 38, 38A are diagrams of an embodiment of a timeline view in an embodiment of the present invention.

Timeline view 207 illustrated in FIGS. 37, 38, 38A, 39, and 40 comprises a time-axis 209 and may be configured to display a timeline flowchart 210 along time-axis 209 and a time-series graph 211 along time-axis 209. Timeline view 207 may also comprise marker range indicators 62*a*, 62*b* for marker ranges 62. As FIGS. 38 and 36 illustrate, marker range indicator 62*a* is grey indicating association with marker range 62 "Marker 2" and marker range indicator 62*b* is diagonally striped indicating association with marker range 62 "Marker 1". Marker ranges 62 may represent time periods before, after, or during a particular occurrence 63. In the example of FIGS. 38 and 36, marker range 62*b* represents a time period before the occurrence 63 ("pre-occurrence") and marker range 62*a* represents a time period after the occurrence 63 ("post-occurrence"). Timeline flowchart 210 is configured to display a series of timeline events 32 in chronological order. Time series graph 211 visualizes along time-axis 209 series of datapoints representing variable values sampled during a time series time interval 22A. Geographical map view 208 (referred as "geo-map 208" for short) is configured to visualize geographical locations associated with incident events based on incident time series 202 when incident time series 202 comprise geolocation datapoints 212.

Figure 38A:
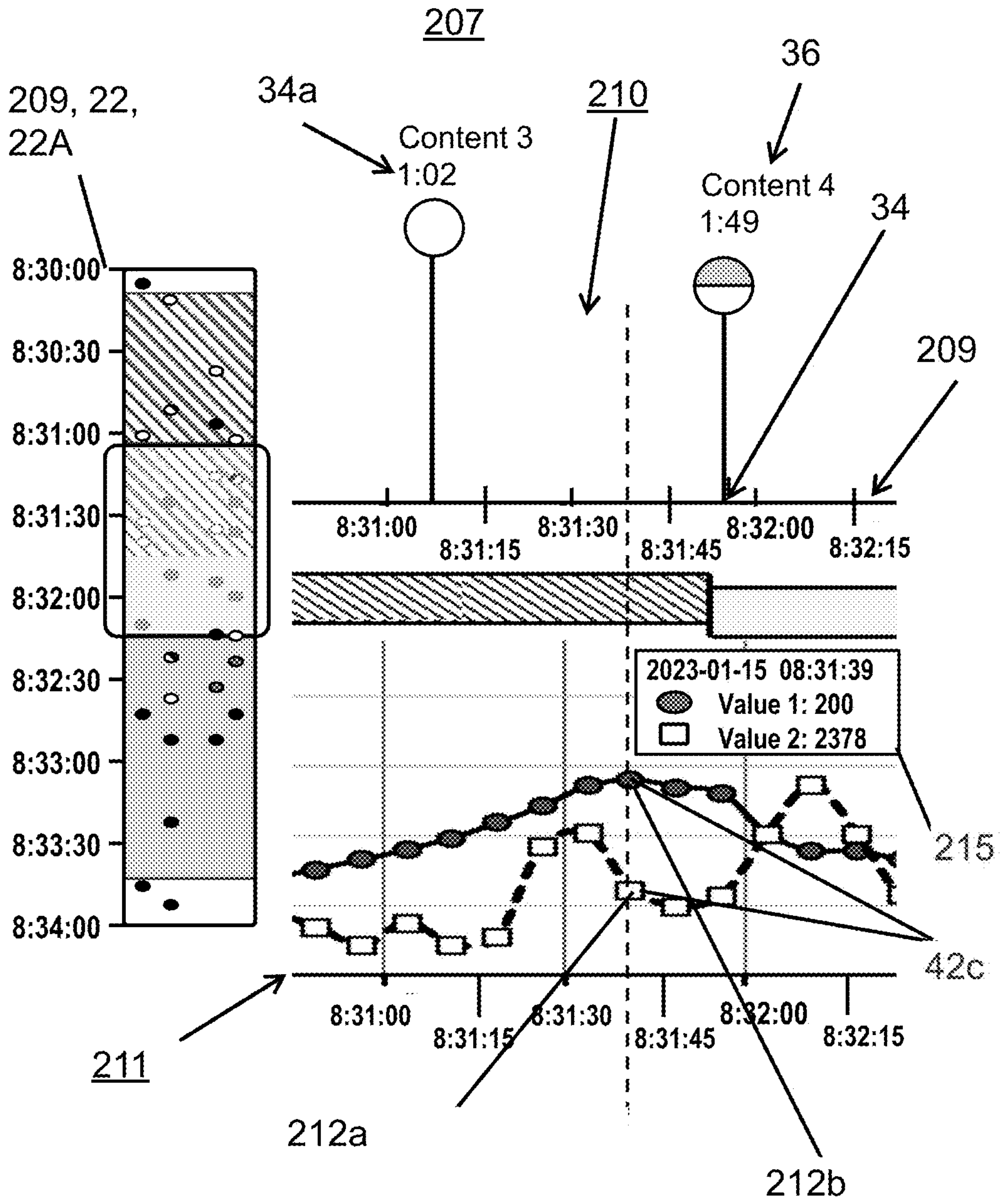

Timeline flowchart 210 chronologically displays a series of timeline events 32 occurring during timeline window 206. The series of timeline events 32 are displayed along time axis 209 according to timeline timestamp 34 of each timeline event 32, as illustrated in FIGS. 38 and 38A. Timeline events 32 are events from the incident data sets 24 whose timeline timestamps 34 are within the timeline window 206. When the timeline window 206 changes, for example through the visualization filter control 204, the system is configured to determine a new series of timeline events 32 based on the new timeline window 206 and the GUI is configured to receive and display the new series of timeline events 32, as illustrated in FIG. 38A. When the selected timeline window 206 is a time interval (e.g., display time interval 11*a*-11*b*, incident time period 22), the timeline flowchart 210 display only those timeline events 32 that are i) within the timeline window 206, and ii) that are associated with event tags 37 selected for incident visualization through the visualization filter control 204. When the timeline window 206 is selected as tag filter Interval 206*b* the timeline window 206 time range is between the timestamp of the earliest event associated with an event tag 37 selected for incident visualization and the timestamp of latest event associated with an event tag 37 selected for incident visualization, and only timeline events 32 associated with event tags 37 selected for incident visualization are displayed in timeline view 207.

Figure 39:
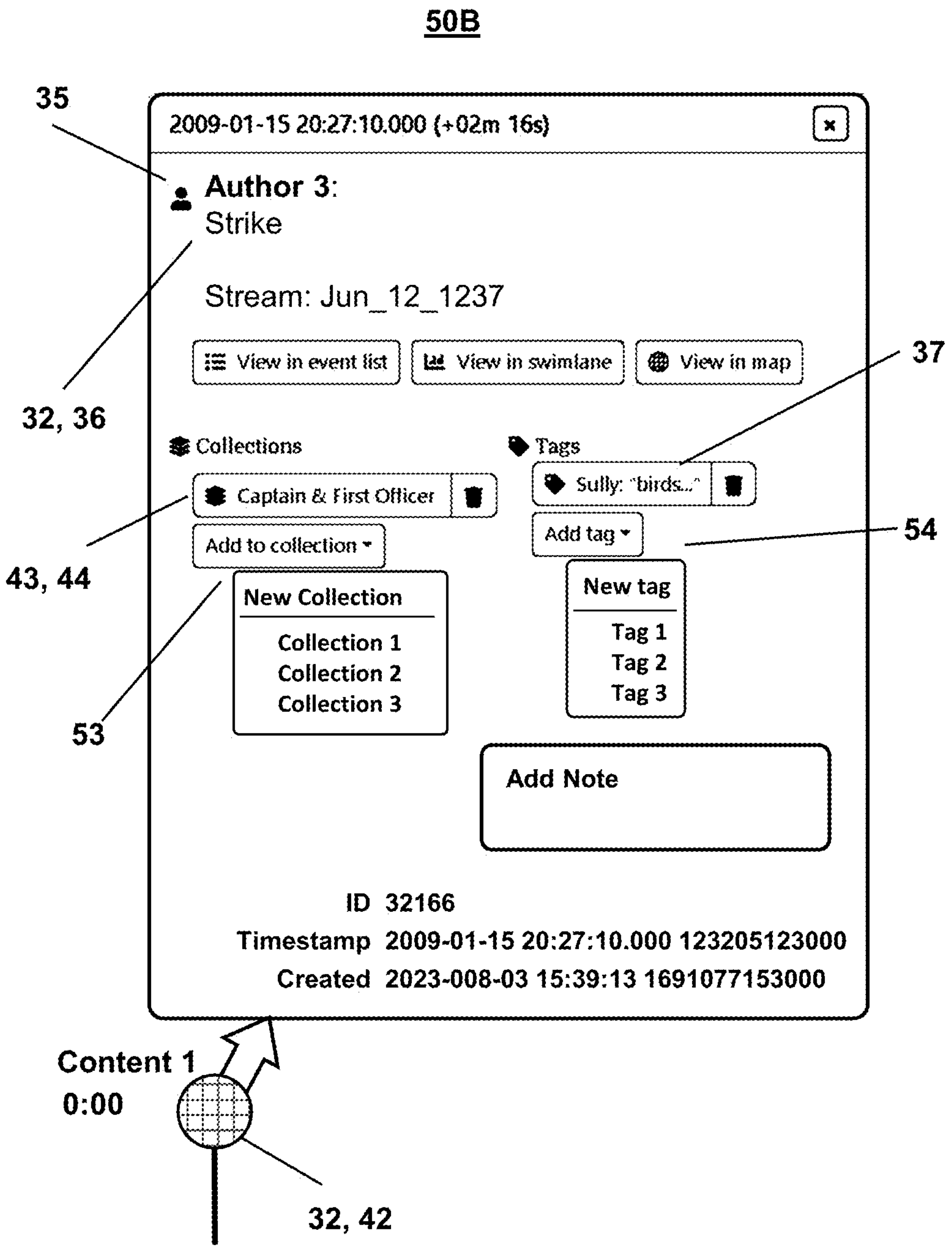
FIG. 39 is a diagram of an embodiment of an event control panel in an embodiment of the present invention.
Figure 40:
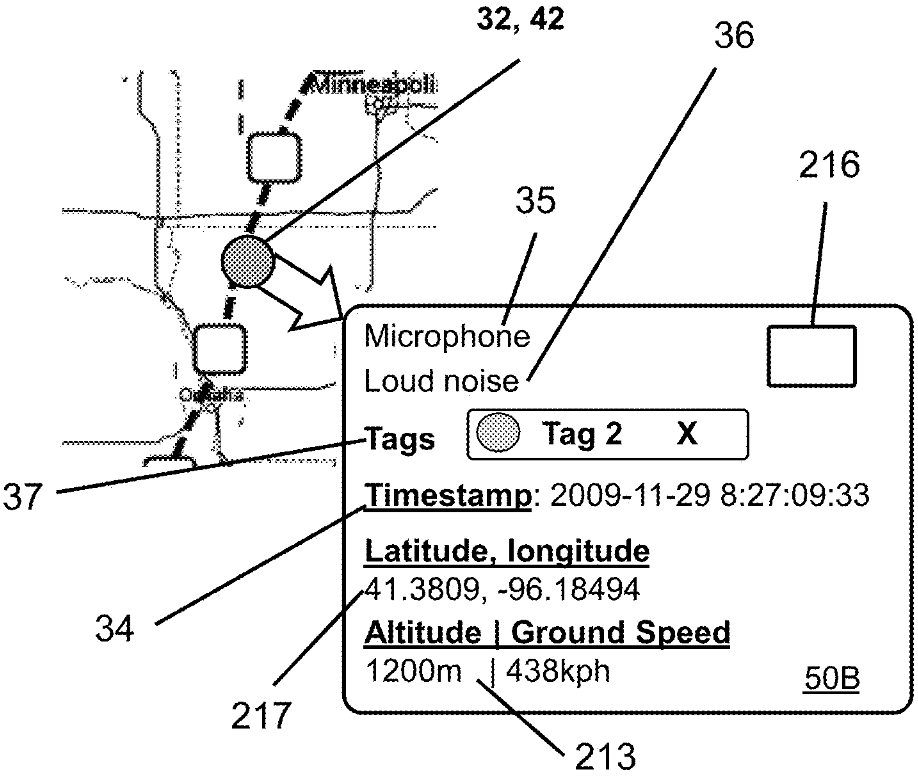
FIG. 40 are diagrams of an embodiment graphical user interface in an embodiment of the present invention.
Figure 40:
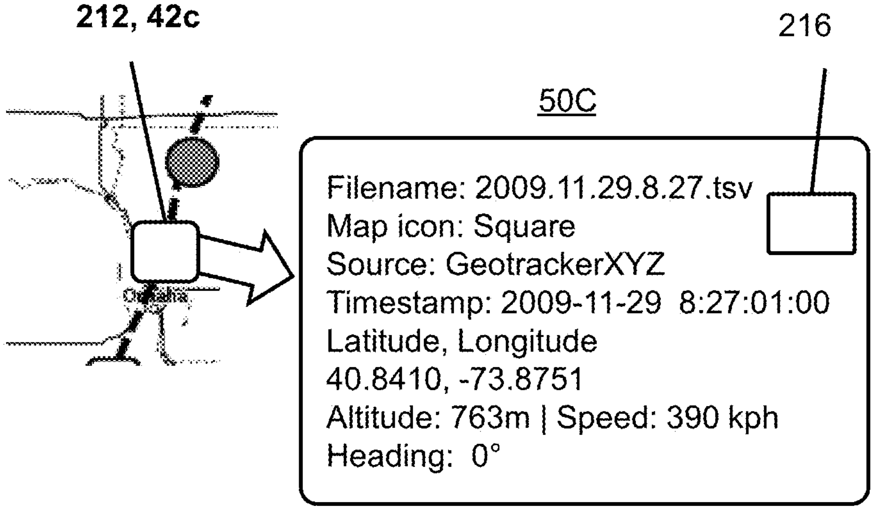

Each timeline event 32 is represented by a user selectable icon 42 (referred for clarity as a user selectable geo-icon 42 in geo map view) that is visually representative of annotations associated with the timeline event 32. For example, as illustrated by FIGS. 38 and 36, event icon 42*a* visually indicates (by having a grey portion and a grid portion) association with two tags 37*a* (Tag 1, grid) and 37*b* (Tag 2, grey). User selectable icon 42 may be visually associated with one or more of the timestamp 34, the time offset 34*a* from the beginning of the incident time period 22, and content 36 of each timeline event 32. User selectable icon 42 is configured to enable a user to display and modify event information and annotation, as well as to switch to viewing one of event list view 31, swimlane view 41, geo-map view 208, and timeline view 207, as illustrated in FIG. 39 for timeline view 207 and in FIG. 40 for geo-map view 208. In the embodiments illustrated in FIGS. 39 and 40, in response to selecting user selectable icon 42, GUI is configured to display event control panel 50 in timeline view 207 and control panel 50B in geo-map view 208.

In embodiments of the invention, GUI 4 may be configured to receive incident time series 202 from an external source (as, e.g., a stream of data, import as a file, manually input, and other methods), or from the database (e.g., previously stored). Incident time series 202 may be generated independently from the incident data streams 24 or may be collected as event data that is part of incident data streams 24.

Incident time series 202 is a collection of datapoints 212 (e.g., values) collected over a period of time, the time-series interval 22A, and ordered chronologically, i.e., indexed or listed in time order according to each datapoint's time of collection (or datapoint timestamp). Time-series interval 22A most preferably contains the entire incident time period 22, and preferably at least parts of the time-series interval 22A overlap with parts of the incident time period 22.

Various benefits of the present invention for incident analysis may be achieved by using univariate or multivariate time series 202. Univariate incident time series 202 may contain datapoints 212 for a single variable 213 that are periodically recorded during the time-series interval 22A, for example, numbers from a random number generator, number of users accessing a server, mains power levels, rainfall measurements, daily/hourly/monthly closing values of a stock market index or stock price, speed of a vehicle, air pollution, or any data capable of being recorded.

Figure 43:
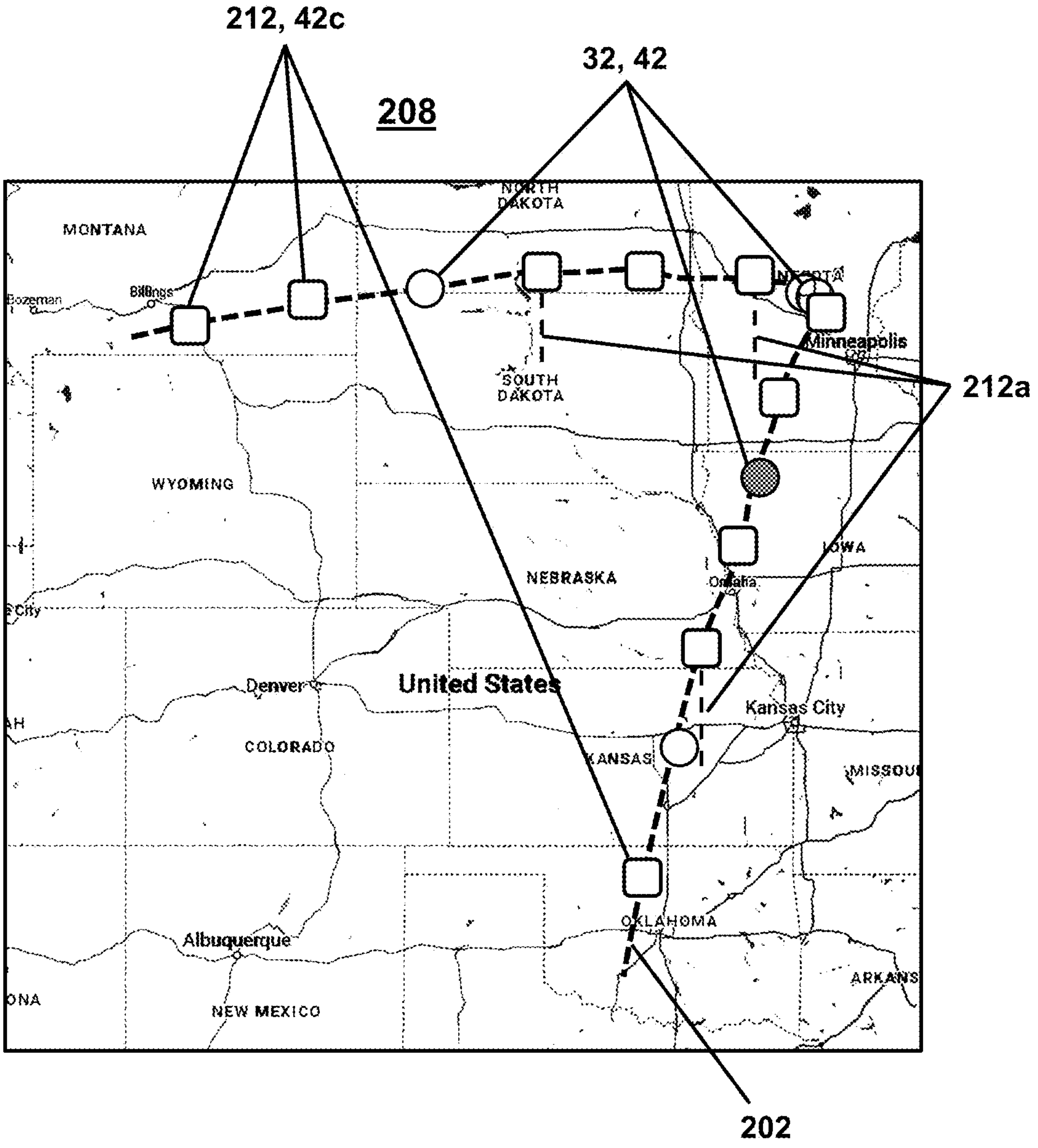

Multivariate incident time series 202 may include multiple sets of datapoints 212 for multiple variables 213 collected over the incident time period 22, for example, a company's stock price and financial indicators (e.g., Price/Earnings, Book value, etc.); processor temperature and power level of a server and network traffic; multiple meteorological datapoints 212 for variables 213, such as rainfall, temperature, pressure, humidity; speed, travel, engine data of a vehicle as well as surrounding meteorological data and vehicle GPS/geo location; airplane altitude, speed, fuel level, GPS location, and tail/head winds; and in general any data representative of the values over time (datapoints) of two or more independent, interdependent, or dependent variables. FIG. 43 illustrates a visualization of airplane altitude (datapoint 212A) (shown with dashed lines), speed 212*b* and geolocation from incident time series 202.

Variables 213 preferably are related variables 213 having some connection or relation to the incident being investigated, for example when investigating a stock price movement during an incident time period, incident data streams may contain events for the stock price, news releases, social media post about the stock and others occurring during the incident time period, and the incident time series 202 may comprise a first set of datapoints 212 representing the movement of a market index as a first related variable 213 during time-series interval 22A. In this example, the incident time series 202 may also comprise a second set of datapoints 212 representing an interest rate as a second related variable 213. In the alternative, related variables 213 may not have apparent relation to the incident and embodiments of the present invention may be used to infer a relation, connection, or dependence between the events in the incident data streams and the set of datapoints 212 in incident time series 202.

Figure 41:
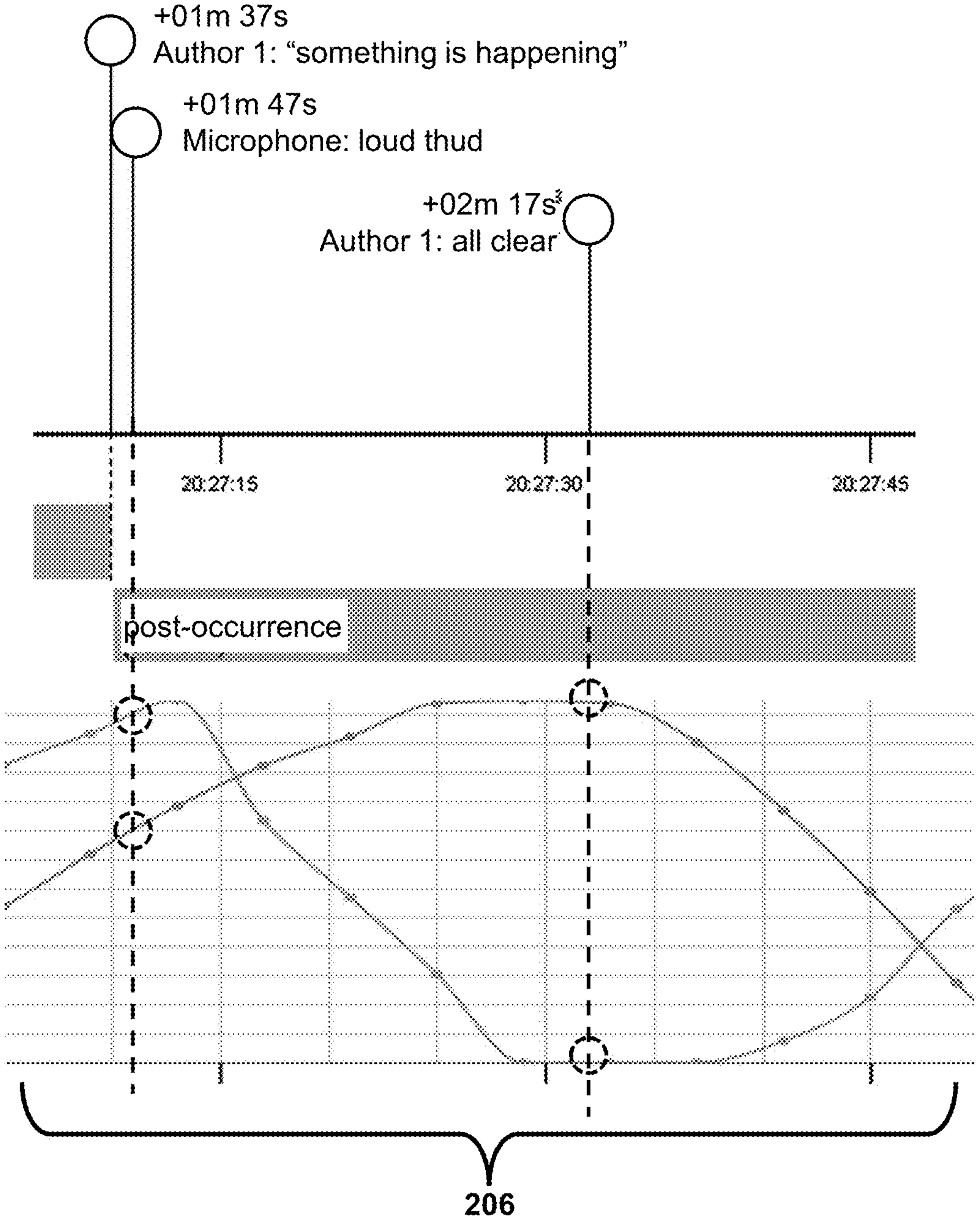
FIG. 41 are diagrams of an embodiment of a timeline view in an embodiment of the present invention.

FIGS. 38, 38A, and 41 illustrate embodiments of time-series graph 211 in the form of a line graph 214 visualizing the changes, during the incident time period 22, of a first related variable 213*a* and a second related variable 213*b* from incident time series 202. Here, time-series graph 211 may comprise a horizontal time axis 209, a vertical value axis (not shown), and two lines 214 connecting the datapoints 212 from two sets of datapoints 212 representative of the changes of the values of a first variable 213, and a second variable 213, over time. GUI 4 may be configured to display in time-series graph 211, any number of line graphs visualizing one or more variables 213, each variable represented in incident time series 202 as a set of datapoints 212. In time-series graph 211 the GUI may display a line graph 214 for each set of datapoints 212 as illustrated in FIGS. 37 and 35. As illustrated in FIG. 38A, each datapoint from the incident time series 202 is visualized by a selectable datapoint icon 42*c* enabled to display the datapoint information 215 (e.g., timestamp, values) for each datapoint along the same timestamp (illustrated as a dashed line).

Timeline View 207 is configured to display timeline flowchart 210 and time-series graph 211 chronologically aligned along the time axis 209 so that times of the timeline flowchart aligns with times of the time-series graph 211. Such arrangement allows a user to observe the values or trends for related variables 213 from the incident time series 202 for each timeline event 32, based on the alignment of the timestamps of the timeline events, as illustrated by the dashed lines and circles in FIG. 41. Based on the events' timestamps and the timeseries timestamps, embodiments of the system may be configured to determine (e.g., by calculating or estimating based on the adjacent timestamps from the time series) the values for each related variable from the incident time series 202 that correspond to each event 32 in the incident.

Figure 42:
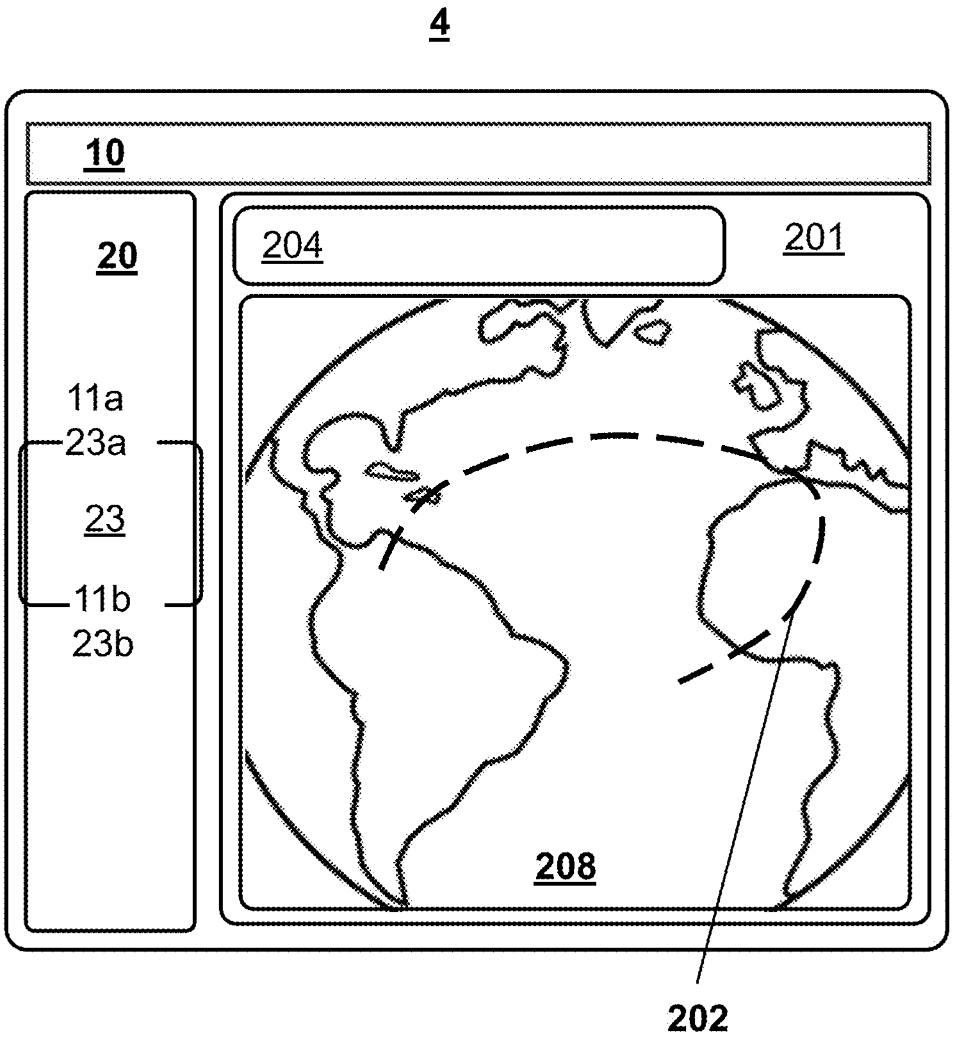
FIG. 42, 43 are diagrams of an embodiment geographical map view in an embodiment of the present invention.

Geo-map view 208 is illustrated in FIGS. 42 and 43 displaying incident time series 202 (shown with dashed line) comprising a set of geolocation datapoints 212 (e.g., GPS data, latitude/longitude coordinates) on a geographical map, during the timeline window 206. If the incident time series 202 comprises datapoints 212 for a related variable that can be represented on a geographical map, the geo-map view 208 may visualize those data points, as illustrated in FIG. 43 with vertical dashed lines representing altitude 212*a* at the geolocation datapoints 212. Embodiments of the system may also be configured to use each event 32 timestamp 34 and the incident time series 202 to determine (e.g., by estimating based on adjacent timestamps from the time series) the event geolocations 217, as well as the values of each related variable 213, corresponding to each event 32 in the incident and to visualize each timeline event 32 within timeline window 206 at the geolocation corresponding to that timeline event 32.

Geo-map view 208 displays a series of user selectable icons 42 to visualize the series of timeline events 32, and user selectable icons 42*c* to visualize the geolocation datapoints 212. The GUI is configured to enable a user to select each of the user selectable 42*c* to view datapoint information panel 50C illustrated in FIG. 40. Datapoint information panel 50C may comprise information about the datapoint 212, for example, incident time series 202 source filename, shape of selectable icon 42*c*, datapoint map icon shape, source of the geolocation datapoints, datapoint timestamp, geolocation (e.g., latitude, longitude), and related variables values (e.g., altitude, speed, heading). Control panel 50B and datapoint information panel 50C may provide a camera control 216 allowing a user to focus (e.g., zoom) the geo geo-map view 208 on the datapoint 212 or event 32.

Embodiments of the invention provide a comprehensive method for managing and searching for grouped events across all incidents within an organization, enhancing the user's ability to quickly find relevant information and effectively analyze incidents. The system is configured to perform a full text search, which may be initiated from search box 15, across all incidents associated with an organization, providing comprehensive search functionality and displaying a list of grouped events comprising the search term. The GUI provides a filter user control 101 that allows filtering of the search results by event source or by grouped incident. It also includes control 98 configured to display an event search view/panel 117, and user control 39 configured to display an event control panel 50D comprising grouped event information.

The event control panel 50D provides user controls, including a note control 52 enabling a user to add notes to a grouped event, a collections control 53 to manage collections of grouped events, and tag Control 54 to manage incident tags 180. Each grouped event 32 comprises event information including a timestamp 34, a source 35, and content 36. The search results view 117A displays a search results incidents list, a search results events list, and a search results filter control 101. The search results events list comprises one or more search result incident source-event graphics 45 associated with each of the search result events, identification of the grouped incident associated the search result event, the group source (author) of the search result event, a portion of the grouped event content 36 comprising the search term, and a search results user control 39 associated with the search result event.

The graphic, grouped incident, source, content portion, and user control 39 are displayed in visual association with each other. The search results filter control 101 is configured to filter the search results by grouped event source, one or more incident tags 180, to display events from an individual grouped incident, and to filter the results by various other parameters. The search result incident source-event graphics 45 is associated with the search result event source. The source-event icon has an icon characteristic that is visually representative of the tenure of the incident event source.

While the invention has been described with reference to exemplary embodiments, it will be understood by those skilled in the art that various changes, omissions, and/or additions may be made, and equivalents may be substituted, for elements thereof without departing from the spirit and scope of the invention. In addition, many modifications may be made to adapt a particular situation or material to the teachings of the invention without departing from the scope thereof. Therefore, it is intended that the invention not be limited to the particular embodiments disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. An apparatus for investigating an analyzable incident for an incident time period, the apparatus comprising:

a database that receives and stores one or more data sets for the incident time period;

wherein the one or more data sets comprise a series of events about the analyzable incident, wherein each event comprises a timestamp, a source, and a content;

a data processing computer coupled to the database that operates upon the one or more data sets; and, a display module coupled to the data processing computer;

wherein the display module is configured to:

(i) display a graphical user interface (GUI);

(ii) enable a user to select one or more events from the series of events; and, (iii) enable the user to annotate the one or more events;

wherein the GUI comprises:

a control panel; and, an event visualization panel;

wherein the event visualization panel is configured to display one of a source-event view and a timeline view;

wherein the GUI is configured to receive from the database a series of timeline events from the series of events that are within a timeline window;

wherein each timeline event in the series of timeline events comprises a timeline timestamp;

wherein the series of timeline events comprises a first timeline event having a first timeline timestamp;

wherein the timeline view comprises a time axis representative of the timeline window;

wherein in timeline view, the GUI is configured to display a timeline flowchart and a time-series graph;

wherein in timeline view, the GUI is configured to display one or more marker range indicators along the time axis;

wherein the timeline flowchart displays the series of timeline events chronologically along the time axis according to the timeline timestamp of each timeline event;

wherein the timeline flowchart displays at least one user selectable icon representative of each timeline event from the series of timeline events;

wherein the series of timeline events comprises a first timeline event associated with an event tag;

wherein the first timeline event is represented by a first event icon displayed in visual association with the first timeline event content and the first timeline event timestamp;

wherein the first timeline event icon comprises visual characteristics representative of the event tag associated with the first timeline event;

wherein the GUI is configured to receive an incident time series comprising a first set of datapoints for a first related variable during the incident time period;

wherein the time series graph displays a first incident line graph for the timeline window;

wherein the first incident line graph is based on a first set of timeline datapoints from the first set of datapoints that are within the timeline window;

wherein the timeline flowchart and the first incident line graph are chronologically aligned along the time axis; and wherein a first variable value for the first related variable corresponding to each of the timeline events is observable on the first incident line graph at the timeline event timestamp for each of the timeline events.

2. The apparatus of claim 1, wherein the GUI further comprises:

a visualization filter control; and, an event mapping panel;

wherein the visualization filter control is configured to enable a user to select the time-window from the group consisting of a display time interval, the incident time period, a tag filter time interval, one or more marker range time intervals, and combinations thereof;

wherein when the timeline window is the display time interval, the series of timeline events are events from the series of events whose timestamps are within the display time interval;

wherein when the timeline window is the incident time period, the series of timeline events are all events from the series of events;

wherein the GUI is configured to enable using the visualization filter control to select one or more event tags;

wherein responsive to using the visualization filter control to select the one or more event tags, the series of timeline events consists of all events that are associated with the one or more event tags and whose timestamps are within the timeline window;

wherein when the timeline window is the tag filter time interval, the series of timeline events consists of all events that are associated with the one or more event tags;

wherein when the timeline window is the one or more marker ranges, the series of timeline events consist of events from the series of events whose timestamps are within the one or more marker ranges; and, wherein the one or more marker ranges represent marker time ranges related to an occurrence.

3. The apparatus of claim 2, wherein the GUI further comprises an event mapping panel;

wherein the event mapping panel is enabled to display a visual representation of all events from the series of events;

wherein the event mapping panel comprises a user selectable graphic indicating the display time interval;

wherein the GUI is configured to enable using the user selectable graphic to select a changed display time interval;

wherein the control panel comprises a time user control configured to enable using the time user control to select the changed display time interval;

wherein, responsive to selecting the changed display time interval, the user selectable graphic of the event mapping panel indicates the changed display time interval; and, wherein the visualization filter control is configured to enable a user to select the time-window from the group consisting of the changed display time interval, the incident time period, a tag filter time interval, one or more marker range time intervals, and combinations thereof.

4. The apparatus of claim 3, wherein the incident time series further comprises a second set of datapoints for a second related variable during the incident time period;

wherein the time series graph further displays a second incident line graph for the timeline window;

wherein the second incident line graph is based on a second set of timeline datapoints from the second set of datapoints that are within the timeline window;

wherein the timeline flowchart, the first incident line graph, and the second incident line graph are chronologically aligned along the time axis; and, wherein a second variable value for the second related variable corresponding to each of the timeline events is observable on the second incident line graph at the timeline event timestamp for each of the timeline events.

5. The apparatus of claim 3, wherein the event visualization panel is configured to display one of a source-event view, timeline view, and a geographical map;

wherein the incident time series further comprises a set of geolocation datapoints during the incident time period;

wherein the data processing computer is configured to estimate from the incident time series a geolocation corresponding to each event from the series of events based on the timestamp of the event;

wherein the data processing computer is configured to estimate from the incident timeline a first event geolocation corresponding to the first timeline event based on the first timeline event timestamp;

wherein the geo-map is configured to display a series of user selectable geo-icons at each geolocation datapoint from the set of geolocation datapoints during the timeline window;

wherein the GUI is configured to enable selecting each selectable geo-icon to display information about the first related variable at each geolocation datapoint;

wherein the geo-map displays a first user selectable geo-icon at the first event geolocation;

wherein the first selectable geo-icon comprises visual characteristics representative of the event tag associated with the first timeline event;

wherein the GUI is configured to enable selecting the first user selectable geo-icon to display one or more of the first timeline event content, first timeline event timestamp, the tag associated with first timeline event, and the value of the first related variable at the first timeline event timestamp; and, wherein the GUI is configured to enable a user to select each selectable geo-icon to display information about the first related variable at each geolocation datapoint.

6. The apparatus of claim 5, wherein the GUI is configured to allow using the at least one user selectable icon to annotate the timeline event associated with the at least one user selectable icon;

wherein the user selectable icon is configured to allow the user to switch to one of an event list view, a swimlane view, and a geolocation map view;

wherein the GUI is configured to enable using the first user selectable geo-icon to annotate the first timeline event;

wherein the first user selectable geo-icon is configured to allow the user to switch to one of an annotation panel event list view, an annotation panel swimlane view, and the timeline view;

wherein the event list view is a tabular list of the timestamp, the source and the content of each event from the series of events; and, wherein the swimlane view is a graphical representation of the timestamp, the source of each event, and at least one user selectable icon associated with the content of each event.

* * * * *